(12) United States Patent
Murata et al.

(10) Patent No.: US 8,831,356 B2
(45) Date of Patent: Sep. 9, 2014

(54) INFORMATION PROCESSING APPARATUS, METADATA SETTING METHOD, AND PROGRAM

(75) Inventors: Makoto Murata, Tokyo (JP); Naoki Shibuya, Kanagawa (JP); Masatomo Kurata, Tokyo (JP); Koji Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 167 days.

(21) Appl. No.: 13/478,968

(22) Filed: May 23, 2012

(65) Prior Publication Data

US 2013/0016910 A1    Jan. 17, 2013

(30) Foreign Application Priority Data

May 30, 2011    (JP) .................................. 2011-120396

(51) Int. Cl.
*G06K 9/46* (2006.01)
*H04N 21/4725* (2011.01)
*H04N 21/858* (2011.01)

(52) U.S. Cl.
CPC ....... *H04N 21/4725* (2013.01); *H04N 21/8583* (2013.01)

USPC .......................................................... 382/195

(58) Field of Classification Search
None
See application file for complete search history.

(56) References Cited

U.S. PATENT DOCUMENTS

| 5,945,931 | A * | 8/1999 | Tahara et al. | .................... 341/50 |
| 2010/0074590 | A1 * | 3/2010 | Momosaki | .................... 386/52 |
| 2011/0058747 | A1 * | 3/2011 | Nakagomi | .................... 382/195 |

FOREIGN PATENT DOCUMENTS

JP    2005-044330    2/2005

* cited by examiner

*Primary Examiner* — Stephen R Koziol
*Assistant Examiner* — Amandeep Saini
(74) *Attorney, Agent, or Firm* — Sherr & Jiang, PLLC

(57) ABSTRACT

Provided is an information processing apparatus including a specified region detection unit for detecting a specified region specified by a user within a screen during reproduction of a video, a region metadata setting unit for setting region metadata indicating a position and a range of the specified region for each video frame, and a section metadata setting unit for setting section metadata indicating a section corresponding to a video frame for which the region metadata has been set, for each video.

14 Claims, 58 Drawing Sheets

FIG. 2
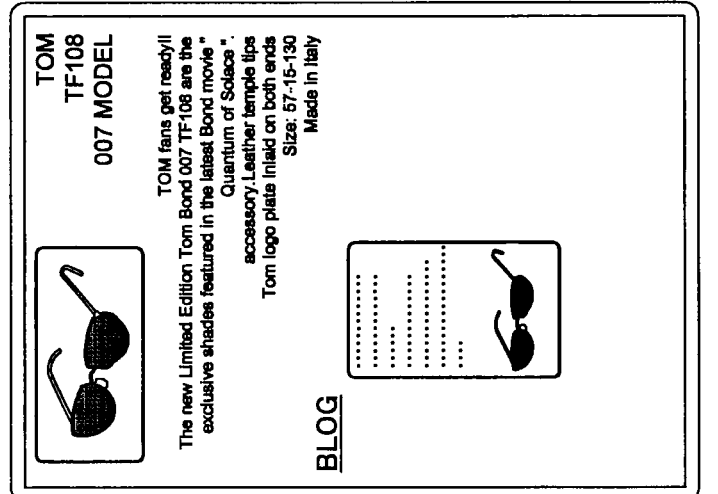
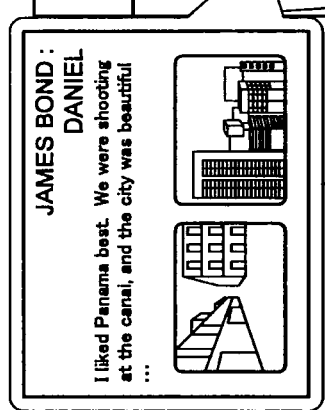
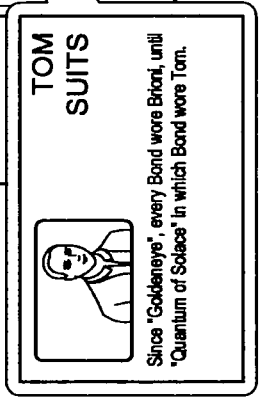

FIG. 4
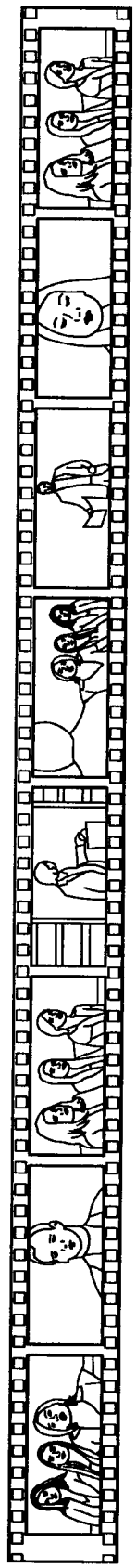
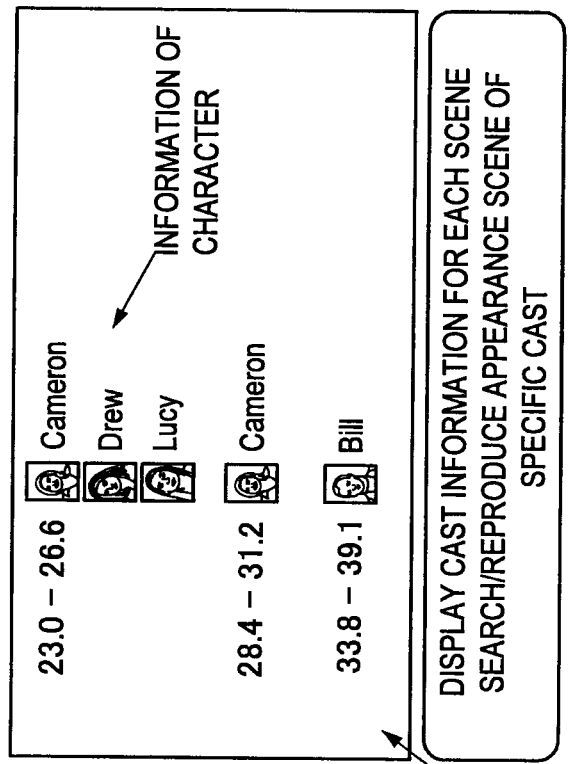
INFORMATION OF CHARACTER
23.0 – 26.6  Cameron  Drew  Lucy
28.4 – 31.2  Cameron
33.8 – 39.1  Bill
DISPLAY CAST INFORMATION FOR EACH SCENE SEARCH/REPRODUCE APPEARANCE SCENE OF SPECIFIC CAST
TIME INFORMATION OF APPEARANCE SECTION (RESULT OF REGION DETECTION/TRACKING)

(QUANTIFICATION)

| REGION | TYPE AND SCORE | AREA | APPEARANCE TIME |
|---|---|---|---|
| ⌐ ⌐ | PERSON 0.5 | 2.0 | 5.0 |
| ☐ | CAR 1.0 | 8.0 | 2.0 |
| ▫ | ANIMAL 3.0 | 1.0 | 3.0 |

[RPS CALCULATION]

FIG. 31
STEP 1: LONG-PRESS ON DISPLAYED REGION + MENU SELECTION
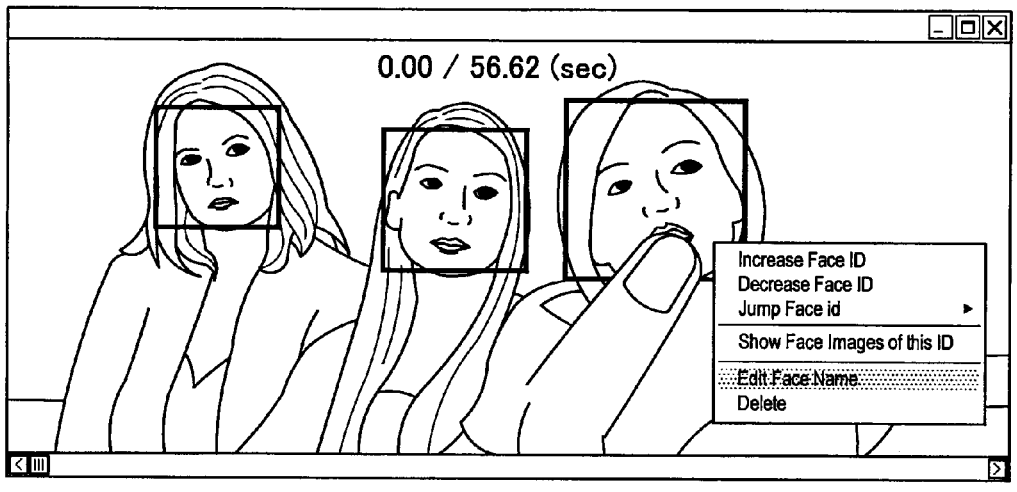
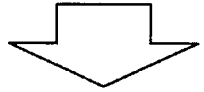
STEP 2: INPUT NAME
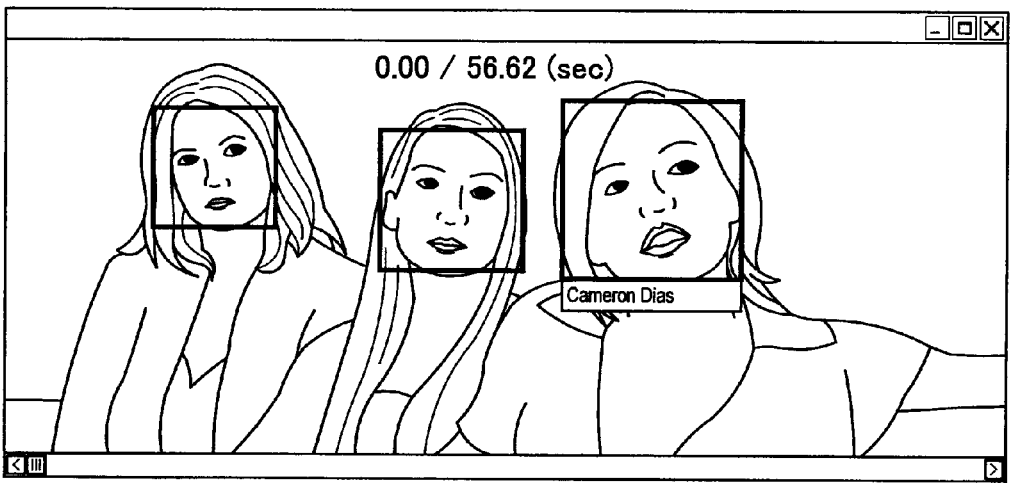

FIG. 33
STEP 1 : SELECT REGION WITH TWO FINGERS
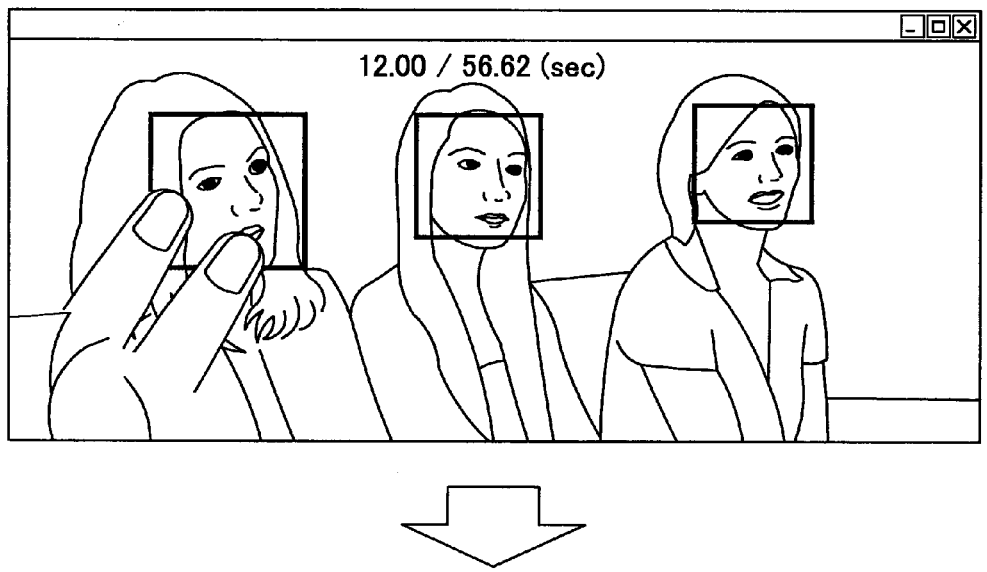
STEP 2 : DISPLAY PAST REGION IMAGE
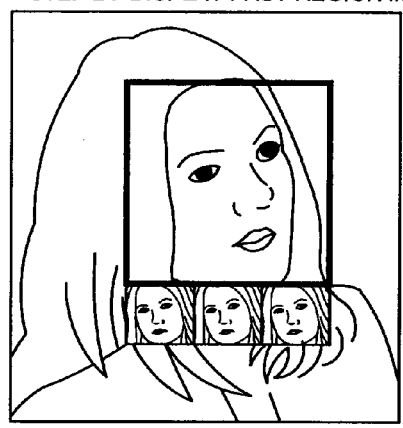

20: METADATA MANAGEMENT SYSTEM

DISPLAY OF SCENES IN WHICH SELECTED PERSON APPEARS (LINK TO SCENES)

INFORMATION PROCESSING APPARATUS, METADATA SETTING METHOD, AND PROGRAM

BACKGROUND

The present technology relates to an information processing apparatus, a metadata setting method, and a program.

When viewing video images, TV pictures and the like, one may want to obtain detailed information about a person, an object, a place or the like (hereinafter, a target object) appearing in the image. Currently, many users search for the information using a personal computer (hereinafter, a PC), a mobile phone, a portable information terminal or the like (hereinafter, an information appliance). However, if a keyword that can specify the target object appearing in the image is not known, a user will have difficulty obtaining information about the target object. Also, it is burdensome to perform an operation of starting an information appliance or inputting a search keyword in the information appliance while viewing a video image.

For example, if a user interface which enables to select on a screen a target object appearing in a video image and which causes information about the target object selected by a user to be displayed on the screen is realized, the convenience of the user is expected to increase considerably. A selection operation of a target object can be realized by using an input device such as a touch panel or a remote control. However, to specify a target object existing at a selected position on a screen, metadata indicating the position of each target object in each video frame becomes necessary. Additionally, a method of automatically detecting the position of a target object appearing in a video image is disclosed in JP 2005-44330A, for example.

SUMMARY

When using the technology described in JP 2005-44330A, the position of a target object appearing in each video frame can be automatically detected. Thus, by using the position of a target object which has been automatically detected as the metadata, a target object existing at a position that a user has selected on a screen can be identified. However, at present, accuracy is not enough to automatically detect every target object. Thus, an operation of manual labeling of metadata has to be performed. However, the number of video frames constituting a video image is extremely large, and the operation of manual labeling of metadata is very burdensome. Therefore, a mechanism for facilitating the operation of manual labeling of metadata is desired.

Thus, the present technology has been made in view of the above circumstances, and intends to provide an information processing apparatus, a metadata setting method, and a program which are novel and improved, and which are capable of allowing a user to easily set information about a section in a video in which a specific person, object or the like appears and information about a position and a range of appearance, within each video frame, of the specific person, object or the like.

According to an embodiment of the present technology, there is provided an information processing apparatus which includes a specified region detection unit for detecting a specified region specified by a user within a screen during reproduction of a video, a region metadata setting unit for setting region metadata indicating a position and a range of the specified region for each video frame, and a section metadata setting unit for setting section metadata indicating a section corresponding to a video frame for which the region metadata has been set, for each video.

According to another embodiment of the present technology, there is provided an information processing apparatus which includes a metadata acquisition unit for acquiring region metadata indicating a position and a range of a specified region specified by a user within a screen during reproduction of a video, and section metadata indicating a section corresponding to a video frame for which the specified region has been specified, and a region metadata setting unit for calculating, in a case specified regions have been specified by a plurality of users with respect to a same target object included in a same video frame, one representative position and range by statistically processing positions and ranges of a plurality of specified regions specified by the plurality of users, and setting the representative position and range as the region metadata.

According to another embodiment of the present technology, there is provided a metadata setting method which includes detecting a specified region specified by a user within a screen during reproduction of a video, setting region metadata indicating a position and a range of the specified region for each video frame, and setting section metadata indicating a section corresponding to a video frame for which the region metadata has been set, for each video.

According to another embodiment of the present technology, there is provided a program for causing a computer to realize a specified region detection function of detecting a specified region specified by a user within a screen during reproduction of a video, a region metadata setting function of setting region metadata indicating a position and a range of the specified region for each video frame, and a section metadata setting function of setting section metadata indicating a section corresponding to a video frame for which the region metadata has been set, for each video.

According to another embodiment of the present technology, there is provided a metadata setting method which includes acquiring region metadata indicating a position and a range of a specified region specified by a user within a screen during reproduction of a video, and section metadata indicating a section corresponding to a video frame for which the specified region has been specified, and calculating, in a case specified regions have been specified by a plurality of users with respect to a same target object included in a same video frame, one representative position and range by statistically processing positions and ranges of a plurality of specified regions specified by the plurality of users, and setting the representative position and range as the region metadata.

According to another embodiment of the present technology, there is provided a program for causing a computer to realize a metadata acquisition function of acquiring region metadata indicating a position and a range of a specified region specified by a user within a screen during reproduction of a video, and section metadata indicating a section corresponding to a video frame for which the specified region has been specified, and a region metadata setting function of calculating, in a case specified regions have been specified by a plurality of users with respect to a same target object included in a same video frame, one representative position and range by statistically processing positions and ranges of a plurality of specified regions specified by the plurality of users, and setting the representative position and range as the region metadata.

According to another embodiment of the present technology, there is provided a computer-readable recording medium storing the program.

As described above, according to the present technology, a user is enabled to easily set information about a section in a video in which a specific person, object or the like appears and information about a position and a range of appearance, within each video frame, of the specific person, object or the like.

BRIEF DESCRIPTION OF THE DRAWINGS

FIG. 2 is an explanatory diagram for describing a display method of related information;

FIG. 4 is an explanatory diagram for describing a display method of an appearance section;

FIG. 31 is an explanatory diagram for describing the details of a process regarding labeling;

FIG. 33 is an explanatory diagram for describing the details of a process regarding labeling;

DETAILED DESCRIPTION OF THE EMBODIMENT(S)

Figure 1:
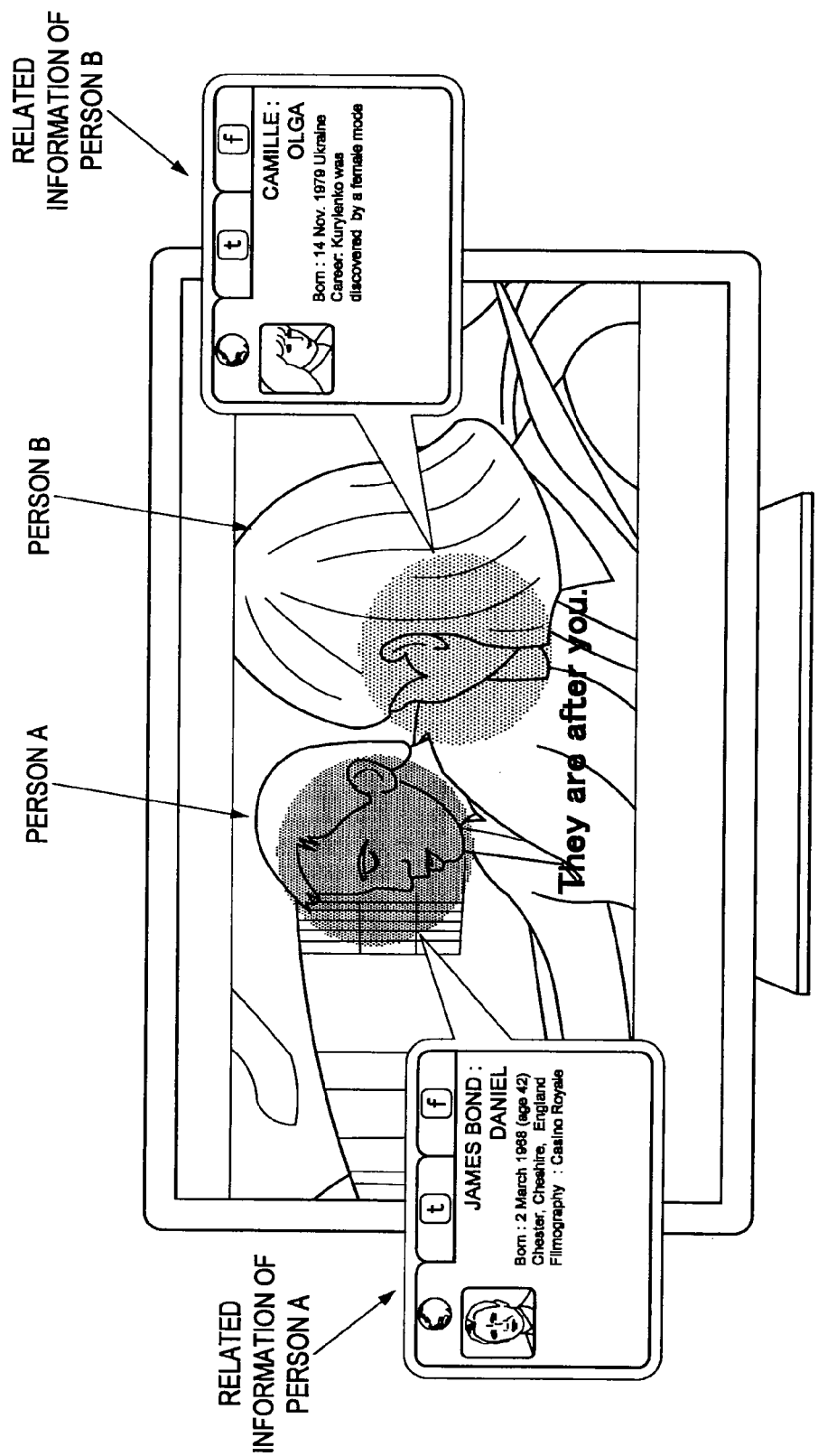
FIG. 1 is an explanatory diagram for describing a display method of related information.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

[Flow of Explanation]

The flow of the explanation below will be briefly stated here.

First, concrete examples of a user interface that is realized by the technology according to the present embodiment will be described with reference to FIGS. 1 to 4. Then, video timeline metadata according to the present embodiment will be described with reference to FIGS. 6 and 7. Then, a configuration of a system according to the present embodiment that performs processes regarding provision, management and use of the video timeline metadata, and the flow of the processes will be described with reference to FIGS. 8 and 9.

Next, configurations and operations of a metadata providing terminal 10 according to the present embodiment will be described with reference to FIGS. 10 to 35. A mechanism of facilitating a labeling process of the video timeline metadata will be described in detail here. Then, configurations and operations of a metadata management system 20 according to the present embodiment will be described with reference to FIGS. 36 to 44. Details of a process of integrating pieces of video timeline metadata set by a plurality of users, and a mechanism for promoting a setting operation of the video timeline metadata will be described in detail here.

Next, configurations and operations of a metadata user terminal 30 will be described with reference to FIGS. 45 to 52. A configuration of a user interface that uses the video timeline metadata will be described in detail here. Then, data structures of the video timeline metadata according to the present embodiment will be described with reference to FIGS. 53 to 59. Then, an example hardware configuration of information processing apparatuses capable of realizing the functions of the metadata providing terminal 10, the metadata management system 20, and the metadata user terminal 30 according to the present embodiment will be described with reference to FIG. 60.

Lastly, technical ideas of the embodiment will be summarized and effects obtained by the technical ideas will be briefly described.

(Explanation Items)
1: Introduction
2: Embodiment
2-1: Overall Configuration and Operation of System
2-2: Configuration of Metadata Providing Terminal 10
2-3: Operation of Metadata Providing Terminal 10
2-3-1: Preprocessing
2-3-2: Labeling Process
2-4: Configuration of Metadata Management System 20
2-5: Operation of Metadata Management System 20
2-5-1: Integration Process
2-5-2: Other Functions
2-6: Configuration and Operation of Metadata User Terminal 30
2-7: Data Structure of Video Timeline Metadata
3: Hardware Configuration
4: Summary 1: Introduction First, a user interface and an application that are realized by using video timeline metadata according to the present embodiment will be introduced. Also, the video timeline metadata according to the present embodiment will be described.

When viewing a video such as video images or TV pictures, a person, an object or the like appearing in the video may draw one's attention. Or, one may pay attention not only to people or objects, but also to a place appearing in the video, the creator of the video, or how the story of the video unfolds, and may want to obtain detailed information related to such matters. For example, a user may want to know, while viewing a TV drama, other videos which a person appearing in the TV drama stars in. Another user may, while viewing a movie, pay attention to the suit an actor appearing in the movie is wearing.

In the past, when trying to obtain information as described above, many users operated an information appliance separately provided and acquired the information from the Web, or switched the screen to a data broadcast display mode and acquired the information. However, it is burdensome to stop viewing a video to perform operations of starting an information appliance, inputting an appropriate search keyword in a search engine, and the like. Also, in many cases, in data broadcasting, desired information is not obtained. Also, none of the methods is suitable for acquiring in real time related information that is in accordance with a scene that is being viewed. In view of these circumstances, the present inventors were impelled to enable viewing, in real time, of information related to a person, an object or the like appearing in a scene that is being viewed.

Figure 3:
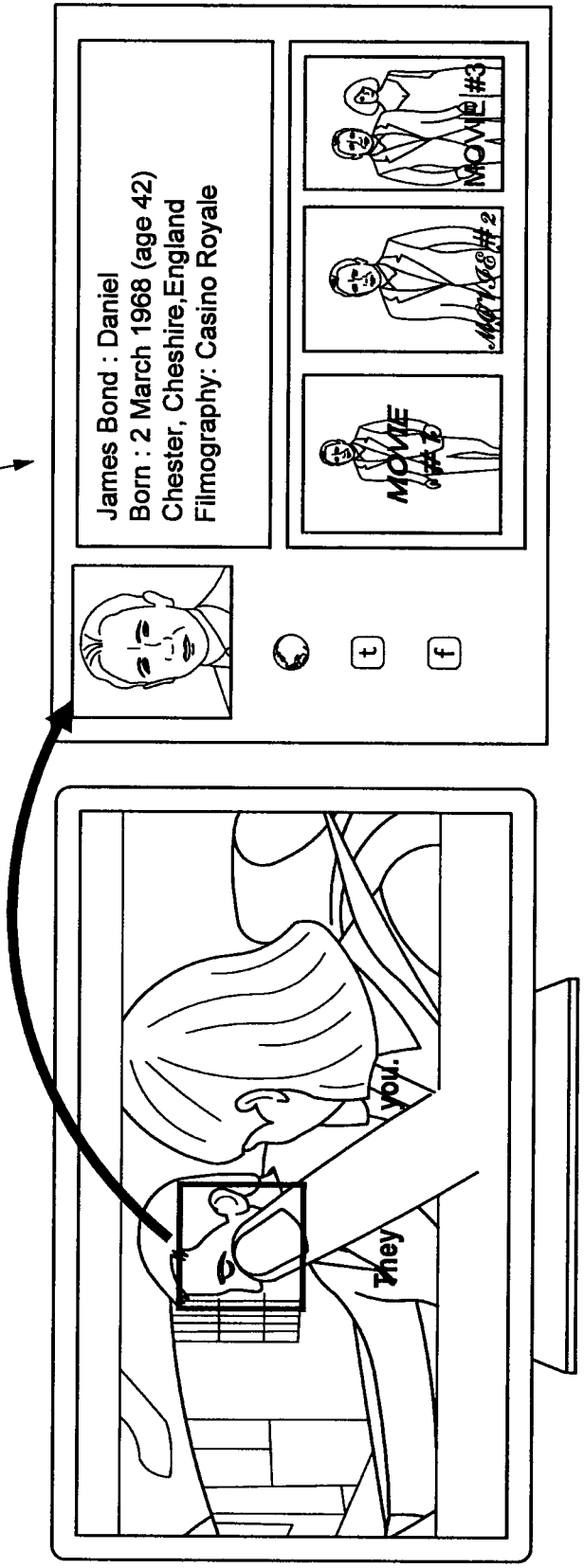
FIG. 3 is an explanatory diagram for describing a display method of related information.

For example, as shown in FIG. 1, it is desired to enable display, in real time, of related information of a person appearing in a scene of a video. Also, as shown in FIG. 2, it is desired to enable display, in real time, of related information of a person appearing in a scene of a video, related information of an object that the person is wearing, or related information related to the location of shooting of the scene. Furthermore, it is desired to realize not only automatic display of related information at the time of reproduction of a video, but also a user interface for displaying, when a user selects a character, related information of the selected character, as shown in FIG. 3. To realize display of such related information, information (hereinafter, video timeline metadata) of a person, an object or the like (hereinafter, a target object) appearing in each video frame has to be prepared in advance.

For example, if information indicating whether a certain target object appears in a video frame or not (hereinafter, section metadata) and related information of the target object (hereinafter, object metadata) are prepared for each video frame, the related information of the target object can be displayed in real time at the time of reproduction of each video frame. Also, if information indicating the position or range (hereinafter, region metadata) within each video frame at which the target object appears is prepared, the related information can be displayed in association with the position or range of the target object, as shown in FIG. 1. Furthermore, if the region metadata is used, the position or range of the target object displayed within the screen can be matched with a position specified by a user, and a user interface that displays the related information according to specification of a position by a user can be realized, as shown in FIG. 3.

Also, when using the section metadata, a section in which a certain target object appears can be identified, and thus, a section in which a certain target object appears can be presented to a user or reproduction of only the sections in which a certain target object appears is enabled, as shown in FIG. 4. In the example of FIG. 4, an example is shown in which information (time information of appearance section) associating scenes where people appear and the people appearing in the scenes is presented to a user.

Figure 5:
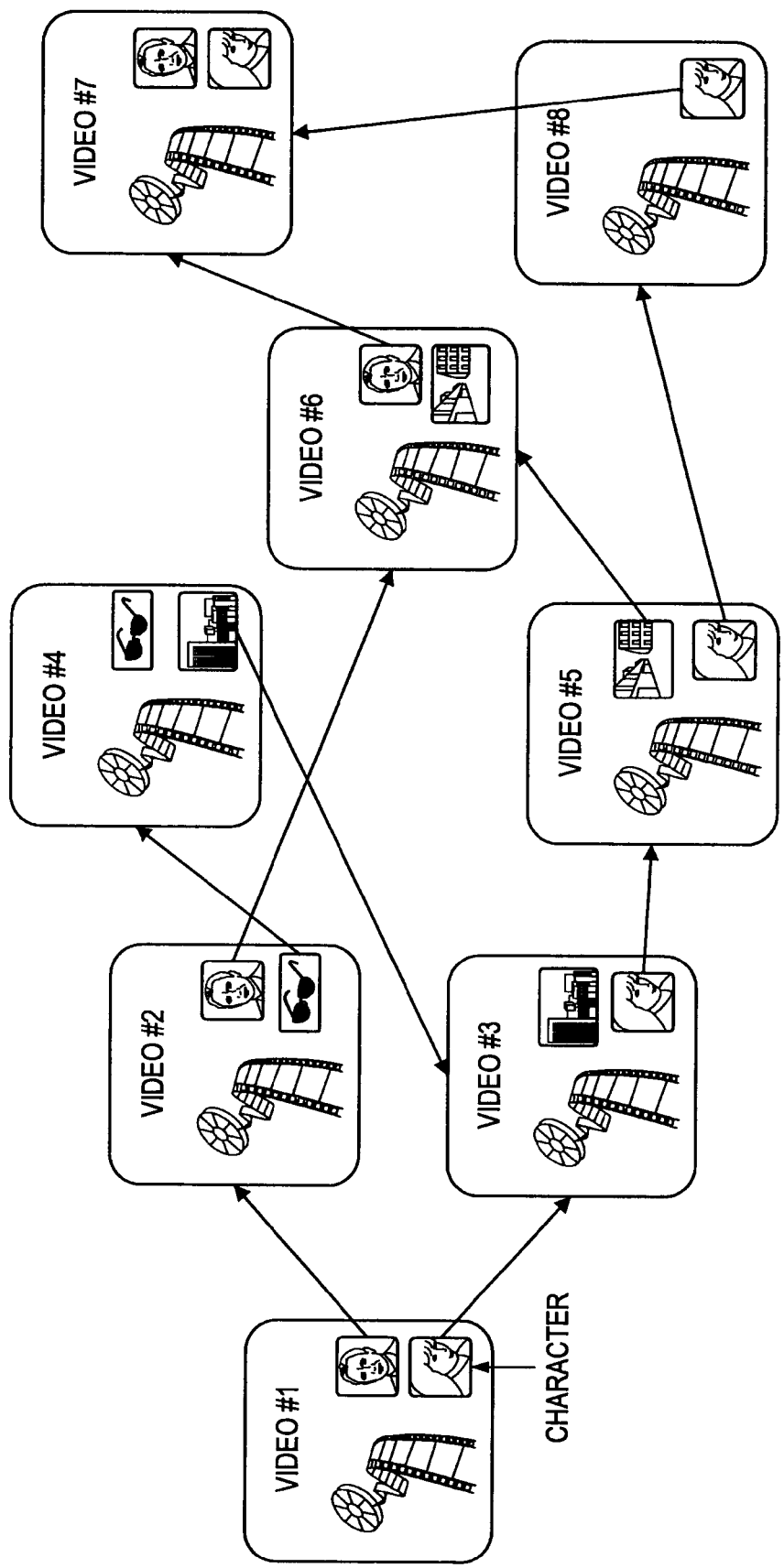
FIG. 5 is an explanatory diagram for describing a concept of hyperlink video browsing.

Furthermore, when using pieces of section metadata regarding a plurality of videos, a hyperlink video browsing as shown in FIG. 5 can be realized. The hyperlink video browsing here means an operation method of viewing videos while switching between the videos with a target object appearing in the videos as key information. For example, in the example of FIG. 5, when a person appearing in a scene in video #1 is selected, reproduction of video #2 in which the person appears is started, and when an object appearing in a scene in video #2 is selected, reproduction of video #4 in which the object appears is started. In this manner, by selecting, while viewing a video, a target object which has caught his/her attention, a user is enabled to view videos while freely switching between videos in which the target object appears.

Figure 6:
FIG. 6 is an explanatory diagram for describing an overview of video timeline metadata.

Here, referring to FIG. 6, the explanation on the structure of the video timeline metadata will be supplemented. The video timeline metadata is structured from the region metadata, the section metadata, and the object metadata. The region metadata is metadata indicating the position and the range (hereinafter, a region) of a target object appearing in each video frame. For example, in FIG. 6, a face region of a person is shown by a hatched circle. In this case, the position of the face region is expressed by centre coordinates of the circle. Also, the range of the face region is expressed by the radius of the circle. Additionally, the shape of the region may be a rectangle. In the case the shape of the region is a rectangle, the position of the region is expressed by the coordinates of the upper left corner (the lower left corner, the upper right corner, or the lower right corner is also acceptable, of course) of the rectangle, for example. Also, the range of the region is expressed by the height and the width of the rectangle.

On the other hand, the section metadata is metadata indicating a section in which a target object appears. For example, in the case a person A appears in the tenth video frame to the 80th video frame, the section metadata regarding the person A indicates the sections corresponding to the 10th to 80th video frames. The section metadata is prepared for each video and each target object appearing in each video. When referring to the section metadata, whether a specific target object appears in a video or not can be grasped. Also, when using the section metadata, the length of a section, in each video, in which a specific target object appears can be grasped. Furthermore, when using the section metadata, since a combination of target objects appearing in the same video can be identified, a co-star relation can be detected, or a co-starring time can be calculated, for example.

Figure 7:
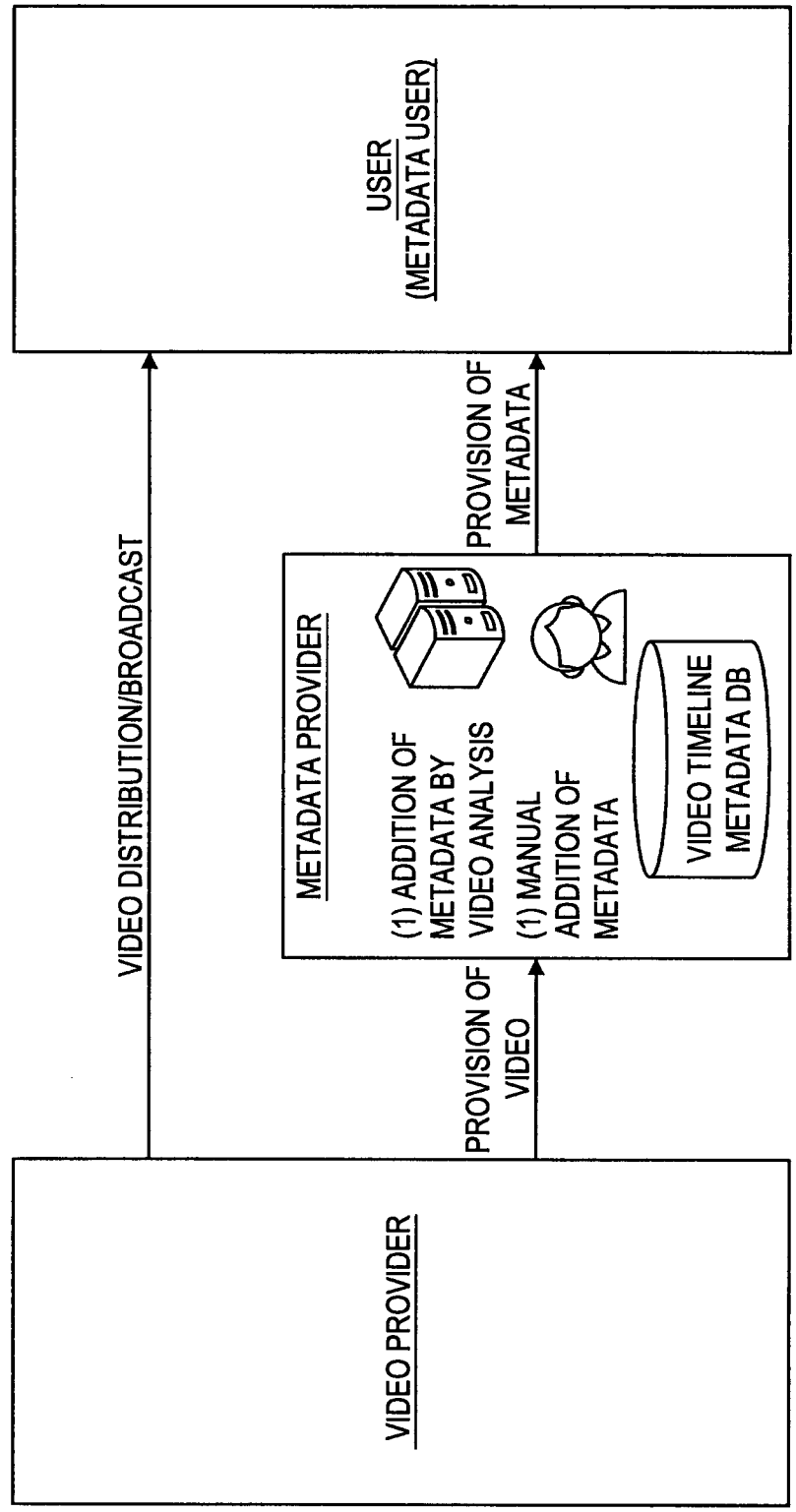
FIG. 7 is an explanatory diagram for describing a mechanism for providing the video timeline metadata.

Additionally, provision of the video timeline metadata is, as shown in FIG. 7, assumed to be performed by a metadata provider different from the video provider. Also, the video timeline metadata is assumed to be created by using a video analysis technology or by manual input. For example, when using a face recognition technology, a face-tracking technology or the like, a person appearing in each video frame can be automatically detected. The video timeline metadata can be created by using the detection result. However, when using such automatic detection technology, errors, such as erroneous detection, erroneous identification or failed detection, are prone to occur.

Thus, correction or addition of video timeline metadata has to be manually performed for the portion at which an error has occurred, or the video timeline metadata has to be created manually from the start. Of course, a higher accuracy can be achieved when manually creating the video timeline metadata. However, the number of video frames constituting a video is extremely large. Thus, it is difficult to manually label each one of video frames with the video timeline metadata. Accordingly, the present inventors have developed a user interface capable of simplifying the manual labeling operation of the video timeline metadata and of greatly reducing the workload on the user. Also, the present inventors have devised a mechanism that enables creation of the video timeline metadata by a plurality of users working together.

By applying these technologies, highly accurate video timeline metadata can be provided. Also, various applications using the video timeline metadata are realized. For example, real-time display of related information as shown in FIGS. 1 to 3 is enabled. Also, display of an appearance section as shown in FIG. 4, or selective reproduction of scenes where a specific character appears is enabled. Furthermore, hyperlink video browsing as shown in FIG. 5 is enabled.

In the following, a labeling method according to the present embodiment of the video timeline metadata, a configuration of a user interface used for labeling of the video timeline metadata, and an application that uses the video timeline metadata will be described in detail.

2. Embodiment

In the following, an embodiment of a technology according to the present embodiment will be described.

[2-1: Overall Configuration and Operation of System]

Figure 8:
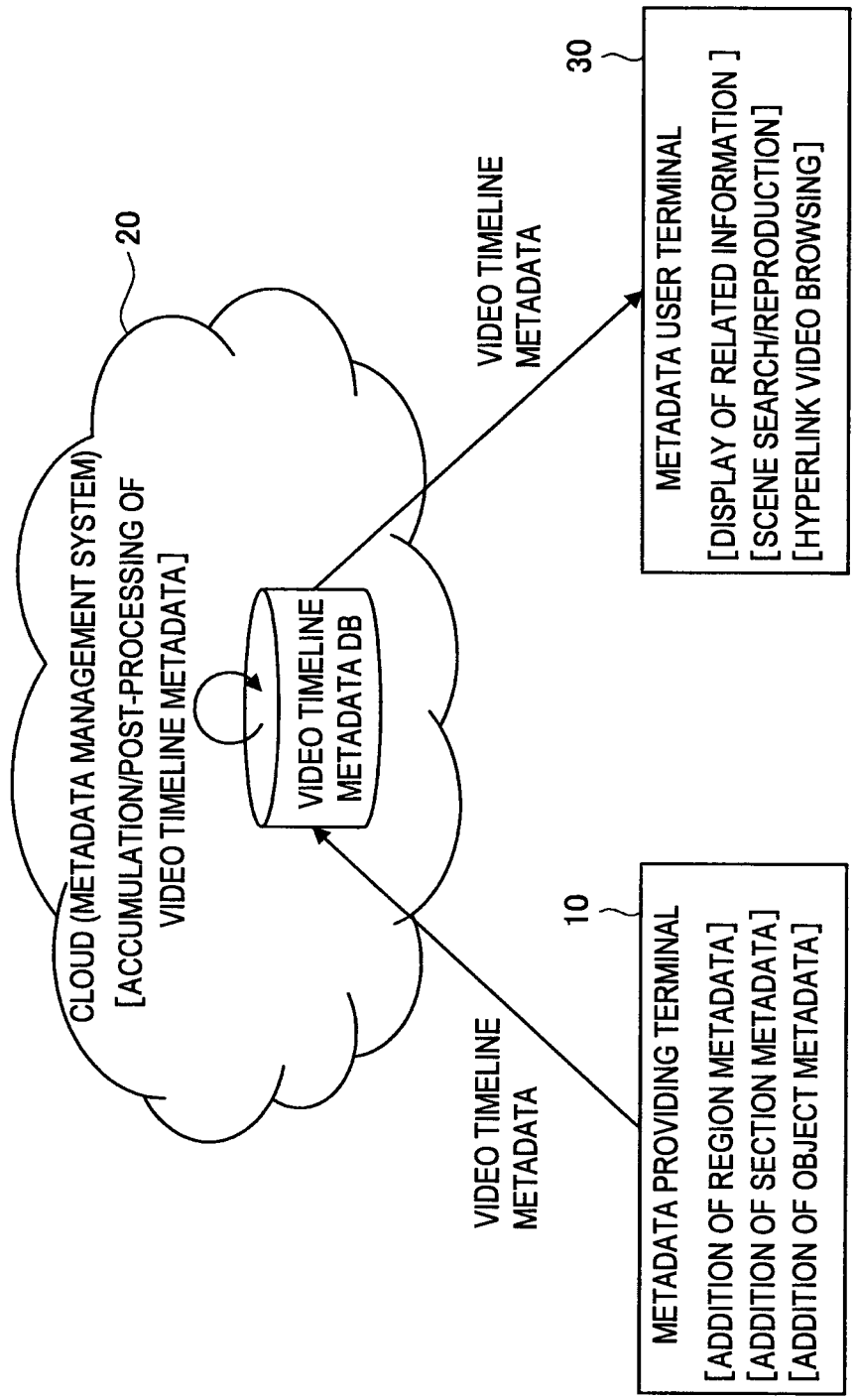
FIG. 8 is an explanatory diagram for describing a mechanism for providing the video timeline metadata.
Figure 9:
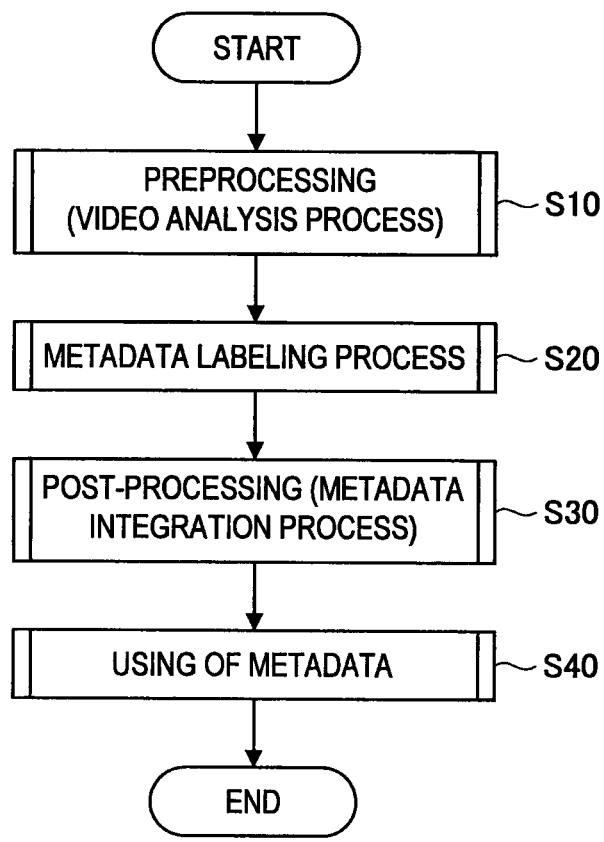
FIG. 9 is an explanatory diagram for describing a brief flow of processing from provision of the video timeline metadata to using the same.

First, a configuration and an operation of a system capable of performing a series of processes according to the present embodiment will be described with reference to FIGS. 8 and 9. FIGS. 8 and 9 are explanatory diagrams for describing a configuration and an operation of a system of the present embodiment capable of performing a series of processes according to FIGS. 8 and 9.

(Configuration)

As shown in FIG. 8, a system according to the present embodiment is configured mainly from a metadata providing terminal 10, a metadata management system 20, and a metadata user terminal 30.

The metadata providing terminal 10 provides a user interface that is used for a labeling operation of video timeline metadata, and performs processing related to labeling of the video timeline metadata. Also, the metadata providing terminal 10 provides the video timeline metadata used for labeling to the metadata management system 20. Additionally, a system where the video timeline metadata is directly provided from the metadata providing terminal 10 to the metadata user terminal 30 can also be configured. Also, in FIG. 8, only one metadata providing terminal 10 is provided, but a plurality of metadata providing terminals 10 may also be provided in the system. In the following, an explanation will be given assuming that there are a plurality of metadata providers, and that there are a plurality of metadata providing terminals 10 in the system.

The metadata management system 20 accumulates video timeline metadata provided by the metadata providing terminal 10. Also, in the case a plurality of pieces of video timeline metadata related to the same video are provided, the metadata management system 20 integrates these pieces of video timeline metadata. Moreover, the metadata management system 20 may also include a function for enabling sharing of video timeline metadata among a plurality of users by using a social network service (hereinafter, SNS). Furthermore, the metadata management system 20 may also include a function for rewarding a metadata provider. Still further, the metadata management system 20 may also include a function for transmitting to the metadata providing terminal 10 information for assisting the labeling operation of video timeline metadata.

The metadata user terminal 30 acquires video timeline metadata from the metadata management system 20, and provides various functions using the video timeline metadata acquired. For example, the metadata user terminal 30 provides, using the video timeline metadata, a function of displaying related information, scene search/reproduction function (a function of displaying an appearance section, a function of selectively reproducing appearance sections, and the like), a hyperlink video browsing function, and the like. That is, the metadata user terminal 30 provides an execution environment for an application that uses video timeline metadata.

(Operation)

The system according to the present embodiment performs a series of processes shown in FIG. 9. First, the metadata providing terminal 10 or the metadata management system 20 performs preprocessing (S10). The preprocessing of step S10 is basically a process for automatically detecting a target object appearing in a video by using a video analysis technology such as an object recognition technology or an object detection/object tracking technology. As the object detection/object tracking technology, the technology described in JP 2005-44330A may be used, for example. Also, as the object recognition technology, the technology described in JP 2007-65766A may be used, for example.

As will be described later, by performing the preprocessing in advance, the number of target objects and the number of video frames that are to be newly labeled can be reduced, and the burden of the labeling operation can be reduced. However, it is possible to omit the preprocessing. In the case the preprocessing is omitted, all the video frames will be manually labeled with video timeline metadata. Furthermore, the preprocessing may be performed by the metadata providing terminal 10 or by the metadata management system 20. In the following, an explanation will be given assuming that the metadata providing terminal 10 performs the preprocessing.

After performing the preprocessing, the metadata providing terminal 10 performs a process related to labeling of video timeline metadata (S20). For example, the metadata providing terminal 10 reproduces a video which is the target of labeling, and receives input by a user. At this time, the metadata providing terminal 10 provides a user interface which assists the labeling operation of the user. Then, the metadata providing terminal 10 creates video timeline metadata according to the input of the user, and provides the video timeline metadata to the metadata management system 20.

Next, the metadata management system 20 performs post-processing on the video timeline metadata provided by the metadata providing terminal 10 (S30). This post-processing is basically a process for integrating a plurality of pieces of video timeline metadata set with the same video as the target. Then, the metadata user terminal 30 acquires the video timeline metadata from the metadata management system 20, and provides various functions, such as display of related information, to the user by using the video timeline metadata acquired (S40).

A configuration and an operation of a system capable of performing a series of processes according to the present embodiment have been described. In the following, detailed functional configurations of the metadata providing terminal 10, the metadata management system 20, and the metadata user terminal 30, and the processing in each step will be described in detail with reference to the flow of processes shown in FIG. 9.

[2-2: Configuration of Metadata Providing Terminal 10]

Figure 10:
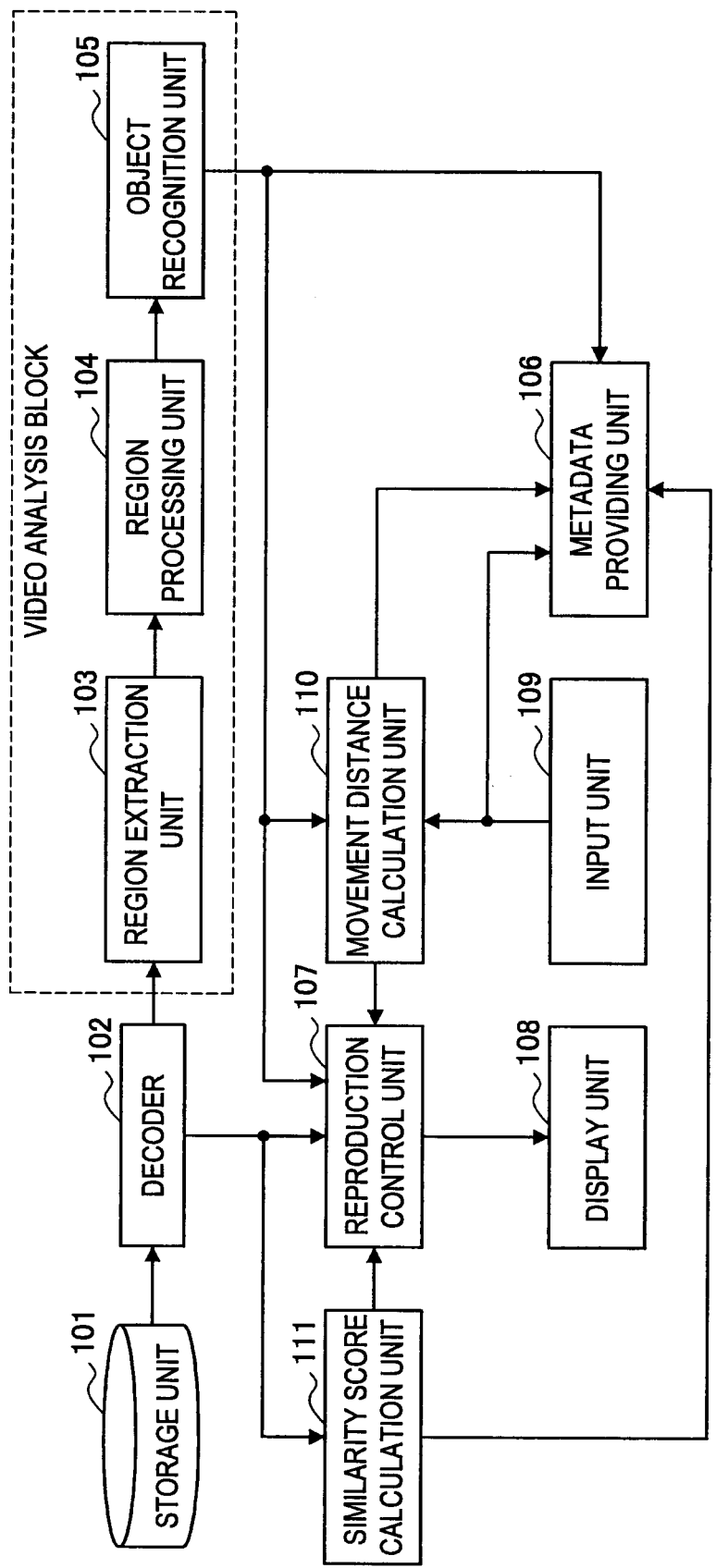
FIG. 10 is an explanatory diagram for describing an example configuration of a metadata providing terminal.

First, a functional configuration of the metadata providing terminal 10 will be described with reference to FIG. 10. FIG. 10 is an explanatory diagram for describing a functional configuration of the metadata providing terminal 10.

As shown in FIG. 10, the metadata providing terminal 10 is configured mainly from a storage unit 101, a decoder 102, a region extraction unit 103, a region processing unit 104, an object recognition unit 105, a metadata providing unit 106, a reproduction control unit 107, a display unit 108, an input unit 109, a movement distance calculation unit 110, and a similarity score calculation unit 111.

Additionally, the region extraction unit 103, the region processing unit 104, and the object recognition unit 105 constitute a video analysis block. In the case of omitting the preprocessing in step S10 shown in FIG. 9, the video analysis block may be omitted. Also, the video analysis block may be provided in the metadata management system 20 or other device for video analysis to omit the video analysis block of the metadata providing terminal 10. However, in the following, an explanation will be given assuming that the video analysis block is provided in the metadata providing terminal 10.

A video is stored in the storage unit 101. The video stored in the storage unit 101 is decoded by the decoder 102, and is input to the region extraction unit 103, the reproduction control unit 107, and the similarity score calculation unit 111. The region extraction unit 103 uses the object detection/object tracking technology or the like, and extracts the position and range (hereinafter, a target region) of a target object appearing in each video frame of the input video. Information about the target region extracted by the region extraction unit 103 is input to the region processing unit 104.

The region processing unit 104 processes the target region based on the information about the target region which has been input. For example, the region processing unit 104 removes a target region with short appearance time or a target region with a small size, or combines target regions of the same type appearing in the same video frame. Information about the target region which has been processed by the region processing unit 104 is input to the object recognition unit 105. The object recognition unit 105 performs clustering of target object based on the feature of a target object included in each target region which has been input, and decides the feature of a target object representing each cluster. Then, the object recognition unit 105 refers to a database associating features of target objects and identification information of the target objects, and associates, based on the feature of the target object representing each cluster, identification information of the target object with each cluster.

Information about each target region appearing in each video frame and the identification information of a target object corresponding to each target region are acquired at this stage. That is, a section in which a target object appears (the section metadata) and the position and the range of a target object in each video frame (the region metadata) are obtained for each type of target object sorted based on the identification information. However, the section metadata and the region metadata obtained by the video analysis block include the influence of erroneous detection, failed detection, erroneous recognition or the like which may have occurred at the time of object detection/object tracking and the object recognition. Thus, the section metadata and the region metadata obtained by the video analysis block have to be manually corrected.

The section metadata and the region metadata obtained by the video analysis block are input to the metadata providing unit 106, the reproduction control unit 107, and the movement distance calculation unit 110.

The metadata providing unit 106 corrects the section metadata and the region metadata obtained by the video analysis block, based on information about a target region input by a user via the input unit 109. However, in the case the video analysis block is omitted, the metadata providing unit 106 creates the section metadata and the region metadata based on the information about a target region input by a user via the input unit 109. Then, the metadata providing unit 106 provides the region metadata and the section metadata to the metadata management system 20. Additionally, in the case object metadata is input by a user, the metadata providing unit 106 provides the input object metadata to the metadata management system 20.

The reproduction control unit 107 reproduces a video and causes the display unit 108 to display the video. Additionally, to assist an input operation of a user, the reproduction control unit 107 adjusts the reproduction speed of the video or skips reproduction of some video frames. Furthermore, the reproduction control unit 107 displays information about a target region specified by the user, or displays a menu for adding object metadata to the target region. Additionally, a detailed function of the reproduction control unit 107 will be described later.

The display unit 108 is a display device such as an LCD (Liquid Crystal Display) or an ELD (Electro-Luminescence Display). Also, the input unit 109 is an input device such as a touch panel, a touch pad, a mouse, a remote control, a game controller, an eye-gaze input device, a gesture input device, or an audio input device. Additionally, the gesture input device is a device that detects a movement of a user by using a camera, a sensor or the like, and that identifies the movement of the user based on the detection result. In the following, an explanation will be given assuming a case where a touch panel is used as the input device.

The movement distance calculation unit 110 calculates the movement distance of a target region in adjacent video frames. For example, the movement distance calculation unit 110 uses the region metadata obtained by the video analysis block, and calculates the distance that the target region of the same target object moved over the adjacent video frames. This distance is used for determination of a video frame to be skipped. Also, the movement distance calculation unit 110 calculates the movement distance of a target region input by a user via the input unit 109. This movement distance is used for the adjustment of reproduction speed. Information about the distance calculated by the movement distance calculation unit 110 is input to the reproduction control unit 107 and the metadata providing unit 106.

The similarity score calculation unit 111 calculates for adjacent video frames a similarity score between the video frames. For example, the similarity score calculation unit 111 calculates the similarity score between video frames using a method described in JP 2007-206920A. This similarity score is used for determination of a video frame to be skipped. The similarity score calculated by the similarity score calculation unit 111 is input to the reproduction control unit 107 and the metadata providing unit 106.

In the foregoing, a main functional configuration of the metadata providing terminal 10 has been described.

[2-3: Operation of Metadata Providing Terminal 10]

Next, operations of the metadata providing terminal 10 will be described with reference to FIGS. 11 to 35. Also, the explanation on the detailed functional configuration of the metadata providing terminal 10 will be supplemented. FIGS. 11 to 35 are explanatory diagrams for describing operations of the metadata providing terminal 10.

(2-3-1: Preprocessing)

Figure 11:
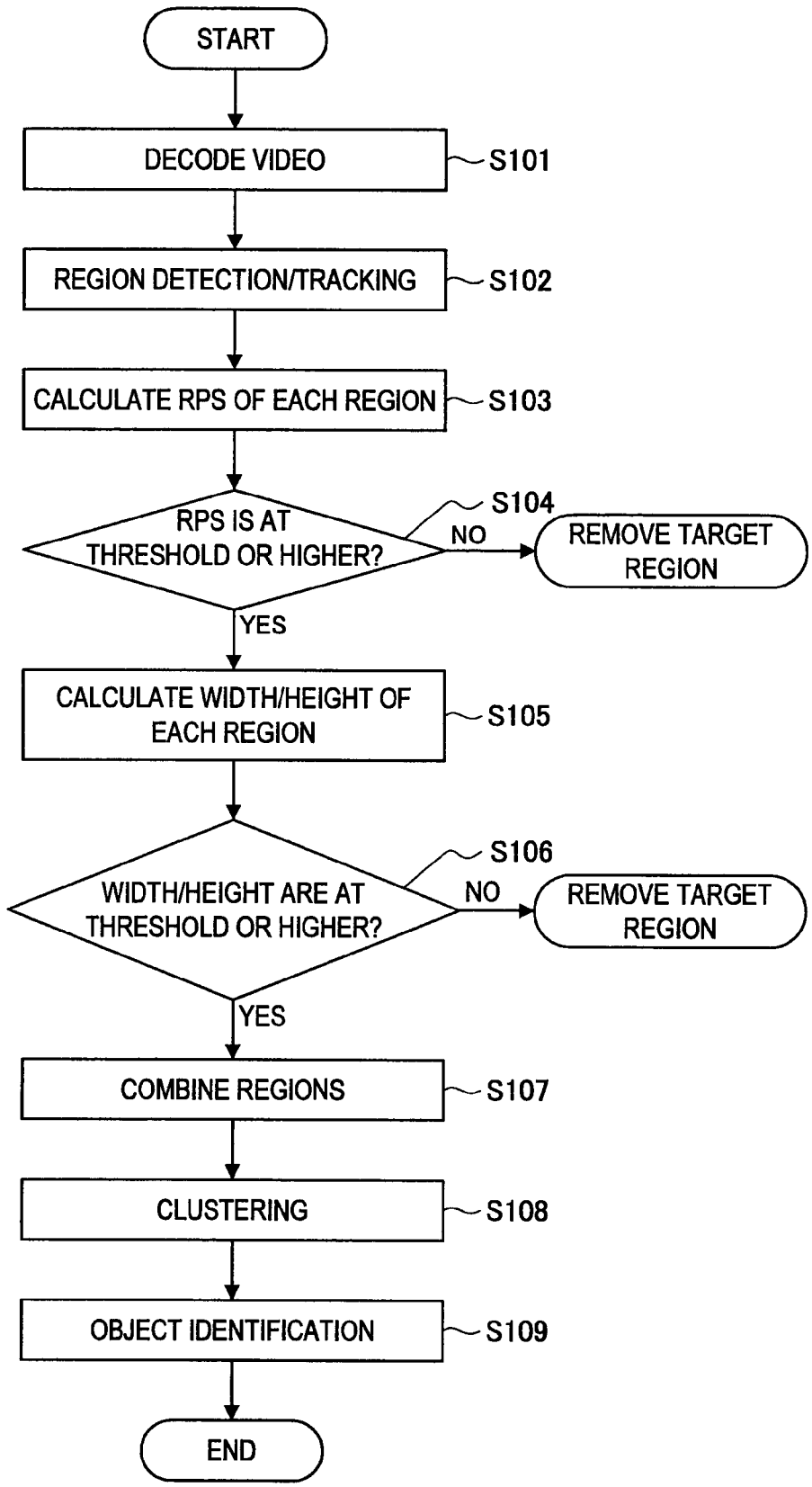
FIG. 11 is an explanatory diagram for describing a flow of preprocessing in the process regarding provision of the video timeline metadata.

First, an operation of the metadata providing terminal 10 related to the preprocessing (step S10 in FIG. 9) will be described with reference to FIG. 11. FIG. 11 is an explanatory diagram for describing an operation of the metadata providing terminal 10 related to the preprocessing.

As shown in FIG. 11, the metadata providing terminal 10 decodes a video read from the storage unit 101, by the function of the decoder 102 (S101). Then, the metadata providing terminal 10 performs detection and tracking of a target region by the function of the region extraction unit 103 (S102). Additionally, detection and tracking of a target region can be realized by using a technology described in JP 2005-44330A, for example.

Figure 12:
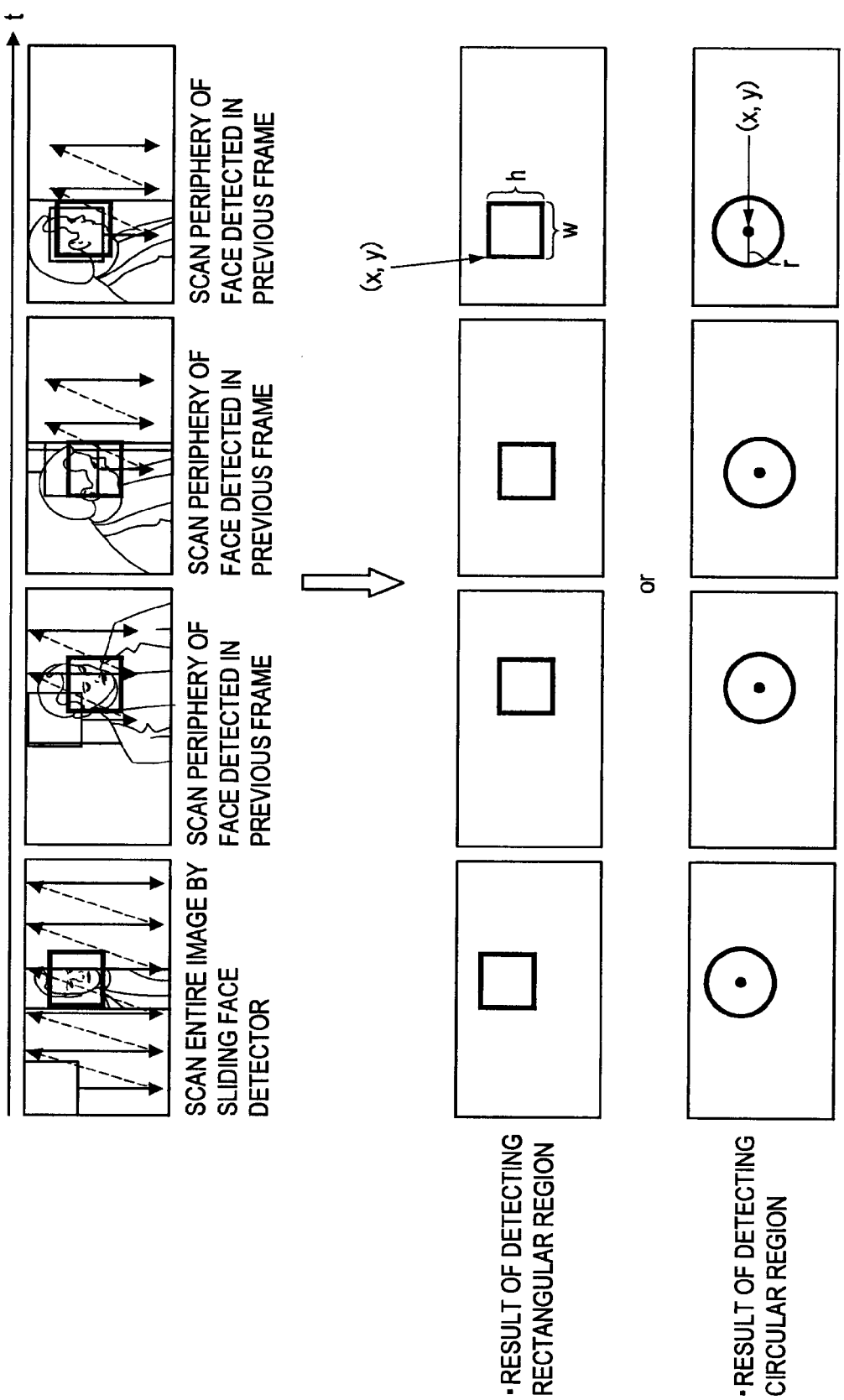
FIG. 12 is an explanatory diagram for describing the details of preprocessing.

In the case a target object is the face of a person, the region extraction unit 103 detects a target region (a face region in this case) by a method as shown in FIG. 12. First, the region extraction unit 103 scans the entire image of one video frame by moving a face detector (a rectangular window in the example of FIG. 12) and detects a face region. Then, the region extraction unit 103 attempts to detect a face region with respect to the next video frame while moving the face detector. At this time, the region extraction unit 103 detects a face region by scanning the periphery of the face region detected in the previous video frame. Then, the region extraction unit 103 detects, while moving the face detector with respect to the next video frame, a face region by scanning the periphery of the face region detected in the previous video frame.

Figure 13:
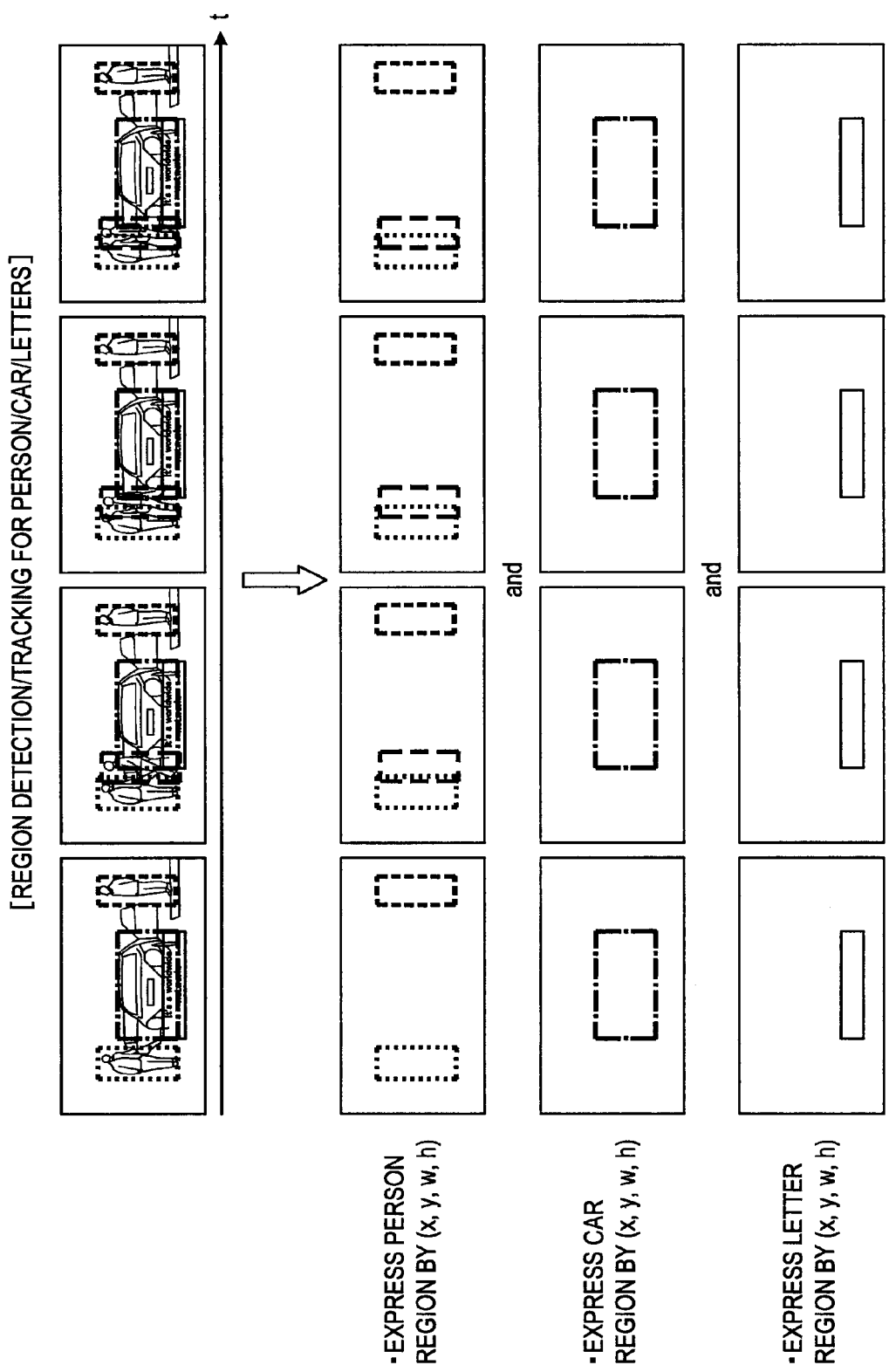
FIG. 13 is an explanatory diagram for describing the details of preprocessing.

The example of FIG. 12 shows the details of processes related to detection and tracking of a face region, but the detection and tracking of a region can be performed in the same manner also with respect to a whole person, a car, letters and the like, as shown in FIG. 13. The example of FIG. 13 shows the details of processes related to detection and tracking of a person region, a car region, and a letter region. Additionally, the shape of a target region may be rectangular, as shown in FIG. 12, or may be circular or any other shape. In the case the shape of a target region is rectangular, the position and the range of the target region is expressed by coordinates (x, y) with respect to the upper left corner, the height h, and the width w, for example. On the other hand, in the case the shape of a target region is circular, the position and the range of the target region is expressed by centre coordinates (x, y) and the radius r, for example.

Reference will be again made to FIG. 11. The metadata providing terminal 10 which has detected a target region in the above manner calculates an RPS (Region Priority Score) of each target region by the function of the region processing unit 104 (S103). This RPS is defined by Expression (1) below. The Type indicates a score that is in accordance with the type (for example, a face, a person, a letter, an object, or the like) of a target object included in the target region. Also, the Sqr indicates a score that is in accordance with the area that the target region takes up in one whole video frame. Furthermore, the ΔT indicates the length of time of appearance of the target region. Furthermore, the α, β and γ indicate normalization factors.

$$RPS = \alpha * Type + \beta * Sqr + \gamma * \Delta T \quad (1)$$

Figure 14:
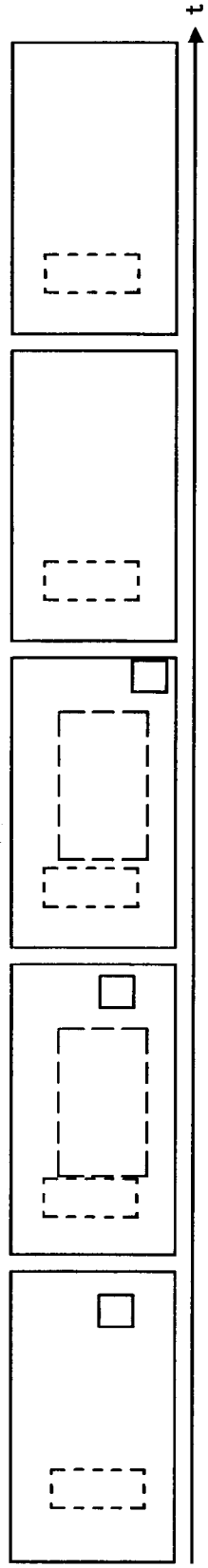
FIG. 14 is an explanatory diagram for describing the details of preprocessing.

For example, as shown in FIG. 14, it is assumed that a person region, a car region and an animal region are detected as a result of detecting target regions with five video frames as targets. Additionally, in the example of FIG. 14, the person region is present in the first to fifth video frames, the car region is present in the second and third video frames, and the animal region is present in the first to third video frames. Also, it is assumed that a score Type=5.0 is assigned to the person region, a score Type=1.0 is assigned to the car region, a score Type=3.0 is assigned to the animal region.

Also, it is assumed, based on the detection result of the target regions, that a Sqr corresponding to the area of the person region is 2.0, a Sqr corresponding to the area of the car region is 8.0, and a Sqr corresponding to the area of the animal region is 3.0. Furthermore, it is assumed that the appearance time of the person region is ΔT=5.0, the appearance time of the car region is ΔT=2.0, and the appearance time of the animal region is ΔT=3.0. In this case, when α=β=γ=1, the RPS of the person region will be RPS(person)=5.0+2.0+5.0=12.0. Likewise, the RPS of the car region will be RPS(car)=1.0+8.0+2.0=11.0. Also, the RPS of the animal region will be RPS(animal)=3.0+1.0+3.0=7.0.

Reference will be again made to FIG. 11. After calculating the RPS of the target region for each type of target object in the manner described above, the metadata providing terminal 10 determines, by the function of the region processing unit 104, whether or not each RPS is at a predetermined threshold or higher (S104). Then, the metadata providing terminal 10 removes the target region whose RPS is below a predetermined threshold, by the function of the region processing unit 104. That is, the metadata providing terminal 10 removes the target region whose RPS is below a predetermined threshold from the detection result of target regions by the region extraction unit 103. For example, in the case of FIG. 14, when a predetermined threshold is 8.0, the animal region is removed from the detection result of target regions.

Figure 15:
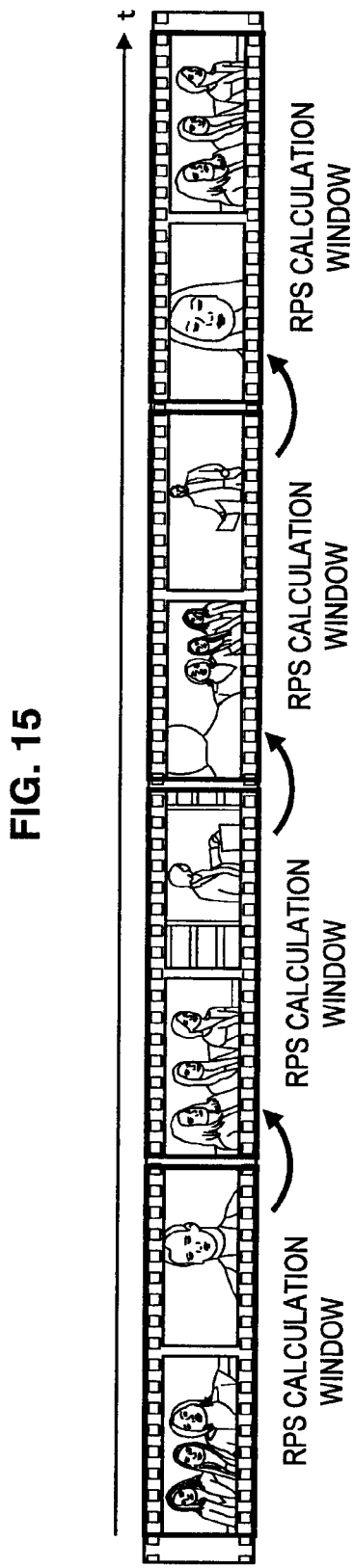
FIG. 15 is an explanatory diagram for describing the details of preprocessing.

Additionally, the calculation of the RPS may be performed taking the entire video as the target, or it may be performed, as shown in FIG. 15, taking as the target a video frame group included in an RPS calculation window, which is formed from a predetermined number of video frames, while moving the RPS calculation window. When calculating the RPS based on a unit of the RPS calculation window, a target region where the RPS calculated for each RPS calculation window is below a predetermined threshold is removed from the target regions detected within the video frames included in each RPS calculation window.

Reference will be again made to FIG. 11. After removing the target region whose RPS is below a predetermined threshold in the manner described above, the metadata providing terminal 10 calculates, by the function of the region processing unit 104, the width and height of the remaining target regions (the radius in the case the target regions are circular) (S105). Then, the metadata providing terminal 10 removes, by the function of the region processing unit 104, the target region whose width or height is below a predetermined threshold (S106). That is, the metadata providing terminal 10 removes, by the function of the region processing unit 104, the target region whose width or height is below a predetermined threshold from the target regions whose RPSs are at a predetermined threshold or higher.

Figure 16:
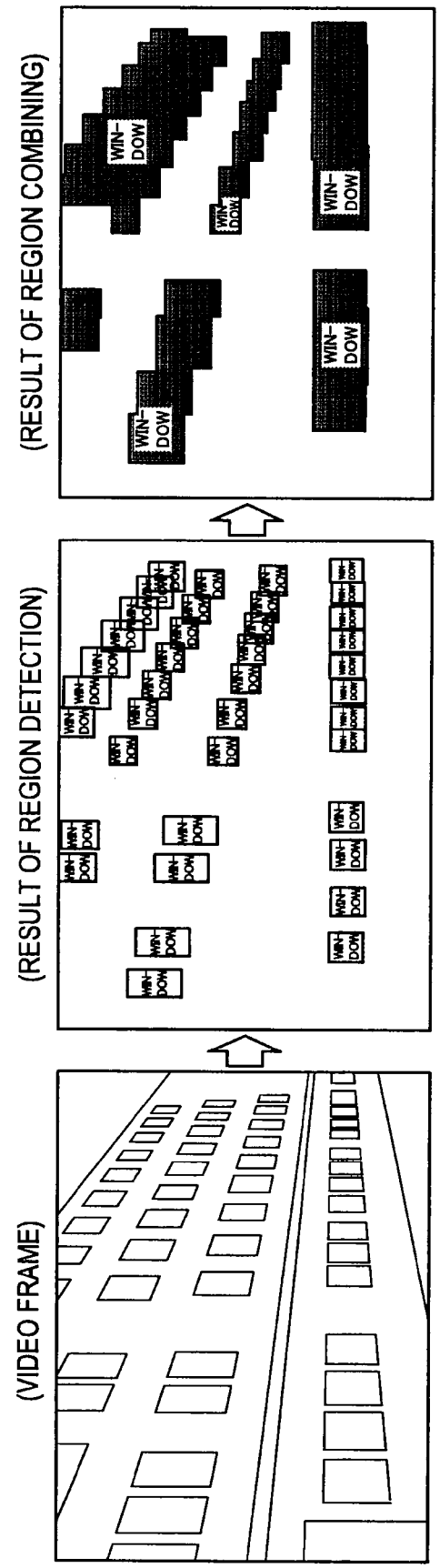
FIG. 16 is an explanatory diagram for describing the details of preprocessing.

Next, the metadata providing terminal 10 combines, by the function of the region processing unit 104, target regions of the same type located near each other within the same video frame (S107). As shown in FIG. 16, in the case a plurality of target regions with small size are located near one another, the region processing unit 104 creates a large target region by combining the plurality of target regions. Additionally, in the example of FIG. 11, the threshold determination for the width and height of a target region is performed in step S106, but modification is possible where the processes of steps S105 and S106 are performed after step S107. With this modification, small target regions which will become large by combination can be remained unremoved.

Figure 17:
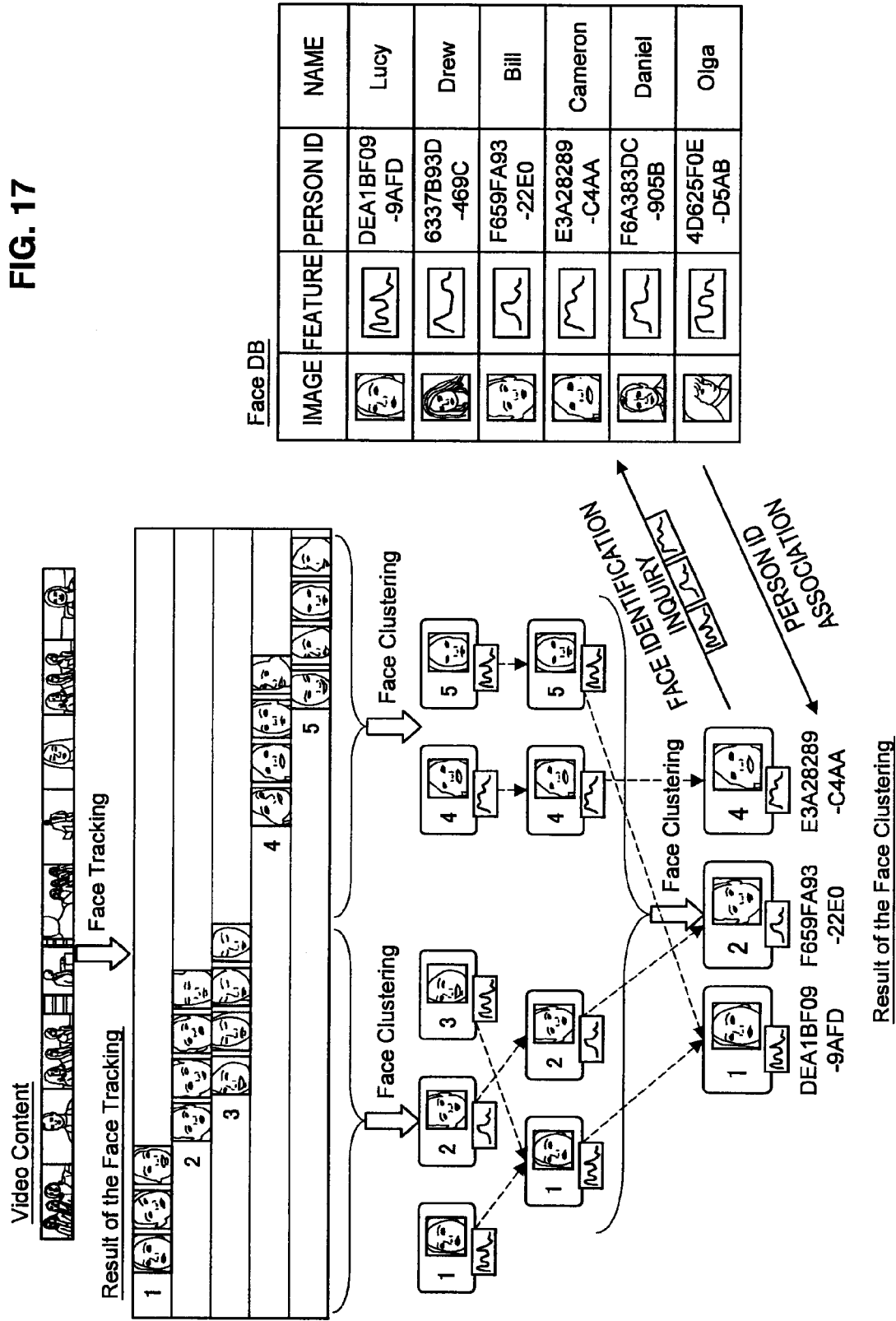
FIG. 17 is an explanatory diagram for describing the details of preprocessing.

The metadata providing terminal 10 which has combined the target regions performs clustering on target regions by the function of the object recognition unit 105 (S108). For example, as shown in FIG. 17, it is assumed that five face-tracked sections (detection results 1 to 5) are detected from a video (Video Content) as the result of face detection/face tracking (Result of the Face Tracking). In this case, the object recognition unit 105 integrates a plurality of face-tracked sections related to one same person, based on the feature of the face included in each detection result. In the example of FIG. 17, the feature of the face is assumed to be similar between the detection result 1 and the detection result 3. In this case, the object recognition unit 105 causes the face region corresponding to the detection result 3 to belong to the same cluster as the face region corresponding to the detection result 1, and integrates the corresponding two face-tracked sections.

Furthermore, in the example of FIG. 17, the feature of the face is assumed to be similar between the detection result 1 and the detection result 5. In this case, the object recognition unit 105 causes the face region corresponding to the detection result 5 to belong to the same cluster as the face region corresponding to the detection result 1, and integrates the corresponding two face-tracked sections. On the other hand, it is assumed that the features of the faces are different among the detection results 1, 2, and 4. In this case, the face-tracked sections are not integrated among the detection results 1, 2, and 4. As a result, a cluster 1 to which the face regions corresponding to the detection results 1, 3, and 5 belong, a cluster 2 to which the face region corresponding to the detection result 2 belongs, and a cluster 4 to which the face region corresponding to the detection result 4 are obtained.

Reference will be again made to FIG. 11. Clustering is performed in the similar manner also for other than the face. After performing the clustering, the metadata providing terminal 10 associates identification information with each cluster by the function of the object recognition unit 105 (S109). For example, as shown in FIG. 17, the object recognition unit 105 refers to a face database associating the feature of a face and identification information for identifying a specific person (a person ID), and identifies a person ID corresponding to each cluster based on the feature of the face representing each cluster. Then, the object recognition unit 105 associates the person ID which has been identified with a cluster. Additionally, the face database may be held in the metadata providing terminal 10, or may be held in the metadata management system 20 or an external appliance.

Additionally, the clustering in step S108 can be realized by using the technology described in JP 2010-3021A, for example. Also, the identification of a target object based on a feature in step S109 can be realized by using the technology described in JP 2007-65766A, for example.

In the foregoing, an operation of the metadata providing terminal 10 related to preprocessing has been described. By the processes described above, information about a section in which a certain target object appears, a region in each video frame where the target object appears, and identification information for identifying the target object are obtained. That is, the region metadata and the section metadata are obtained. However, these region metadata and section metadata have been automatically detected based on the object detection/object tracking technology and the object recognition technology, and are assumed to include the influence of erroneous detection, failed detection, erroneous identification or the like. Thus, manual labeling of metadata is indispensable.

(2-3-2: Labeling Process)

Figure 18:
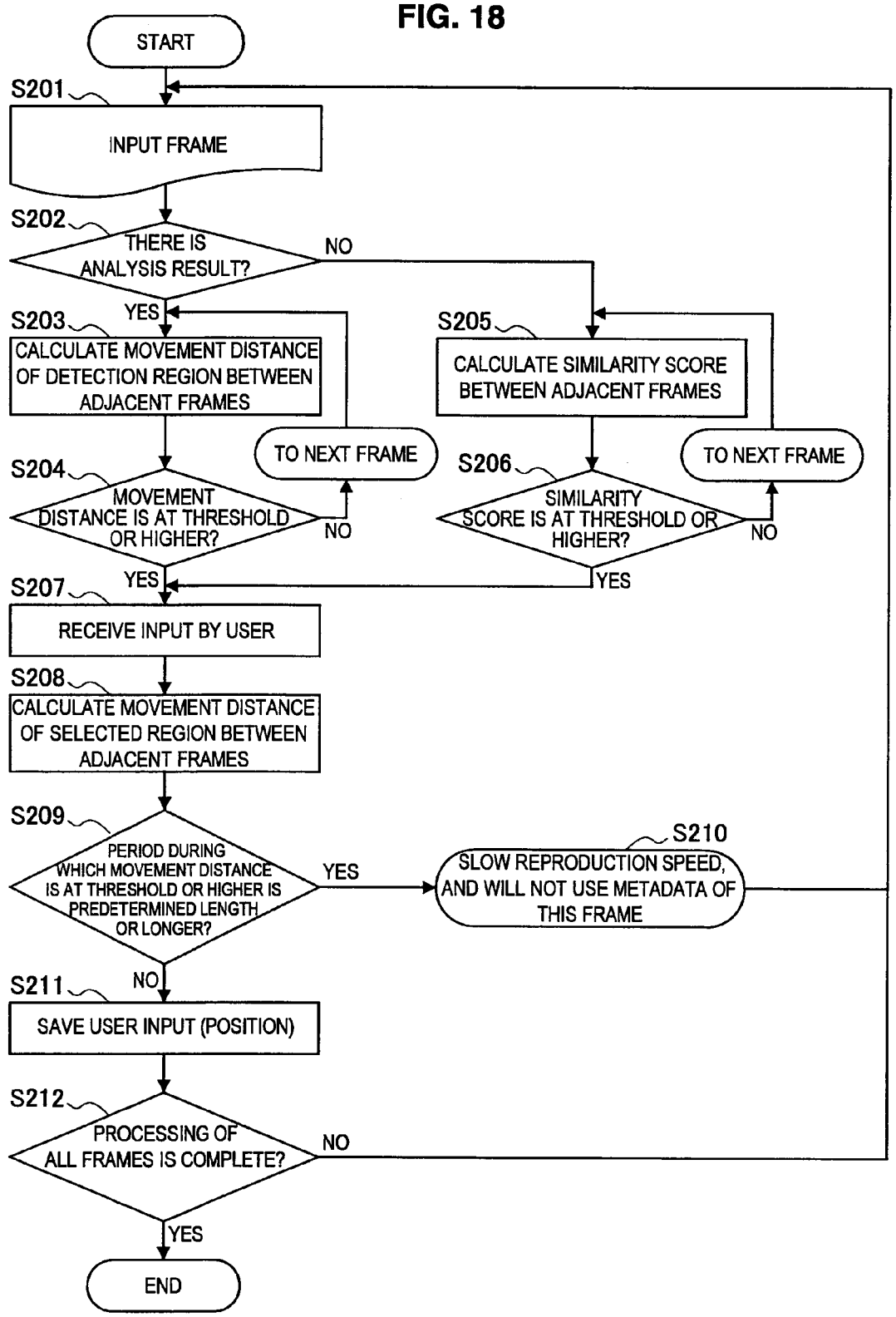
FIG. 18 is an explanatory diagram for describing a flow of labeling processing of metadata in the process regarding provision of the video timeline metadata.

In the following, an operation of the metadata providing terminal 10 related to a labeling operation by a user (step S20 in FIG. 9) will be described with reference to FIG. 18. FIG. 18 is an explanatory diagram for describing an operation of the metadata providing terminal 10 related to a labeling operation by a user.

As shown in FIG. 18, the metadata providing terminal 10 prepares a video frame which is to be the target of labeling (hereinafter, a target frame) (S201). Then, the metadata providing terminal 10 determines whether there exists an analysis result (region metadata created by the video analysis block, or the like) with respect to the target frame (S202). In the case an analysis result exists, the metadata providing terminal 10 proceeds with the process to step S203. On the other hand, in the case an analysis result does not exist, the metadata providing terminal 10 proceeds with the process to step S205.

In the case of proceeding to step S203, the metadata providing terminal 10 calculates, by the function of the movement distance calculation unit 110, the movement distance of a target region between a target frame and a video frame adjacent to the target frame (S203). Additionally, in the case a plurality of target regions are included in the target frame, the movement distance calculation unit 110 calculates a representative value (for example, an average or a median) of movement distances calculated for the plurality of target regions. Then, the metadata providing terminal 10 determines, by the function of the reproduction control unit 107, whether or not the movement distance is at a predetermined threshold or higher (S204).

Figure 20:
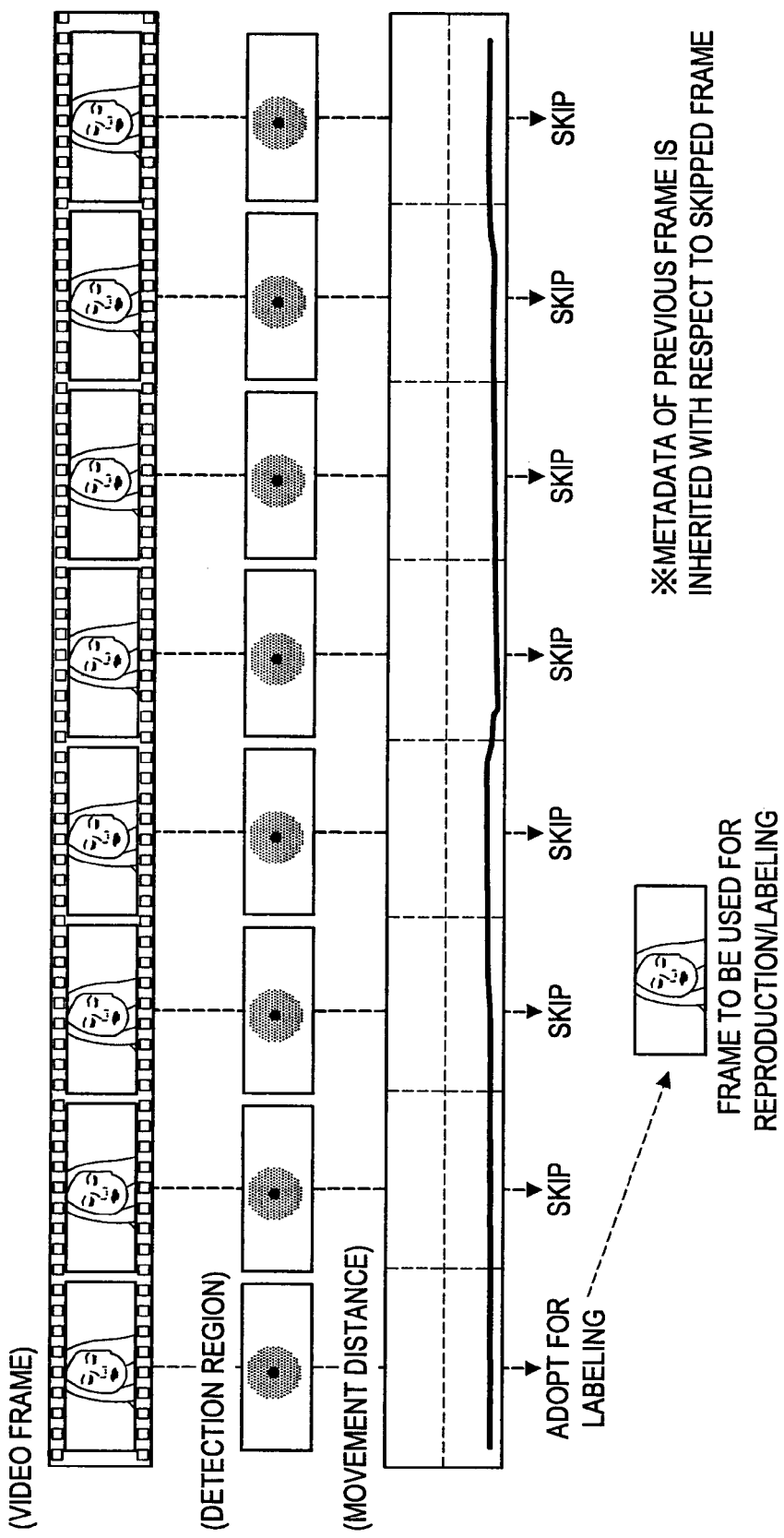
FIG. 20 is an explanatory diagram for describing the details of a process regarding labeling.

In the case the movement distance is at a predetermined threshold or higher, the metadata providing terminal 10 proceeds with the process to step S207. On the other hand, in the case the movement distance is below a predetermined threshold, the metadata providing terminal 10 sets a video frame located next to the current target frame to the new target frame, and proceeds with the process to step S203. That is, in the case the movement distance of a target region is short and there is hardly a change in the position of the target region, as shown in FIG. 20, the metadata providing terminal 10 skips an input opportunity of a user for the target frame. Additionally, in the case of skipping the input opportunity of a user, the metadata providing terminal 10 sets, by the function of the metadata providing unit 106, metadata set in a video frame located before the target frame to the target frame.

Reference will be again made to FIG. 18. In the case of proceeding to step S205 from step S202, the metadata providing terminal 10 calculates, by the function of the similarity score calculation unit 111, a similarity score between the target frame and a video frame adjacent to the target frame (S205). The similarity score is a score indicating the degree of similarity between video frames. Calculation of the similarity score can be realized by using the technology described in JP 2007-206920A, for example. Then, the metadata providing terminal 10 determines, by the function of the reproduction control unit 107, whether or not the similarity score is at a predetermined threshold or higher (S205).

Figure 19:
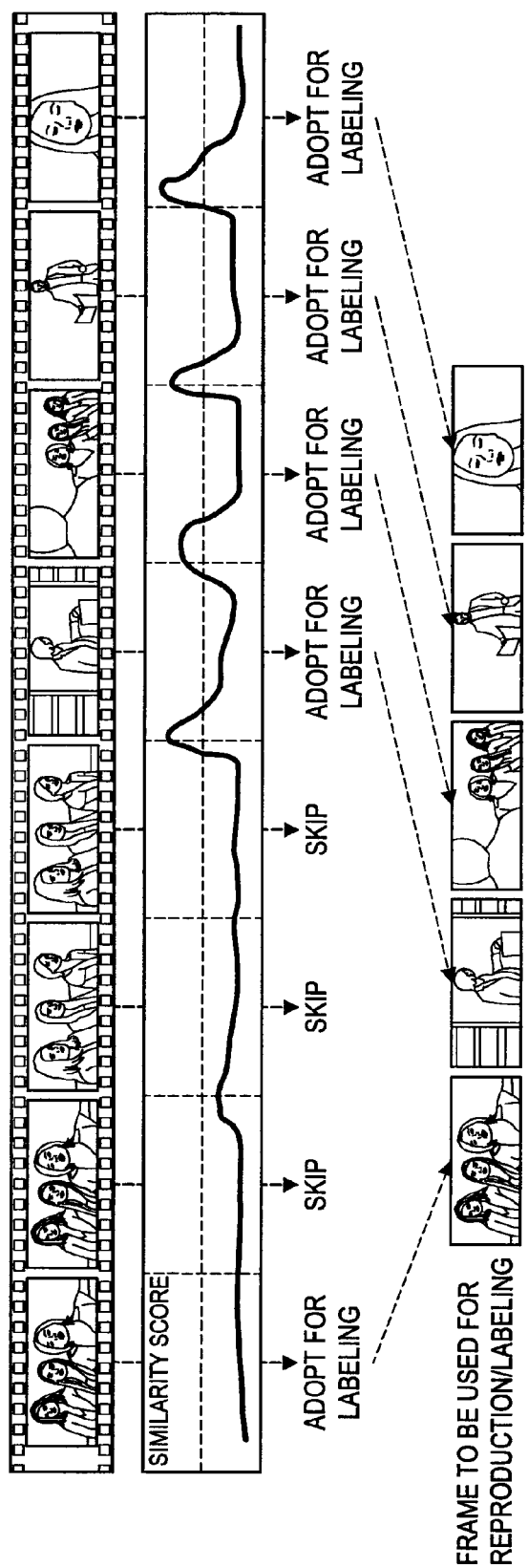
FIG. 19 is an explanatory diagram for describing the details of a process regarding labeling.

In the case the similarity score is at a predetermined threshold or higher, the metadata providing terminal 10 proceeds with the process to step S207. On the other hand, in the case the similarity score is below a predetermined threshold, the metadata providing terminal 10 sets a video frame located next to the current target frame as the new target frame, and proceeds with the process to step S205. That is, in the case there is hardly a change between a target frame and a video frame adjacent to the target frame, as shown in FIG. 19, the metadata providing terminal 10 skips an input opportunity of a user for the target frame. Additionally, in the case of skipping the input opportunity of a user, the metadata providing terminal 10 sets, by the function of the metadata providing unit 106, metadata set in a video frame located before the target frame to the target frame.

Figure 21:
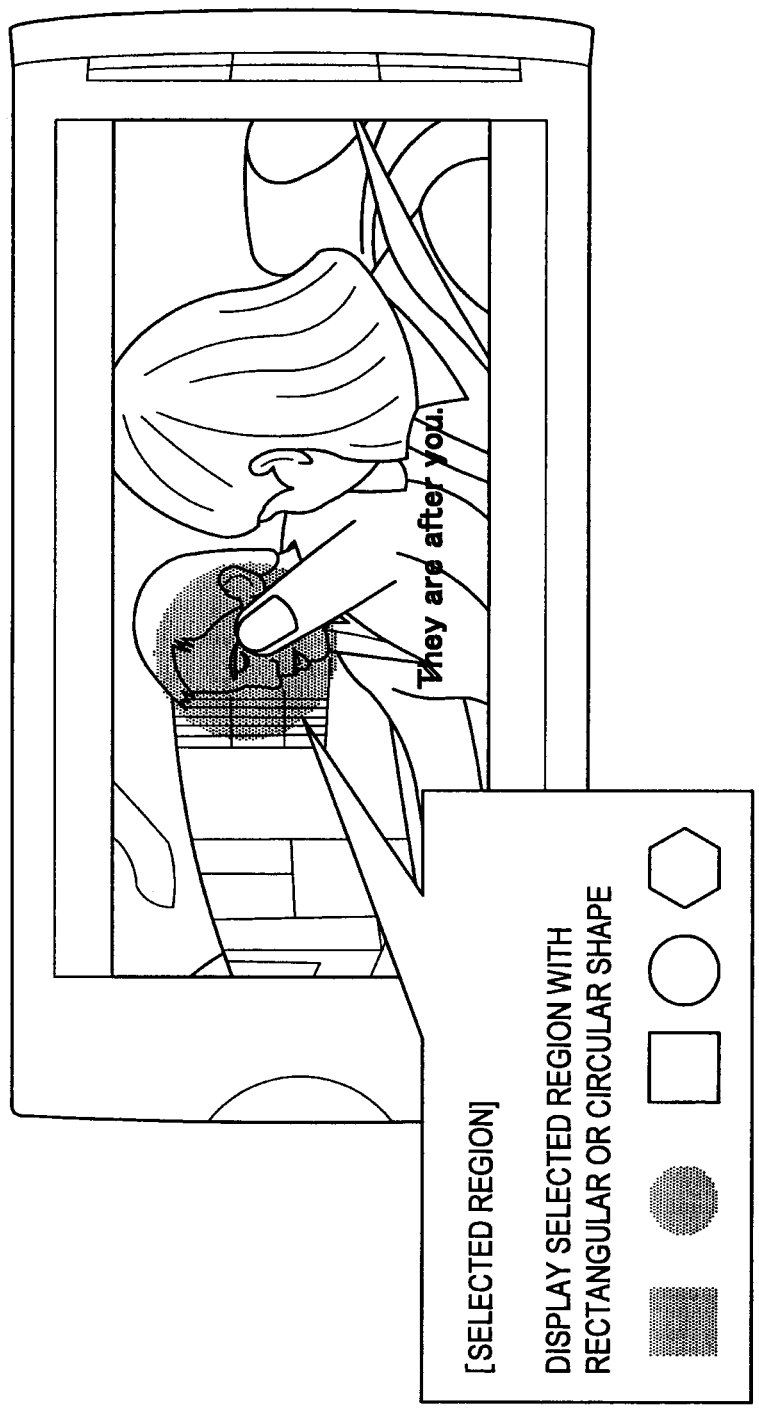
FIG. 21 is an explanatory diagram for describing the details of a process regarding labeling.
Figure 25:
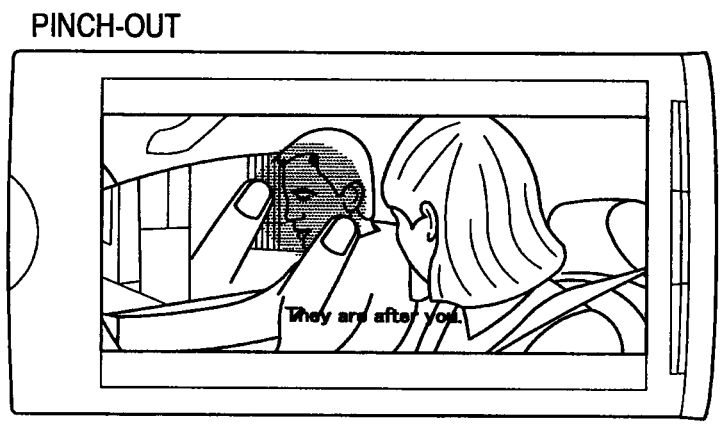
FIG. 25 is an explanatory diagram for describing the details of a process regarding labeling.
Figure 26:
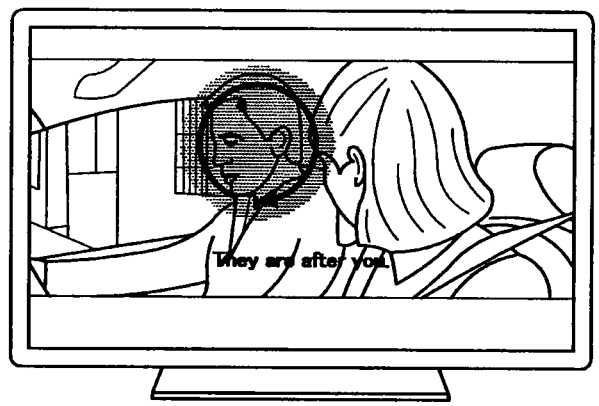
FIG. 26 is an explanatory diagram for describing the details of a process regarding labeling.

Reference will be again made to FIG. 18. In the case of proceeding to step S207, the metadata providing terminal 10 displays the target frame on the display unit 108 by the function of the reproduction control unit 107, and receives an input by a user by the function of the input unit 109 (S207). For example, in the case the input unit 109 is a touch panel, a user selects a target region while referring to the target frame displayed on the display unit 108, as shown in FIG. 21. At this time, the reproduction control unit 107 displays at the region the user has selected (a selected region) an object (expressed by hatching in FIG. 21) having a predetermined shape. Additionally, the reproduction control unit 107 may adjust the size of the object according to pressure or proximity distance (FIG. 24), or may adjust the size of the object according to pinch-in/pinch-out operations (FIG. 25) or a gesture operation (FIG. 26).

Figure 23:
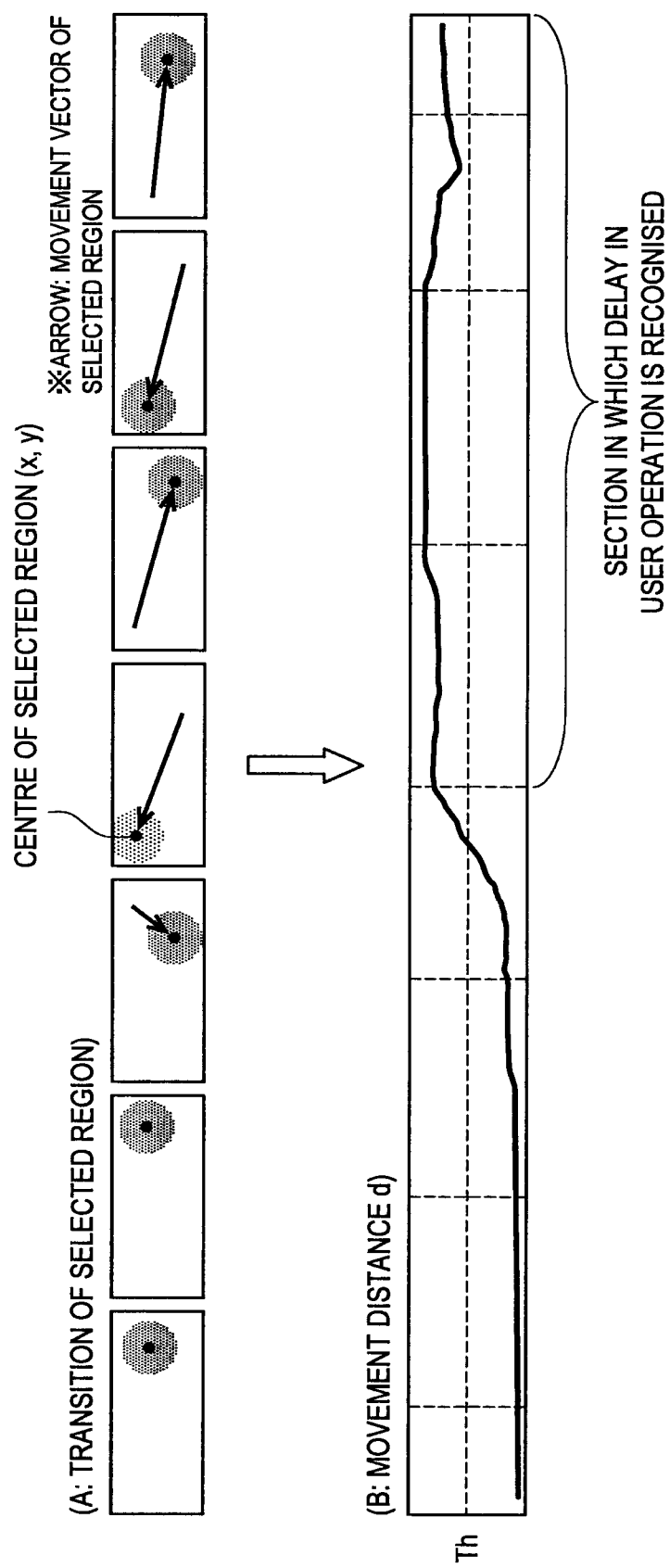
FIG. 23 is an explanatory diagram for describing the details of a process regarding labeling.

Next, the metadata providing terminal 10 calculates, by the function of the movement distance calculation unit 110, the distance between the target region selected by the user in the target frame and that in the video frame adjacent to the target frame (S208). At the time of the labeling operation, the reproduction control unit 107 reproduces the video at a speed slower than the normal reproduction speed. However, with respect to scenes where a target object is moving fast or scenes where selection of a target region is difficult, an operation of the user may not be able to follow the switching between the scenes and erroneous selection of a target region may be performed. Thus, as shown in FIG. 23, the metadata providing terminal 10 calculates the movement distance of a target region selected by the user, and detects a delay in a user operation based on the movement distance.

The metadata providing terminal 10, which has calculated the movement distance, determines, by the function of the reproduction control unit 107, whether or not a section in which the movement distance is at a predetermined threshold or higher continues for a predetermined length or longer (S209). That is, in the case a section in which the movement distance is at a predetermined threshold or higher continues for a predetermined length or longer, the metadata providing terminal 10 assumes that there is a delay in the user operation. In the case of detecting a delay in the user operation, the metadata providing terminal 10 proceeds with the process to step S210. On the other hand, in the case a delay in the user operation is not detected, the metadata providing terminal 10 proceeds with the process to step S211.

In the case of proceeding to step S210, the metadata providing terminal 10 slows, by the function of the reproduction control unit 107, the reproduction speed of the video (S210), and proceeds with the process to step S201. In this case, the metadata providing terminal 10 avoids using information about the target region selected by the user with respect to the target frame as metadata. On the other hand, in the case of proceeding to step S211, the metadata providing terminal 10 holds, by the function of the metadata providing unit 106, information about the target region selected by the user (S211). Then, the metadata providing terminal 10 determines whether the process is complete for all the video frames (S212). In the case the process is complete for all the video frames, the metadata providing terminal 10 ends the series of processes. On the other hand, in the case there is still a video frame for which the process is not complete, the metadata providing terminal 10 proceeds with the process to step S201.

In the foregoing, an operation of the metadata providing terminal 10 related to the labeling operation has been described.

(User Interface)

Here, a supplementary explanation will be given regarding a user interface used for the labeling operation.

The labeling operation of metadata is basically a target region selection operation. That is, as shown in FIG. 21, a user detects a target object in an image displayed on a screen and selects a region including the target object, and thereby performs labeling of metadata. In the case a touch panel is used as the input device, the user can select a target region simply by touching a position at which the target object is displayed. Also, since video images are continuously reproduced, the user can select a target region simply by following, with a finger, a target object appearing in the video displayed on a screen.

Figure 22:
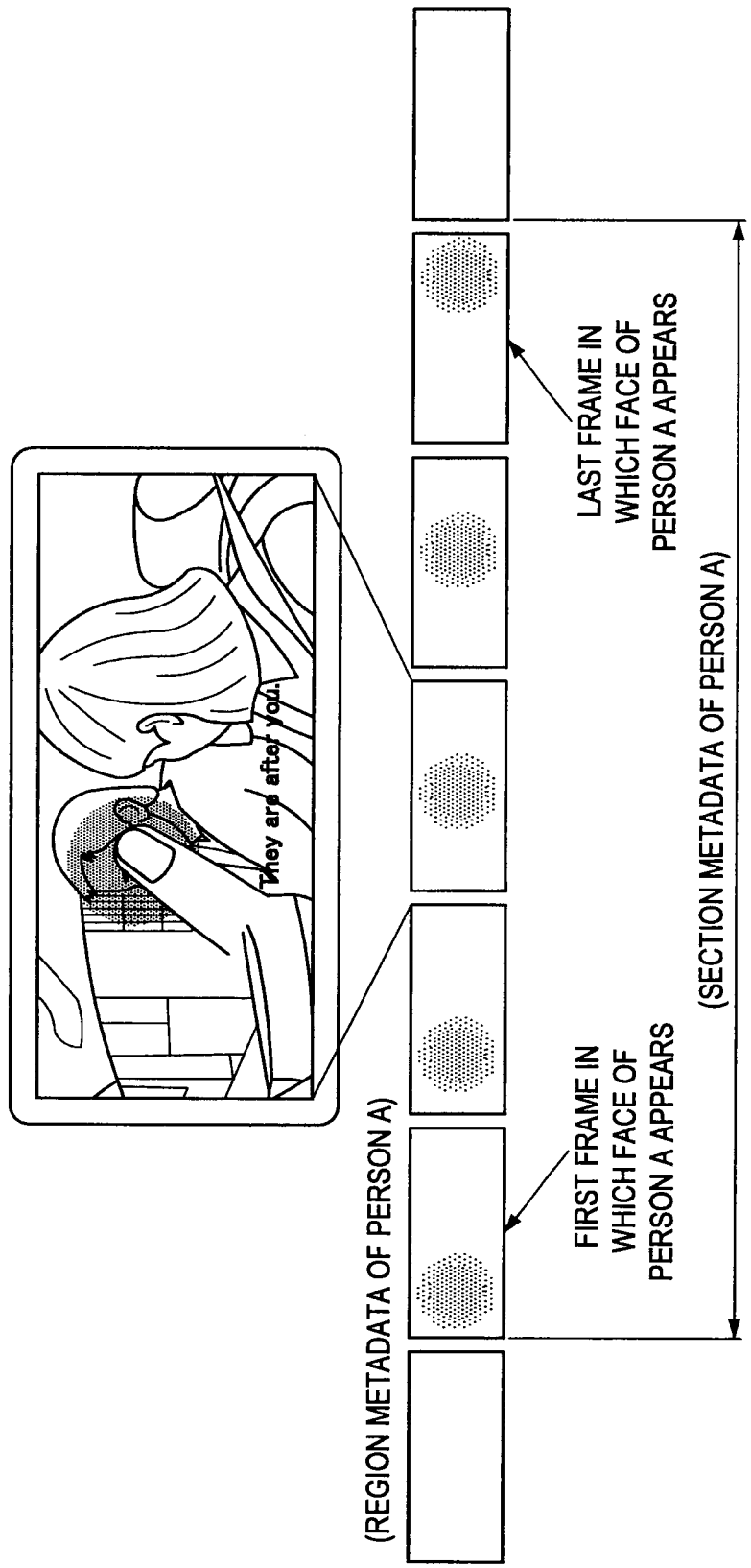
FIG. 22 is an explanatory diagram for describing the details of a process regarding labeling.

For example, in the case the face of a person A appears in the second to sixth video frame, as shown in FIG. 22, the user just has to touch the position in the second video frame at which the face of the person A appears and follow, with the finger, the face of the person A until the end of reproduction of the sixth video frame. Region metadata indicating the region in which the face of the person A appears in each of the second to sixth video frames is created by this operation. Furthermore, section metadata indicating that the face of the person A appears in sections corresponding to the second to sixth video frames is created. In this manner, the user is enabled to easily create the region metadata and the section metadata by selecting, by following, the target object appearing on the screen, while referring to the video that is being reproduced.

Figure 24:
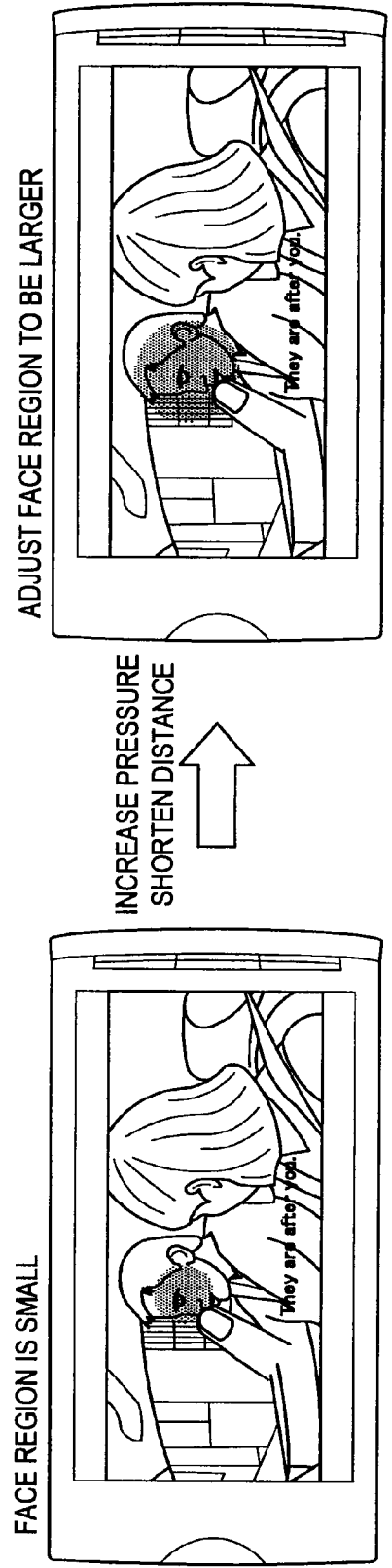
FIG. 24 is an explanatory diagram for describing the details of a process regarding labeling.

Furthermore, as shown in FIG. 24, it is also possible to have the size of a region change according to the intensity of pressure or the distance between the touch panel and a finger. Furthermore, as shown in FIG. 25, it is also possible to have the size of a selected region change according to a pinch-out operation. Also, as shown in FIG. 26, it is also possible to have the size of a selected region change according to a gesture. For example, the size of a selected region may be increased when a gesture of drawing a circle clockwise is performed, and the size of the selected region may be decreased when a gesture of drawing a circle counterclockwise is performed.

Figure 27:
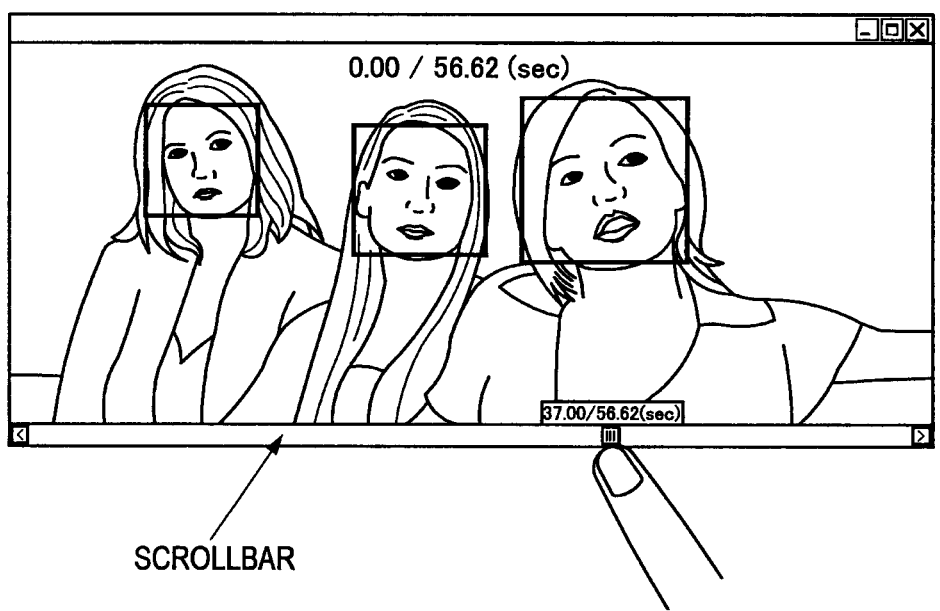
FIG. 27 is an explanatory diagram for describing the details of a process regarding labeling.

Furthermore, as shown in FIG. 27, the user may also be enabled to freely select a reproduction scene in a video by using a scrollbar or the like. Furthermore, as shown in FIG. 27, a target region (face regions in this example) may be displayed with a frame in the image of each scene based on region metadata automatically created by the video analysis block. In the case of a user correcting an analysis result of the video analysis block, it is desired that a correction operation (see FIG. 30, for example) can be performed by swiftly finding a part to be corrected. As shown in FIG. 27, if a reproduction scene can be freely selected using a scrollbar, and a frame based on an analysis result is displayed in each reproduction scene, a user is enabled to swiftly find a reproduction scene where a target region is to be corrected.

Figure 28:
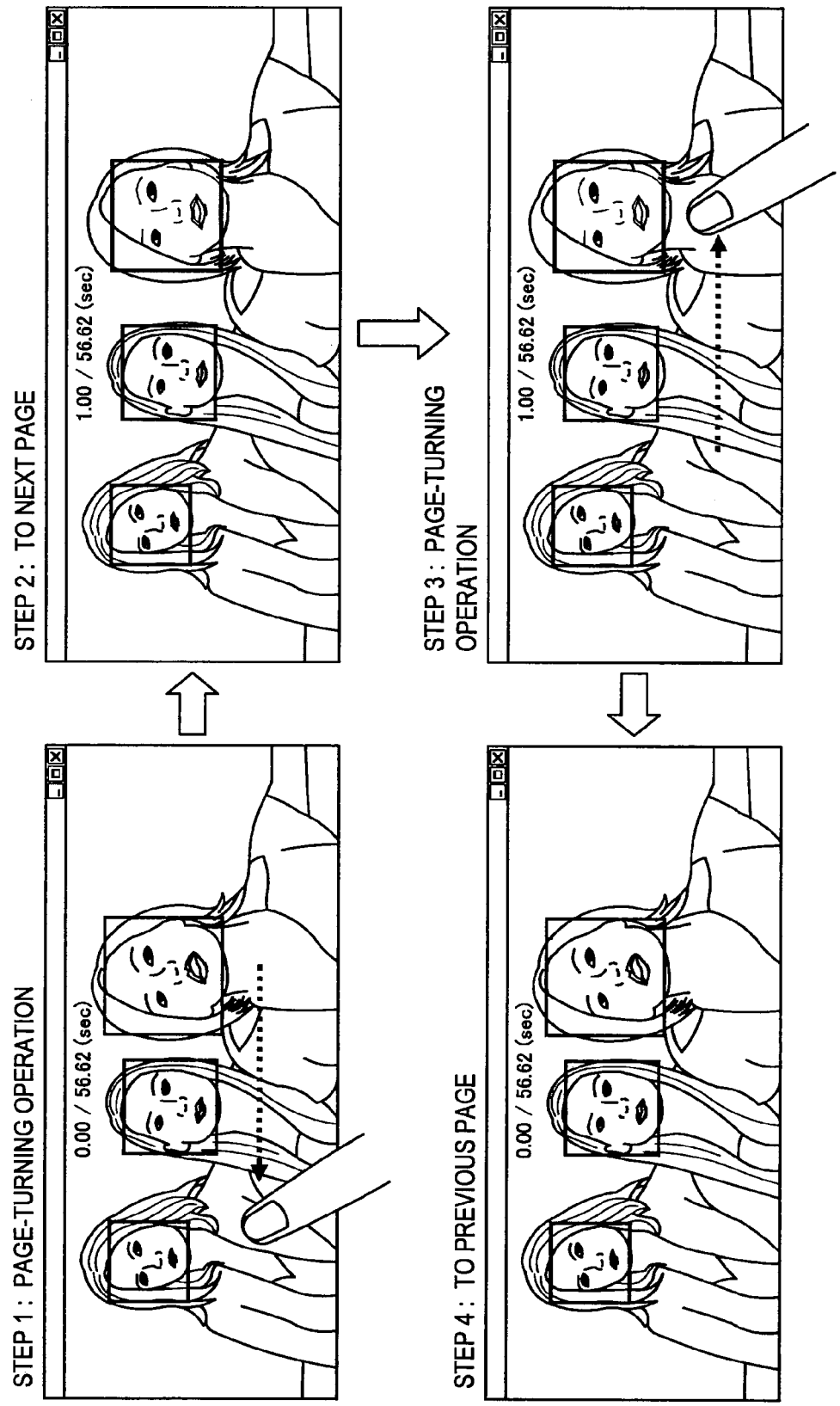
FIG. 28 is an explanatory diagram for describing the details of a process regarding labeling.

A user interface for transitioning reproduction scenes using a scrollbar is illustrated in FIG. 27, but a user interface for transitioning reproduction scenes using a flicking gesture as shown in FIG. 28 is also convenient. With this user interface, a reproduction scene transitions to the next page when a finger is slid to the left of the screen, and the reproduction scene transitions to the previous page when the finger is slid to the right of the screen. Additionally, the reproduction scene may be transitioned by one video frame by one flicking gesture, or the reproduction scene may be transitioned, by one flicking gesture, to a video frame with which the similarity score between video frames is at a predetermined threshold or higher.

Figure 29:
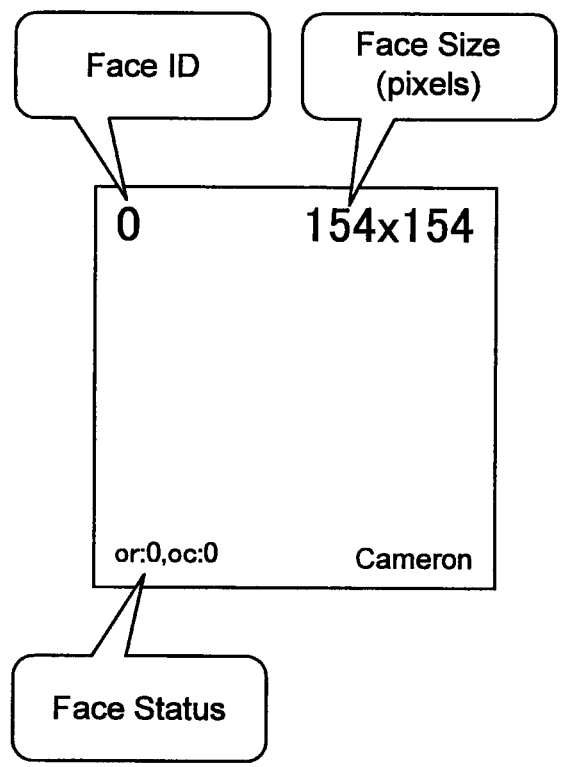
FIG. 29 is an explanatory diagram for describing the details of a process regarding labeling.
Figure 30:
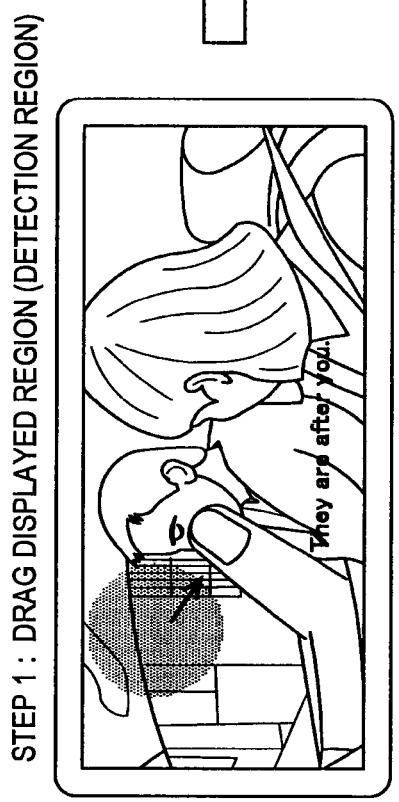
FIG. 30 is an explanatory diagram for describing the details of a process regarding labeling.
Figure 32:
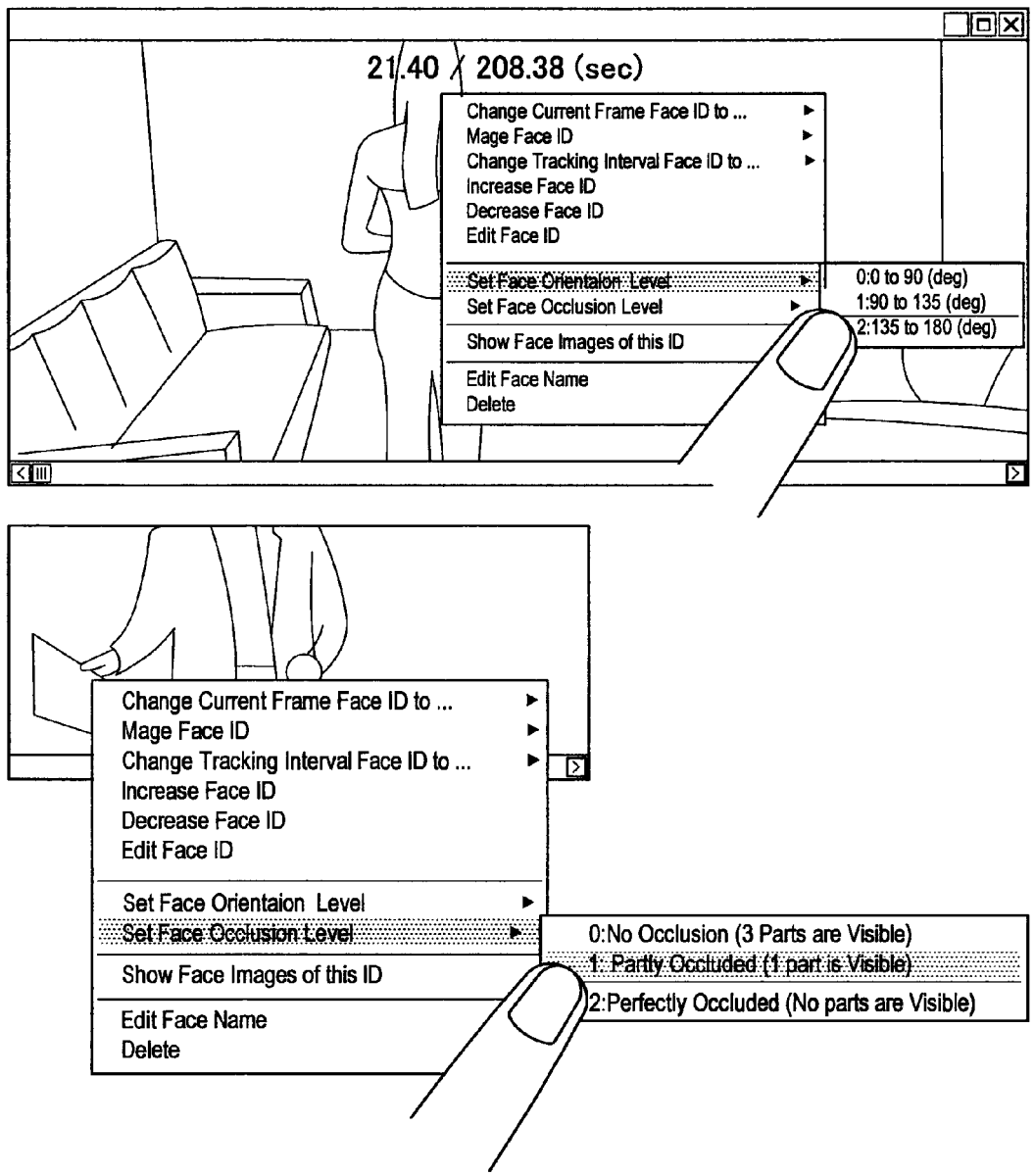
FIG. 32 is an explanatory diagram for describing the details of a process regarding labeling.

Also, as shown in FIG. 29, information about a target region may be displayed in the frame indicating the target region. FIG. 29 is an example of displaying the information of a face region, and in this case, the size of the face region, a face ID (or a person ID), property information (the direction of the face, occlusion of the face, the name of the person, or the like) and the like are displayed in the frame. Setting of the property information is performed by an operation of selecting a menu item or an input operation of letters as shown in FIGS. 31 and 32, for example. Moreover, the direction of a face may be "front", "side", "back" or the like, for example. Also, the level of occlusion may be "fully visible", "somewhat hidden", "eye, nose, or mouse can be seen", "entirely hidden" or the like, for example.

Furthermore, as shown in FIG. 33, images of target regions that were set in the past for the same target object may be displayed side by side. For example, when a face region is selected with two fingers in a certain reproduction scene, images of face regions which were set in the past for the same face as the face included in the face region are displayed side by side. With images of face regions which were set in the past displayed side by side, that a face region which was set in the past and the face of a person appearing in the current reproduction scene definitely match can be confirmed. As a result, erroneous input by a user can be prevented. Also, the user is enabled to swiftly discover an erroneous input.

Additionally, transition, by a selection of an image of a face region among the images displayed side by side, to a reproduction scene where the face region is set may also be enabled. Swift transition to a corresponding reproduction scene, at the time of discovery of an erroneous input, is thereby enabled, allowing more efficient correction of a face region. Furthermore, it is also possible to have a menu item for correction of property information displayed by selection, of an image of a face region among the images displayed side by side, with two fingers (or menu selection, double-tap, or the like). It thereby becomes possible to correct property information without transitioning a reproduction scene, allowing more efficient correction of the property information.

Figure 34:
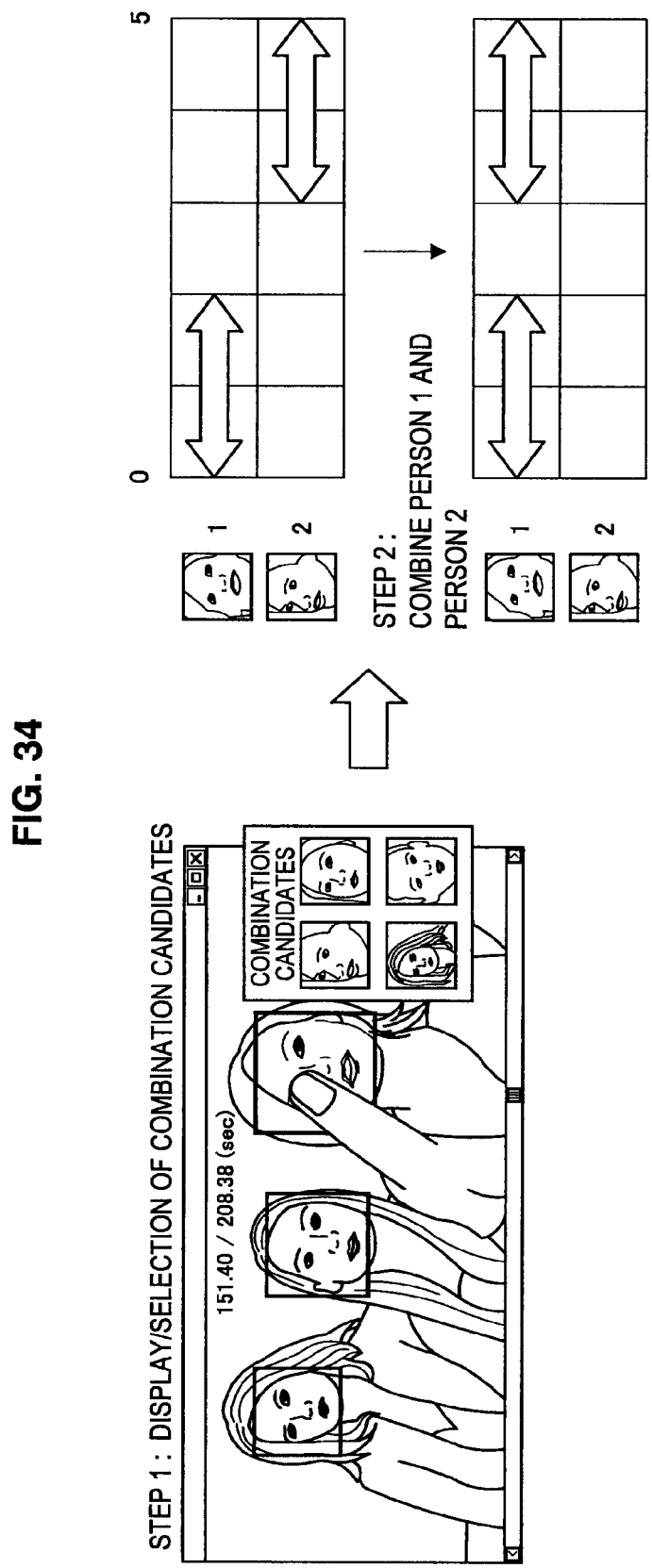
FIG. 34 is an explanatory diagram for describing the details of a process regarding labeling.

Now, when automatically processed by the video analysis block, the same target object may be recognized as different target objects. For example, in the case the same person appears in greatly separated sections in a video, those two people appearing in the sections may be recognized as different from each other. In such a case, pieces of information about the people appearing in those two sections have to be combined. Such a process of combining is performed using a user interface as shown in FIG. 34. As shown in FIG. 34, when the face region of a person appearing in a certain reproduction scene is selected with a finger (for example, menu selection or selection with three fingers), combination candidates are displayed. Then, when one person is selected among the combination candidates, information about the face region appearing in the current reproduction frame and information about the selected person are combined.

Figure 35:
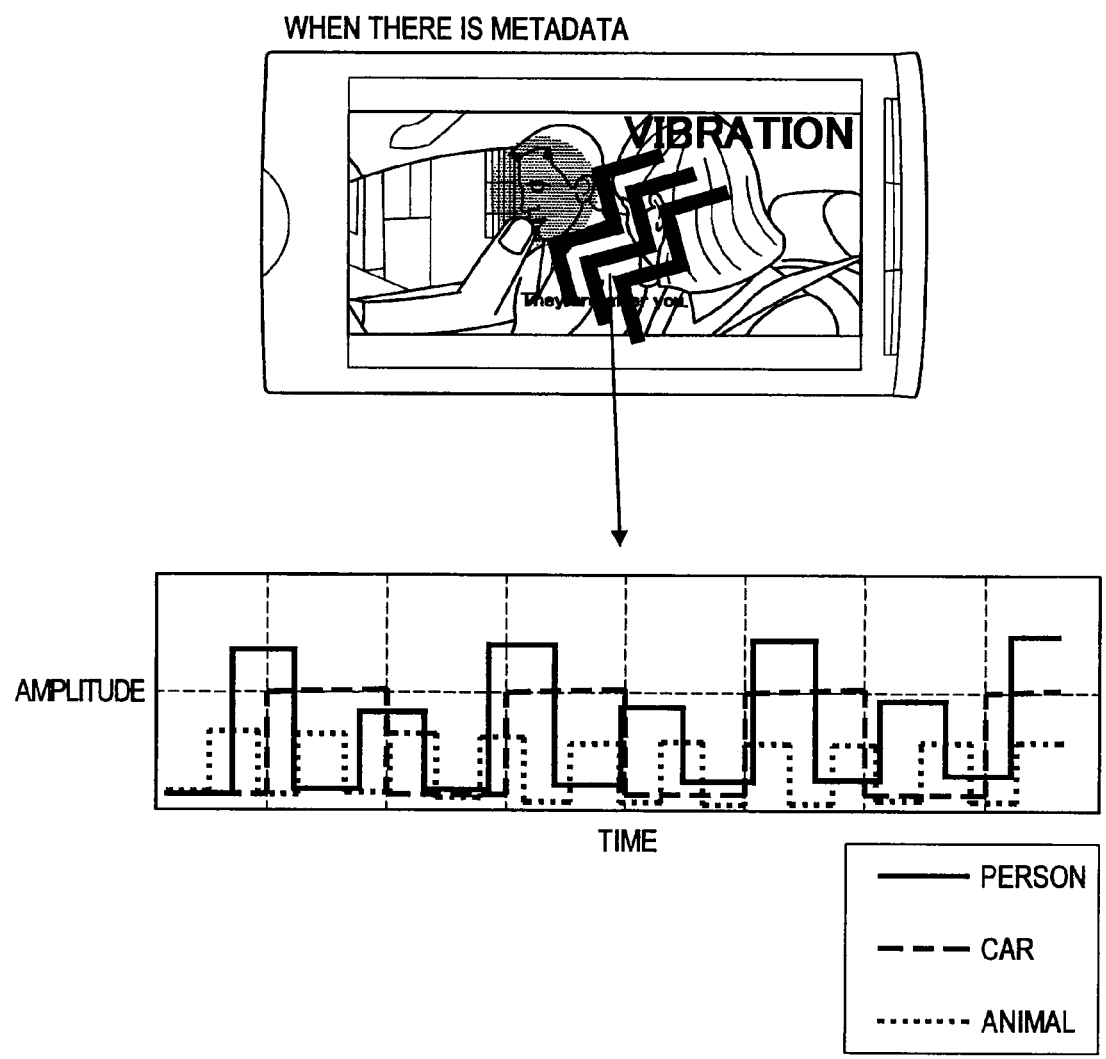
FIG. 35 is an explanatory diagram for describing the details of a process regarding labeling.

Incidentally, at the time of the labeling operation, if no feedback is returned to the user, it is hard to perceive that metadata has been added. Also, as shown in FIG. 35, by returning characteristic feedback to the user, information about metadata that is already added can be intuitively conveyed. In the example of FIG. 35, a configuration is shown where vibration patterns are different for cases where the target objects are a person, a car, and an animal. For example, when a face region to which metadata is already added is touched, vibration according to a vibration pattern for a person occurs, and a user can recognize that metadata of a person is added.

Such occurrence of feedback also contributes to motivating a user to perform the labeling operation. For example, a user may think to add metadata because no vibration feedback is obtained from a region to which metadata is not added. Also, if vibration feedback according to a vibration pattern that is in accordance with feelings of a person in a reproduction scene is returned, the labeling operation becomes like a game, and a user will start adding metadata willingly so that vibration feedback will occur. For example, vibration patterns are conceivable according to which the vibration amplitude is large when a person is angry, small when the person is calm, and smooth when the person is relaxed.

In the foregoing, a supplementary explanation has been given on the user interface that is used for the labeling operation.

[2-4: Configuration of Metadata Management System 20]

Figure 36:
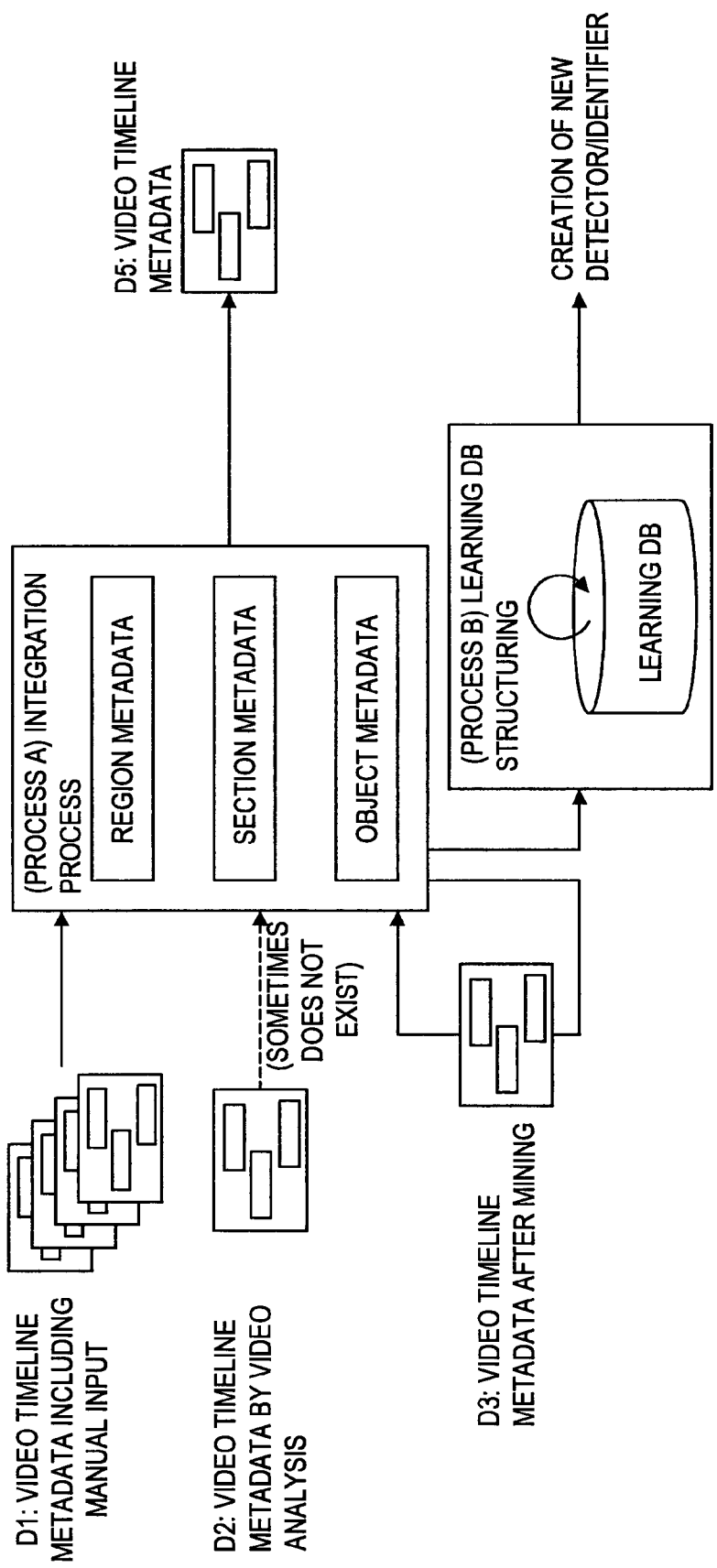
FIG. 36 is an explanatory diagram for describing a brief flow of post-processing in the process regarding provision of the video timeline metadata.
Figure 37:
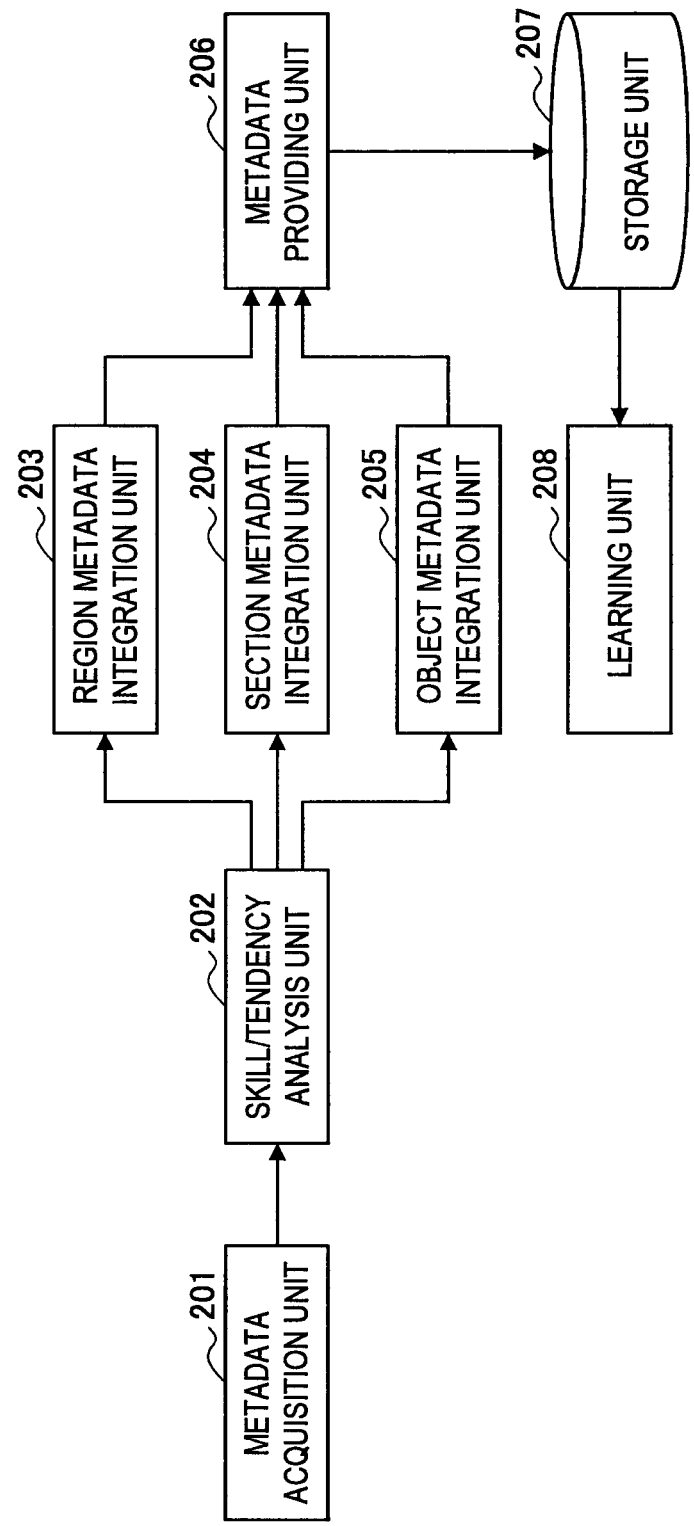
FIG. 37 is an explanatory diagram for describing an example configuration of a metadata management system.

Next, configurations of the metadata management system 20 will be described with reference to FIGS. 36 and 37. FIGS. 36 and 37 are explanatory diagrams for describing configurations of the metadata management system 20.

(Overview)

First, an overview of functions of the metadata management system 20 will be described with reference to FIG. 36. As shown in FIG. 36, the metadata management system 20 has a function of integrating pieces of video timeline metadata provided by a plurality of metadata providing terminals 10. The video timeline metadata obtained by integration is provided to the metadata user terminal 30. Furthermore, the metadata management system 20 includes a function of structuring a learning database that is used for creating a detector for detecting a target object from a video or an identifier for performing identification of a target object. As described, the metadata management system 20 mainly performs integration of pieces of video timeline metadata and structuring of a learning database. Additionally, the metadata management system 20 may also have the function of the video analysis block shown in FIG. 10.

(Functional Configuration)

Reference will now be made to FIG. 37. As shown in FIG. 37, the metadata management system 20 is mainly configured from a metadata acquisition unit 201, a skill/tendency analysis unit 202, a region metadata integration unit 203, a section metadata integration unit 204, an object metadata integration unit 205, a metadata providing unit 206, a storage unit 207, and a learning unit 208.

First, the metadata acquisition unit 201 acquires video timeline metadata from the metadata providing terminal 10. The video timeline metadata acquired by the metadata acquisition unit 201 is input to the skill/tendency analysis unit 202.

The skill/tendency analysis unit 202 analyses, based on the video timeline metadata input, the labeling skill or a tendency regarding the labeling operation of the user who has added the video timeline metadata. The analysis result of the skill/tendency analysis unit 202 is input to the region metadata integration unit 203, the section metadata integration unit 204, and the object metadata integration unit 205.

The region metadata integration unit 203 integrates a plurality of pieces of region metadata. For example, in the case a target region is a rectangle, the region metadata integration unit 203 calculates, for a plurality of target regions related to the same target object set in the same video frame, the average values of vertex coordinates, and sets the rectangular region having the average values as the vertices as the target region after integration. Also, in the case the target region is a circle, the region metadata integration unit 203 calculates, for a plurality of target regions related to the same target object set in the same video frame, the average values of centre coordinates and the average value of the radii, and sets a circular region having the average values of the centre coordinates as the new centre coordinates and the average value of the radii as the radius as the target region after integration. The region metadata after integration is input to the metadata providing unit 206.

The section metadata integration unit 204 integrates a plurality of pieces of section metadata. For example, the section metadata integration unit 204 refers to a plurality of pieces of section metadata related to the same video and the same target object, and creates section metadata after integration by setting a section which is taken, by a predetermined number or more pieces of section metadata, as an appearance section of the target object as the appearance section of the target object and setting other sections as non-appearance sections of the target object. Additionally, the section metadata integration unit 204 may create the section metadata after integration using a score that takes into consideration the skill of the user. The section metadata after integration is input to the metadata providing unit 206.

The object metadata integration unit 205 integrates a plurality of pieces of object metadata. Object metadata includes pieces of text indicating the name of an object, an attribute, a description and the like, for example. However, these pieces of text include fluctuation in the manner of writing. Thus, the object metadata integration unit 205 corrects the text so as to reduce the fluctuation in the manner of writing included in each piece of object metadata. That is, the object metadata integration unit 205 determines similar pieces of text and corrects them to a predetermined manner of writing. For example, the object metadata integration unit 205 replaces all of the writings, "Cameron Diaz", "CameronDiaz", "Cameron" and "Cameron Michelle Diaz", indicating the name of the same person by "Cameron Diaz". The object metadata after integration is input to the metadata providing unit 206.

Additionally, the fluctuation in the manner of writing of the object metadata is preferably suppressed to a certain degree at the time of a user inputting the object metadata. For example, a method is conceivable of providing a user interface that makes a user select from candidates for text without inputting the text, or of using a text completing function. Also, the fluctuation in the manner of writing may be reduced at the metadata providing terminal 10 in the same manner as at the object metadata integration unit 205.

The metadata providing unit 206 provides the region metadata after integration, the section metadata after integration, and the object metadata after integration to the metadata user terminal 30. Also, the metadata providing unit 206 stores the region metadata after integration, the section metadata after integration, and the object metadata after integration in the storage unit 207. The region metadata, the section metadata, and the object metadata stored in the storage unit 207 are used as teacher data at the time of creating the detector and the identifier of a target object by learning. When pieces of teacher data are collected, the learning unit 208 uses the collected pieces of teacher data and creates the detector and the identifier of a target object by learning. At this time, the learning unit 208 uses the technology described in JP 2009-104275A, for example. The detector and the identifier created by the learning unit 208 are used at the video analysis block.

In the foregoing, a configuration of the metadata management system 20 has been described.

[2-5: Operation of Metadata Management System 20]

Next, operations of the metadata management system 20 will be described with reference to FIGS. 38 to 44. Also, a supplementary explanation will be given on a detailed functional configuration of the metadata management system 20. FIGS. 38 to 44 are explanatory diagrams for describing operations of the metadata management system 20.

(2-5-1: Integration Process)

Figure 38:
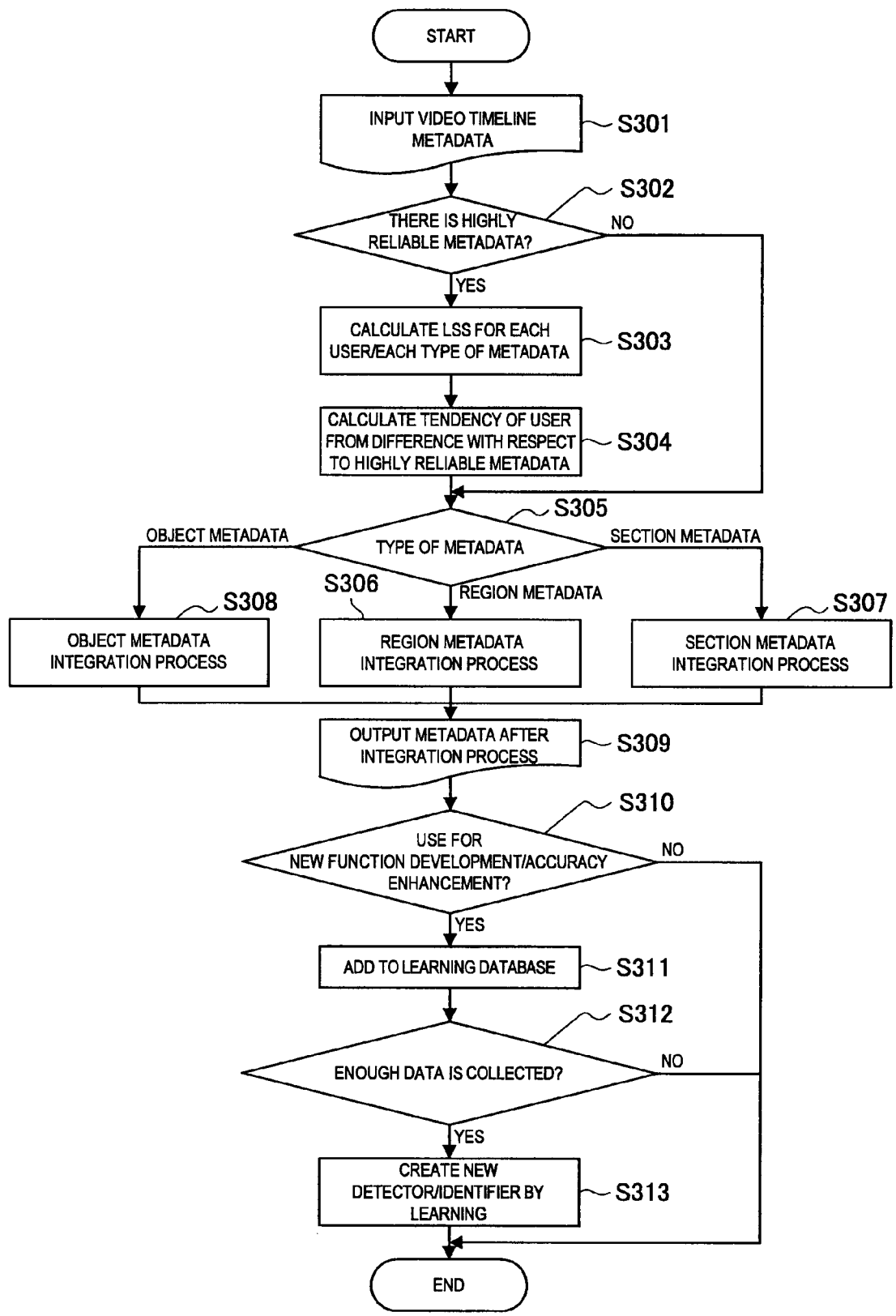
FIG. 38 is an explanatory diagram for describing a flow of post-processing in the flow regarding provision of the video timeline metadata.

First, an operation of the metadata management system 20 regarding the post-processing (step S30 in FIG. 9) will be described with reference to FIG. 38. FIG. 38 is an explanatory diagram for describing an operation of the metadata management system 20 regarding the post-processing.

As shown in FIG. 38, the metadata management system 20 acquires, by the function of the metadata acquisition unit 201, video timeline metadata from the metadata providing terminal 10 (S301). Then, the metadata management system 20 determines whether or not there is highly reliable data (S302). The highly reliable data is video timeline metadata detected using a highly accurate video analysis engine, or video timeline metadata acquired from a highly skilled user, for example. In the case there is highly reliable metadata, the metadata management system 20 proceeds with the process to step S303. On the other hand, in the case there is no highly reliable metadata, the metadata management system 20 proceeds with the process to step S305.

In the case of proceeding to step S303, the metadata management system 20 calculates, by the function of the skill/tendency analysis unit 202, an LSS (Labeling Skill Score) for each user and each type of video timeline metadata, based on the following Expression (2) (S303). Here, the Accuracy included in the following Expression (2) is a parameter indicating the accuracy of acquired video timeline metadata. For example, as the Accuracy, values such as recall, precision, F-measure, error rate and the like can be used Furthermore, the Variance is a variance of the difference between highly reliable metadata and acquired video timeline metadata. Furthermore, the α and β are normalization factors.

$$LSS = \alpha \times \text{Accuracy} + \beta \times \frac{1}{1 + \text{Variance}} \quad (2)$$

As can be assumed from the above Expression (2), the LSS will have a larger value as the accuracy of acquired video timeline metadata becomes higher. Also, the LSS will have a larger value as the variance of the difference between acquired video timeline metadata and highly reliable metadata becomes smaller. Additionally, the tendency of a user can be analysed from the Variance, which is the variance of the difference between highly reliable metadata and acquired video timeline metadata. For example, in the case the Variance is small, it is conceivable that there is a tendency unique to the user, such as a tendency to setting a large region, a tendency to take a long interval, a tendency that the selection operation of a region is late.

Now, the metadata management system 20, which has calculated the LSS, calculates, by the function of the skill/tendency analysis unit 202 and from the difference between the highly reliable metadata and the acquired video timeline metadata, the tendency of a user (S304). Then, the metadata management system 20 switches between processes according to the type of the acquired video timeline metadata (S305). In the case the acquired video timeline metadata is the region metadata, the metadata management system 20 proceeds with the process to step S306. Also, in the case the acquired video timeline metadata is the section metadata, the metadata management system 20 proceeds with the process to step S307. Furthermore, in the case the acquired video timeline metadata is the object metadata, the metadata management system 20 proceeds with the process to step S308.

Figure 40:
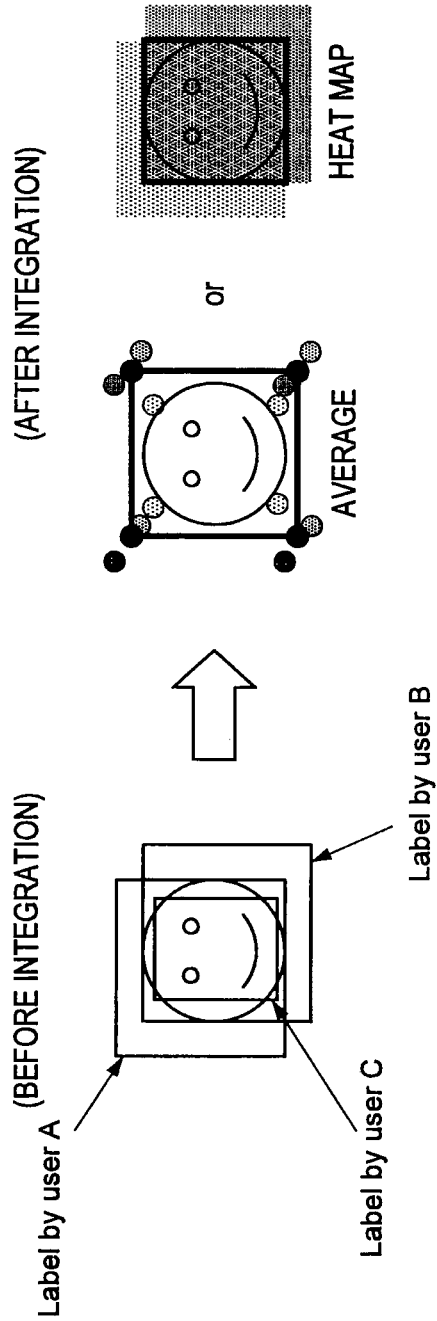
FIG. 40 is an explanatory diagram for describing the details of post-processing.

In the case of proceeding to step S306, the metadata management system 20 integrates pieces of region metadata by the function of the region metadata integration unit 203 (S306). For example, it is assumed, as shown in FIG. 40, that pieces of region metadata that a user A, a user B, and a user C have used for labeling of the same target object in the same video frame are acquired. In this case, the region metadata integration unit 203 calculates the average of each set of vertex coordinates of the target region that the user A has labeled, each set of vertex coordinates of the target region that the user B has labeled, and each set of vertex coordinates of the target region that the user C has labeled, and calculates a region having the average values of the vertex coordinates. Then, the region metadata integration unit 203 sets the calculated region as the region metadata after integration.

Furthermore, as shown in FIG. 40, the region metadata integration unit 203 may express each target region by a coordinates heat map and use the heat map as a reliability distribution. Moreover, the region metadata integration unit 203 may perform weighting according to the LSS in such a way that more emphasis is put on the region metadata that a user with a high LSS used for labeling, before integrating the pieces of metadata. Also, the region metadata integration unit 203 may perform the integration process of the pieces of region metadata taking into consideration the tendency of each user. For example, if the user A has the tendency to set a small region, the region metadata integration unit 203 may slightly enlarge the region set by the user A before integrating the region with the regions set by other users.

Figure 41:
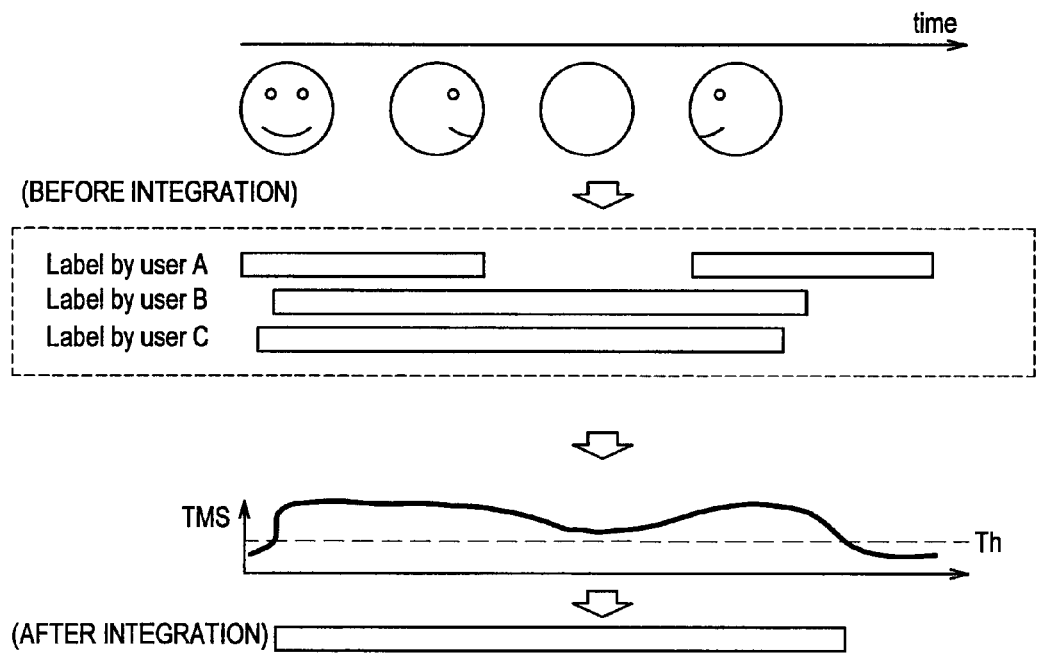
FIG. 41 is an explanatory diagram for describing the details of post-processing.

Reference will be again made to FIG. 38. In the case of proceeding to step S307, the metadata management system 20 integrates pieces of section metadata by the function of the section metadata integration unit 204, as shown in FIG. 41 (S307). First, the section metadata integration unit 204 calculates a TMS (Timeline Meta Score) based on the following Expression (3). The L included in the following Expression (3) indicates a group of users who have performed labeling. Also, the $LSS_n$ indicates the LSS of a user n. Also, the $IsLabeled_{n,t}$ indicates whether or not the user n has performed labeling on the video frame at time t. Furthermore, the M indicates the total number of users who have performed labeling.

$$TMS_t = \frac{\sum_{n \in L} LSS_n \times IsLabeled_{n,t}}{M} \quad (3)$$

The section metadata integration unit 204, which has calculated the TMS, sets a section in which the TMS is at a predetermined threshold Th or higher as the appearance section of the target object, and creates section metadata after integration. Additionally, the section metadata integration unit 204 may reflect the tendency of each user in the integration process of the section metadata. For example, it is assumed that the user A has the tendency to select a region at a delayed timing. In this case, the section metadata integration unit 204 corrects the section metadata of the user A in such a way that the appearance start/end timings of a target object are put forward by the amount of time of the delay in the timing before calculating the TMS, and then creates section metadata after integration based on the TMS.

Figure 39:
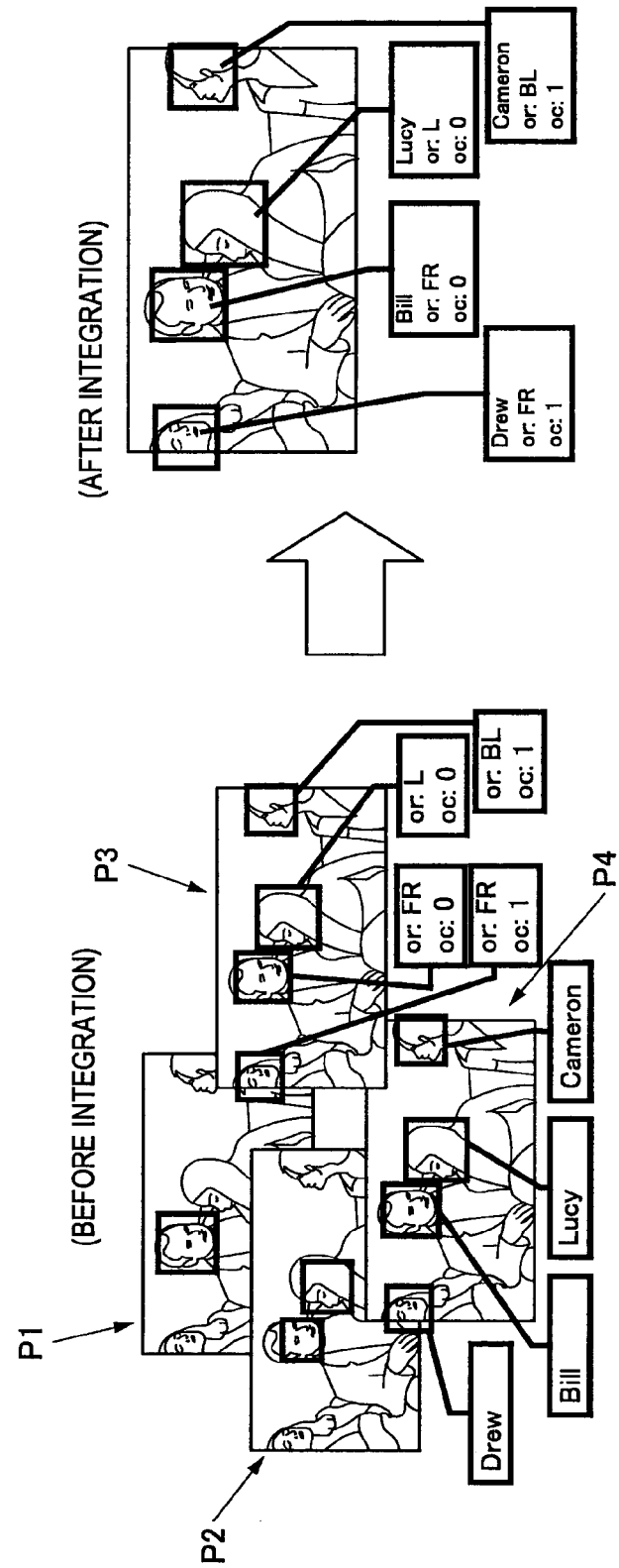
FIG. 39 is an explanatory diagram for describing the details of post-processing.

In the case of proceeding from step S305 to step S308, the metadata management system 20 performs the integration process of object metadata by the function of the object metadata integration unit 205 (S308). First, as shown in FIG. 39, the object metadata integration unit 205 integrates pieces of property information and the like labeled on the same target object. Then, the object metadata integration unit 205 corrects the fluctuation in the manner of writing of text indicating the name, the attribute, the description or the like of a target object included in the object metadata.

When the process of step S306, S307 or S308 is complete, the metadata management system 20 provides the region metadata after integration, the section metadata after integration, or the object metadata after integration to the metadata user terminal 30, by the function of the metadata providing unit 206 (S309). Then, the metadata management system 20 determines whether or not to use the video timeline metadata after integration for creation of a new detector or identifier (new function development/accuracy enhancement) (S310). In the case of using the video timeline metadata after integration for new function development/accuracy enhancement, the metadata management system 20 proceeds with the process to step S311. On the other hand, in the case of not using the video timeline metadata after integration for new function development/accuracy enhancement, the metadata management system 20 ends the series of processes.

In the case of proceeding to step S311, the metadata management system 20 stores the video timeline metadata after integration in the storage unit 207 (the learning database) (S311). Then, the metadata management system 20 determines, by the function of the learning unit 208, whether or not enough video timeline metadata is accumulated in the learning database (S312). In the case enough video timeline metadata is accumulated in the learning database, the metadata management system 20 proceeds with the process to step S313. On the other hand, in the case not enough video timeline metadata is accumulated in the learning database, the metadata management system 20 ends the series of processes.

In the case of proceeding to step S313, the metadata management system 20, by the function of the learning unit 208, uses the video timeline metadata accumulated in the storage unit 207 as the teacher data and creates new detector and identifier by learning (S313). The metadata management system 20, which has created the new detector and identifier, ends the series of processes.

In the foregoing, an operation of the metadata management system 20 related to the post-processing has been described.

(2-5-2: Other Functions)

Figure 42:
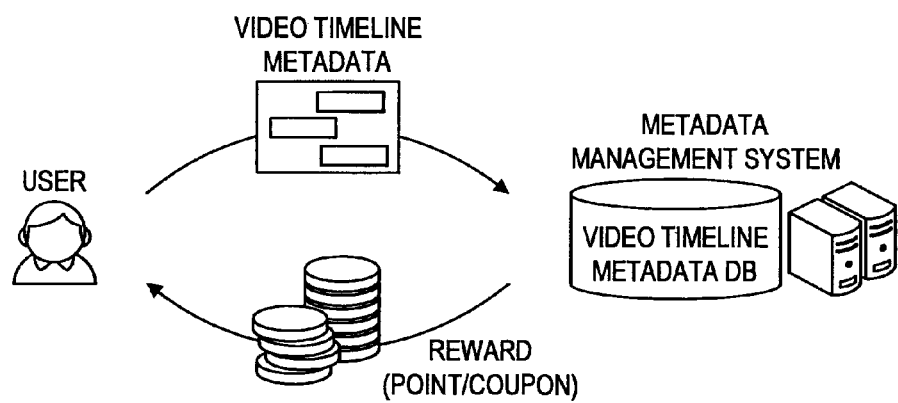
FIG. 42 is an explanatory diagram for describing another function provided by the metadata management system.
Figure 43:
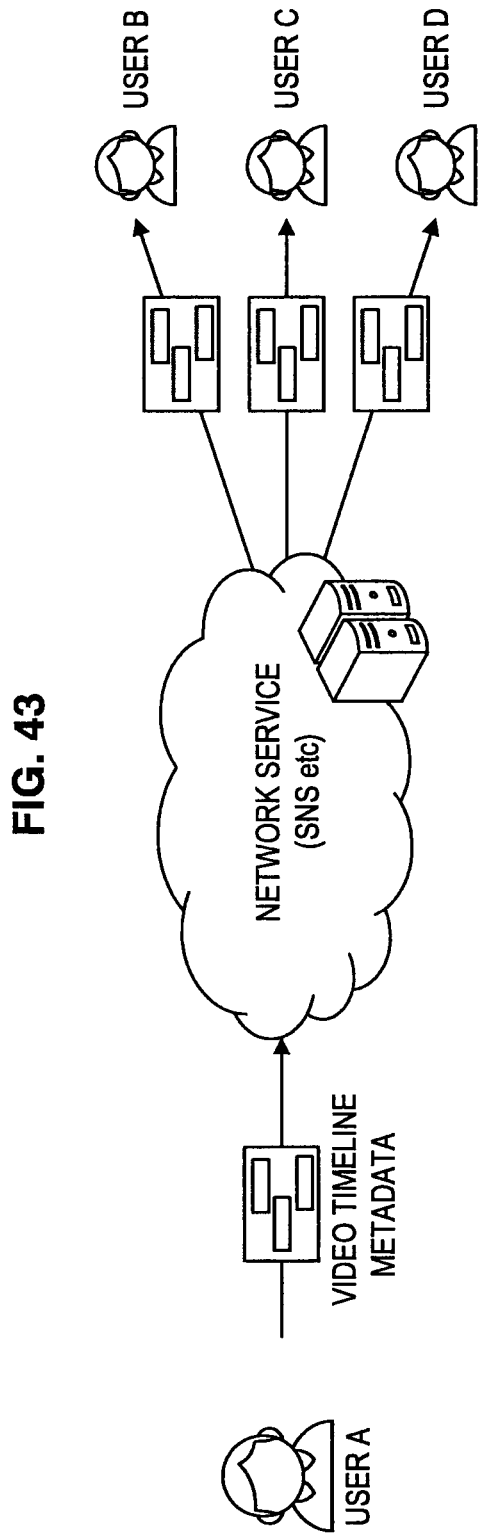
FIG. 43 is an explanatory diagram for describing another function provided by the metadata management system.
Figure 44:
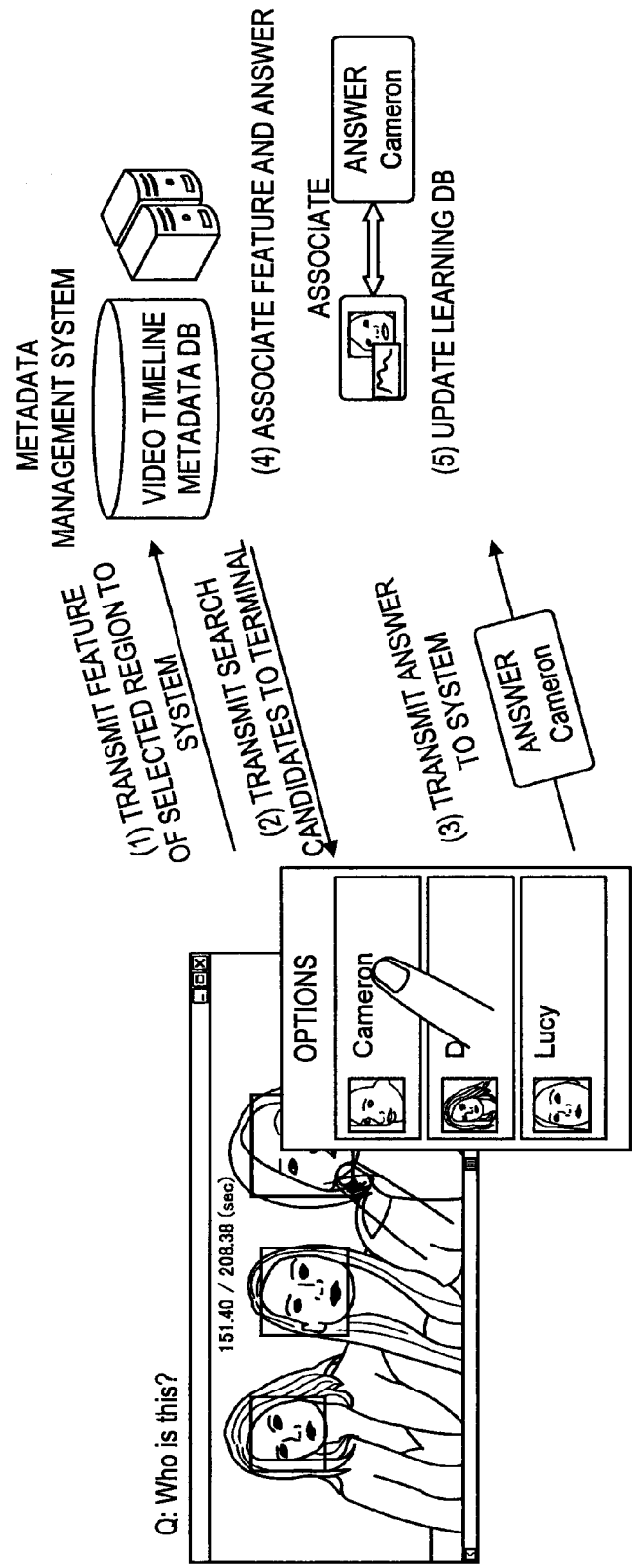
FIG. 44 is an explanatory diagram for describing another function provided by the metadata management system.

Incidentally, the metadata management system 20 may also include a function of assisting or promoting labeling, in addition to the function of integrating pieces of video timeline metadata and the function of creating new detector and identifier by learning. For example, as shown in FIG. 42, the metadata management system 20 may include a function of rewarding a user who has performed labeling with points, coupons or the like. Also, as shown in FIG. 43, the metadata management system 20 may include a function of providing an environment where video timeline metadata can be shared among a plurality of users via a social network service (hereinafter, SNS). Furthermore, as shown in FIG. 44, the metadata management system 20 may include a function of providing information that assists input of object metadata.

These functions are functions for directly or indirectly motivating a user to perform the labeling operation. For many users, the labeling operation of the video timeline metadata may be a tedious operation. Also, the labeling operation may even be painful for some users. Thus, providing motivation for the labeling operation of the video timeline metadata is considered meaningful.

For example, by providing a mechanism of giving away points or coupons to a user who has performed labeling, as shown in FIG. 42, the motivation for the labeling operation can be assumed to increase. Also, instead of providing points or coupons, a video (a movie, a broadcast program, or the like) on which labeling has been performed may be provided to be viewed for free. Furthermore, it is also conceivable to give a goal such as "Look for - - in the video" to a user such that the labeling operation becomes like a game. Furthermore, a mechanism of highly rewarding a user who has performed the labeling operation for a long time, or of highly rewarding a user who has performed labeling on a person with a high degree of attention would be effective.

Moreover, as shown in FIG. 43, when sharing the video timeline metadata on the SNS, a user who has uploaded video timeline metadata may be appreciated by other users. Being appreciated by other users may encourage a user to willingly perform the labeling operation. Also, as shown in FIG. 44, by providing matching candidates based on the feature of a face region selected in a video, the labeling operation is simplified. Also, an element of a game of guessing a person is included, and contribution to the increase in the motivation for the labeling operation of a user is also expected.

In the foregoing, optional functions of the metadata management system 20 have been described. Additionally, the optional functions described above may be provided by another service providing system.

[2-6: Configuration and Operation of Metadata User Terminal 30]

Figure 45:
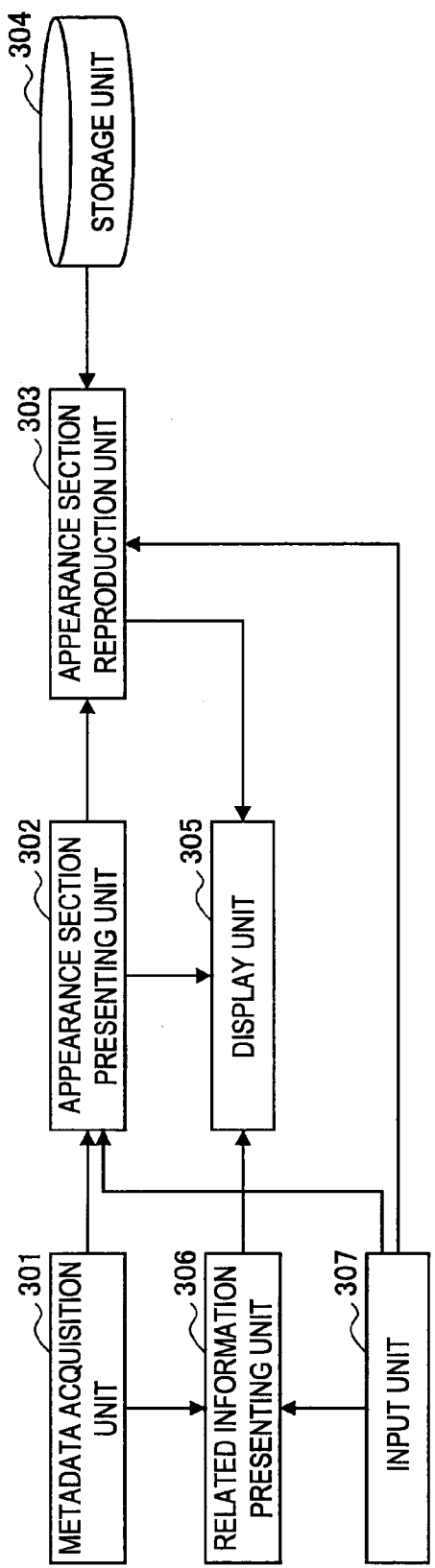
FIG. 45 is an explanatory diagram for describing an example configuration of a metadata user terminal.

Next, a configuration of the metadata user terminal 30 will be described with reference to FIG. 45. Herein, an operation of the metadata user terminal 30 will also be described. FIG. 45 is an explanatory diagram for describing a configuration of the metadata user terminal 30.

As shown in FIG. 45, the metadata user terminal 30 is mainly configured from a metadata acquisition unit 301, an appearance section presenting unit 302, an appearance section reproduction unit 303, a storage unit 304, a display unit 305, a related information presenting unit 306, and an input unit 307.

Figure 46:
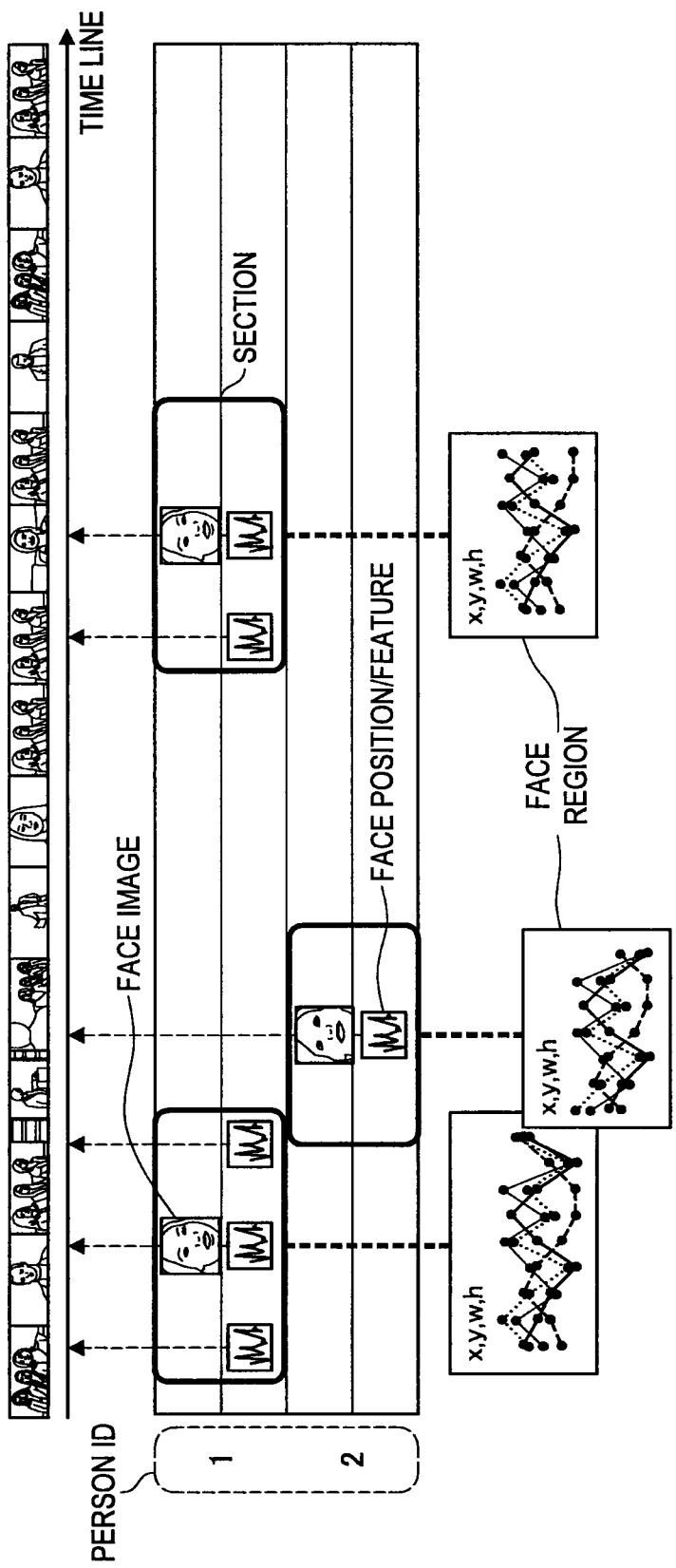
FIG. 46 is an explanatory diagram for describing a configuration of the video timeline metadata.
Figure 47:
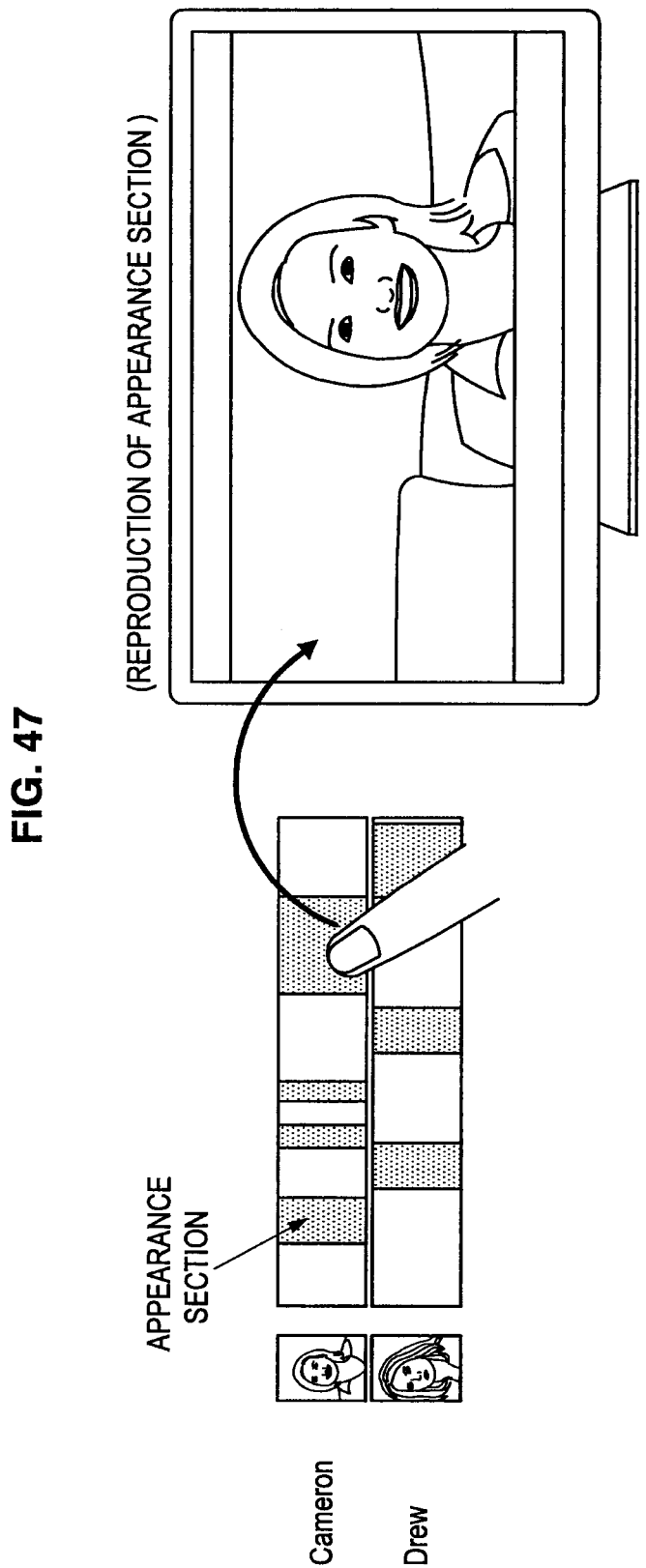
FIG. 47 is an explanatory diagram for describing a display method of an appearance section that uses the video timeline metadata and a reproduction method of the appearance section.

The metadata acquisition unit 301 acquires video timeline metadata (see FIG. 46) from the metadata management system 20. Among the video timeline metadata acquired by the metadata acquisition unit 301, the section metadata is input to the appearance section presenting unit 302. On the other hand, the region metadata is input to the related information presenting unit 306. The appearance section presenting unit 302 uses the section metadata and displays, on the display unit 305, information indicating a section in which each target object appears. For example, as shown in FIG. 47, the appearance section presenting unit 302 displays in a different colour the appearance section of each character in all the sections.

Figure 48:
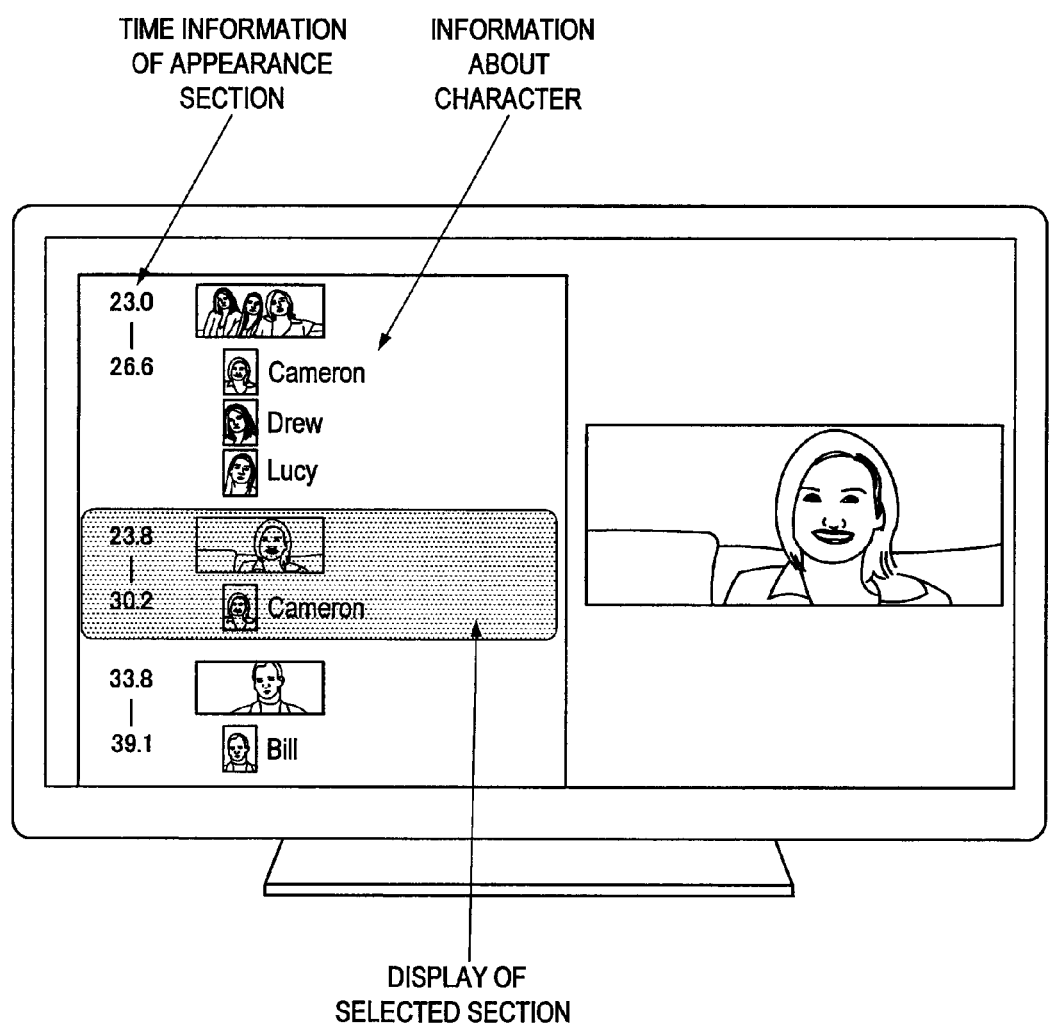
FIG. 48 is an explanatory diagram for describing a display method of an appearance section that uses the video timeline metadata and a reproduction method of the appearance section.
Figure 49:
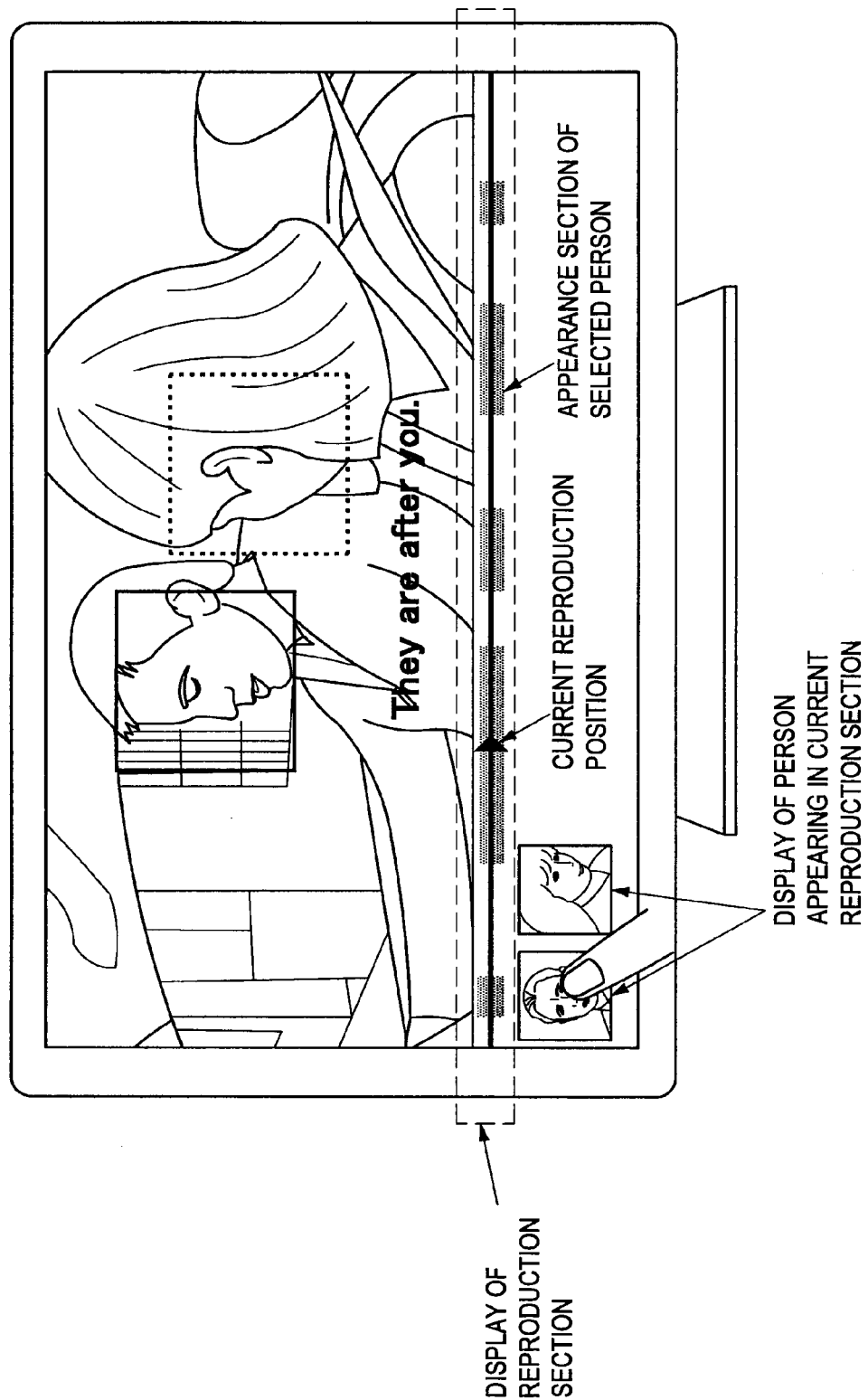
FIG. 49 is an explanatory diagram for describing a display method of an appearance section that uses the video timeline metadata and a reproduction method of the appearance section.
Figure 50:
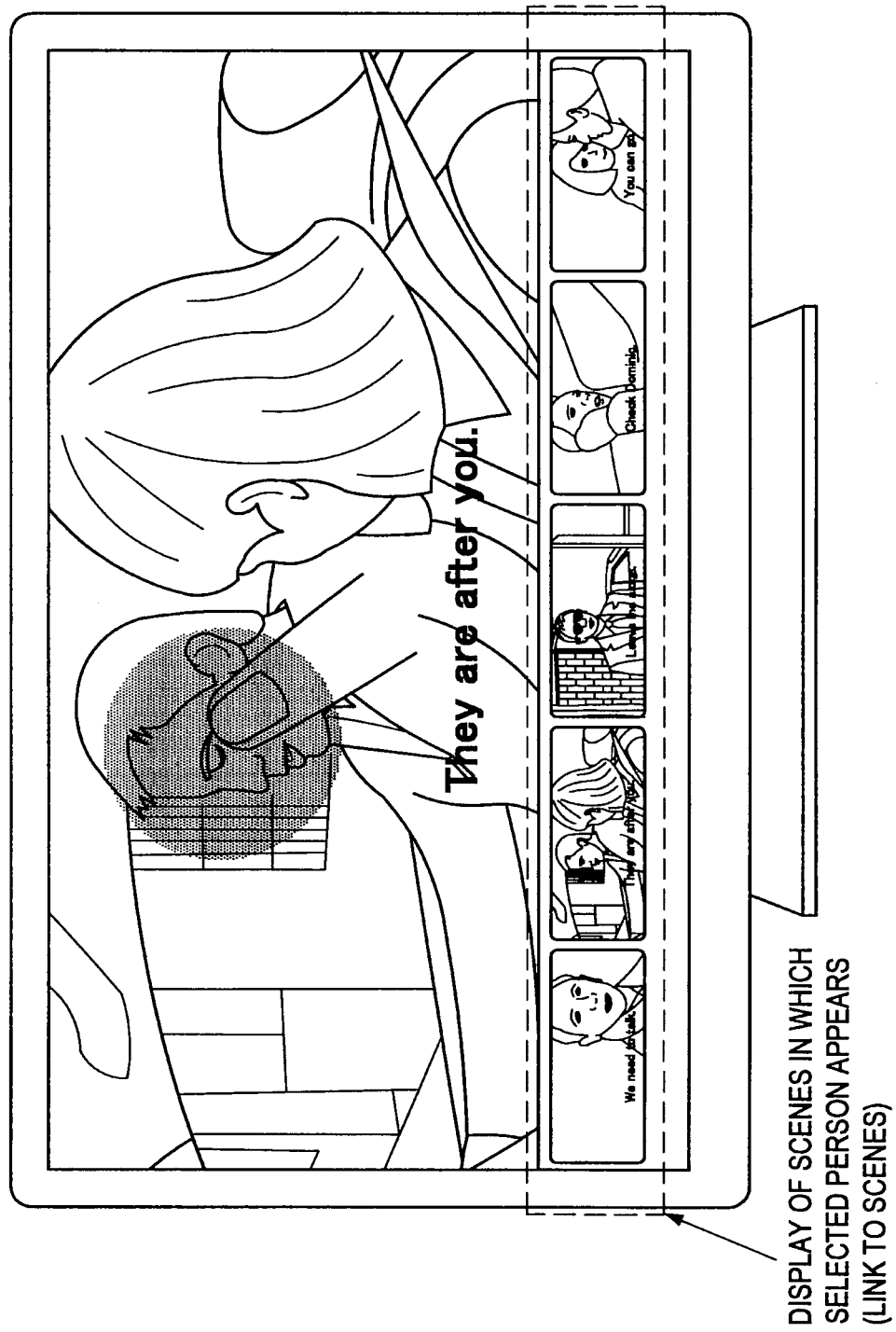
FIG. 50 is an explanatory diagram for describing a display method of an appearance section that uses the video timeline metadata and a reproduction method of the appearance section.

Furthermore, as shown in FIGS. 4 and 48, the appearance section presenting unit 302 may display in association with each other the time information of a section in which a character appears and information about a character appearing in the section. Furthermore, as shown in FIG. 49, the appearance section presenting unit 302 may display a character appearing in a section that is currently reproduced. Also, the appearance section presenting unit 302 may display in a timeline sections in which appears a character selected by a user from the characters appearing in the section that is currently reproduced. Furthermore, as shown in FIG. 50, the appearance section presenting unit 302 may display, in a row, representative scenes of sections in which appears a character selected by a user from characters appearing in a section that is currently reproduced.

Reference will be again made to FIG. 45. The section metadata is also input to the appearance section reproduction unit 303 via the appearance section presenting unit 302. The appearance section reproduction unit 303 reproduces the video stored in the storage unit 304 and displays the same on the display unit 305. Also, in the case a section in which a certain target object appears or a certain target object is selected, the appearance section reproduction unit 303 reproduces, based on the section metadata, the selected section or a section in which the selected target object appears. For example, as shown in FIG. 47, in the case an appearance section of "Cameron" is selected by a user, the appearance section reproduction unit 303 reproduces the video image of the selected appearance section.

Furthermore, as shown in FIG. 48, in the case one appearance section is selected from a list of appearance sections, the appearance section reproduction unit 303 reproduces the video image of the selected appearance section. Also, as shown in FIG. 49, in the case a character appearing in a section that is currently reproduced is selected, the appearance section reproduction unit 303 reproduces the video image of a section in which the selected character appears. Moreover, as shown in FIG. 50, in the case one of appearance scenes of a character selected on the screen is selected, the appearance section reproduction unit 303 reproduces the video image of the selected appearance scene. In this manner, the appearance section reproduction unit 303 uses the section metadata and selectively reproduces a video image corresponding to a section or a target object selected by a user.

For its part, the related information presenting unit 306 uses the region metadata and displays on the display unit 305 related information of each target object included in an image that is currently displayed. For example, as shown in FIG. 1, in the case a person A and a person B are included in an image that is currently displayed, the related information presenting unit 306 displays on the screen pieces of related information of the person A and the person B. Also, as shown in FIG. 2, in the case an object and a place are included in an image that is currently displayed, the related information presenting unit 306 displays on the screen pieces of related information of the object and the place. Furthermore, as shown in FIG. 3, the related information presenting unit 306 may also be configured to display related information of a selected target object in the case a target object appearing in an image that is currently displayed is selected.

Additionally, in addition to the profile and a photograph of a person, the relation information may also include a link to the SNS service or a link to an online sales site, a photograph of a person or an object, another video production in which the person appears, for example. Also, the related information may be held by the metadata management system 20 or by the metadata user terminal 30, or the related information may be acquired from a service providing system that provides related information, by transmitting identification information such as a person ID to the service providing system.

Figure 51:
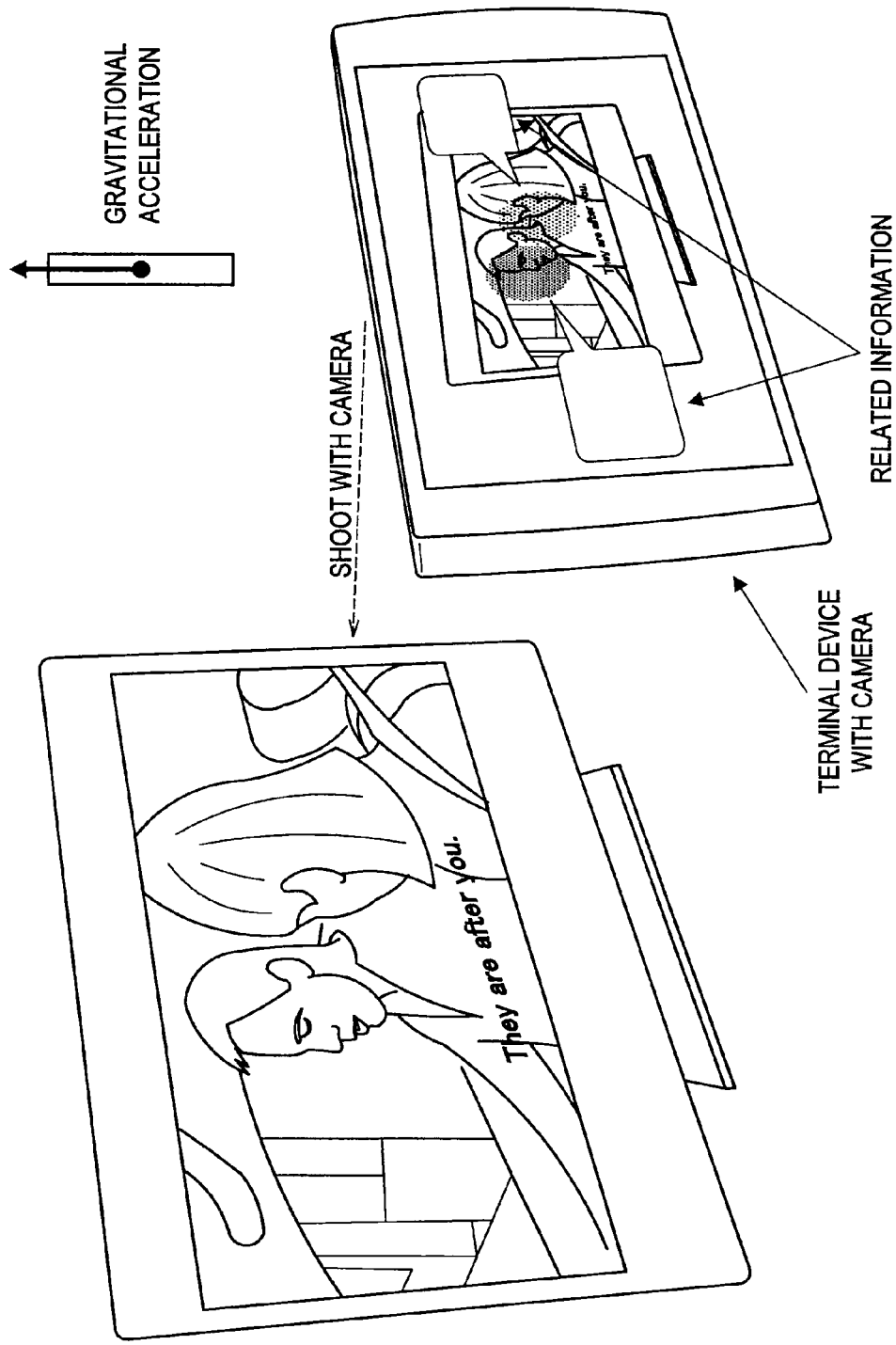
FIG. 51 is an explanatory diagram for describing a display method of the related information.
Figure 52:
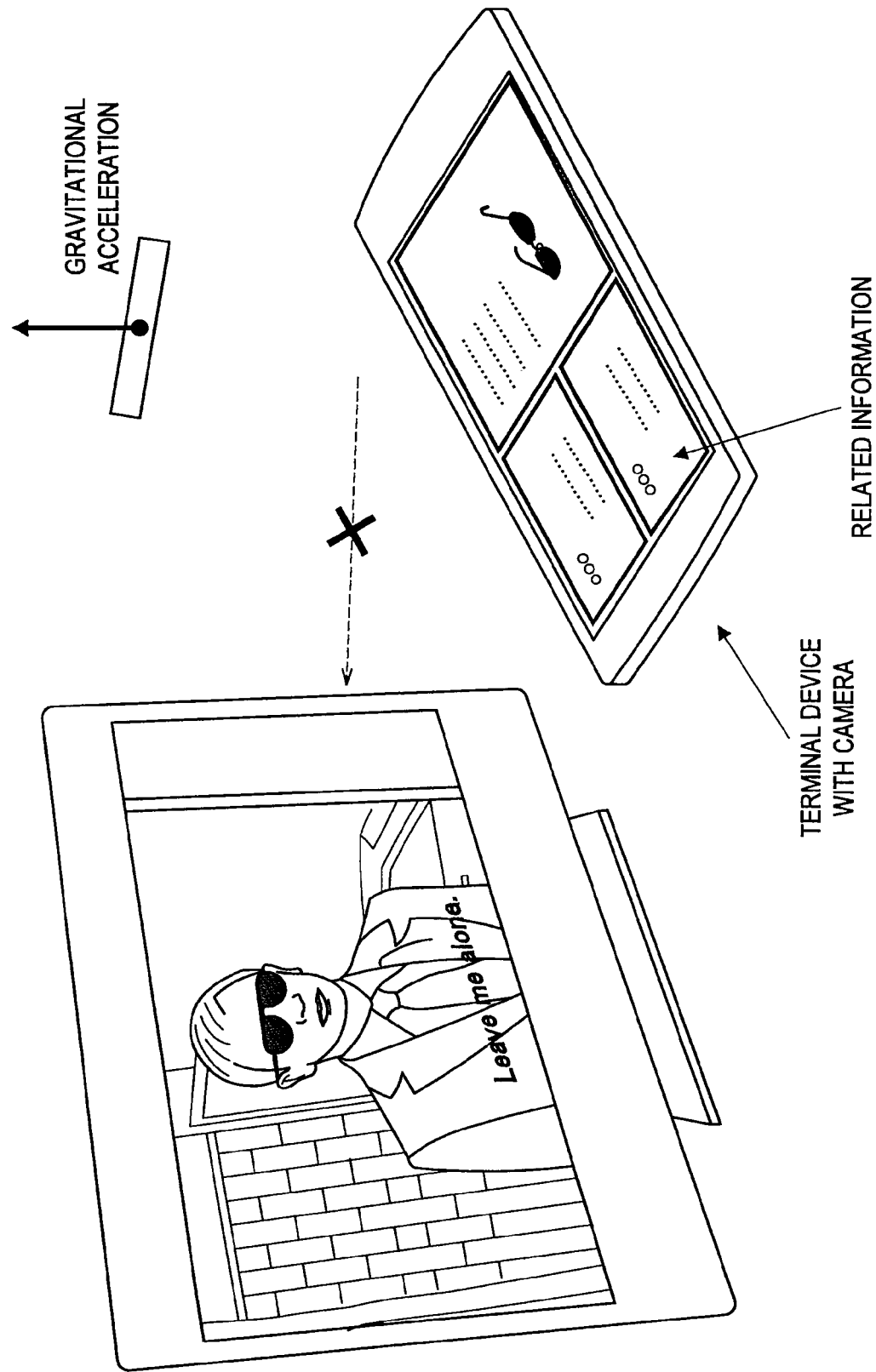
FIG. 52 is an explanatory diagram for describing a display method of the related information.

Furthermore, as shown in FIGS. 51 and 52, the related information may be displayed using AR (Augmented Reality) technology. In the case of using the AR, a user captures the display screen of a video with a terminal device with a camera and causes the display screen to be displayed on the display of the terminal device with a camera, as shown in FIG. 51. When the display screen of the video enters the shooting range, the terminal device with a camera acquires related information of a target object appearing on the display screen and causes the acquired related information to be displayed on the display. Also, as shown in FIG. 52, it is also possible to have only the related information displayed on the display of the terminal device with a camera in the case the angle of holding the terminal device with a camera is changed and the display screen is removed from the shooting range. Additionally, if a sensor such as an accelerometer or the like is installed in the terminal device with a camera, the change in the angle can be detected, thus enabling switching between display methods of the related information based on the detection result.

In the foregoing, a configuration and an operation of the metadata user terminal 30 have been described.

[2-7: Data Structure of Video Timeline Metadata]

Next, data structures of the video timeline metadata will be described with reference to FIGS. 53 to 59. FIGS. 53 to 59 are explanatory diagrams for describing data structures of the video timeline metadata. Additionally, an example configuration of the video timeline metadata (a case where the target object is a face) is as shown in FIG. 46. In the example of FIG. 46, the region metadata includes the position and the range of a face frame, the section metadata includes an appearance section of a face, and the object metadata includes a person ID, a face property and a thumbnail image of a face.

Figure 53:
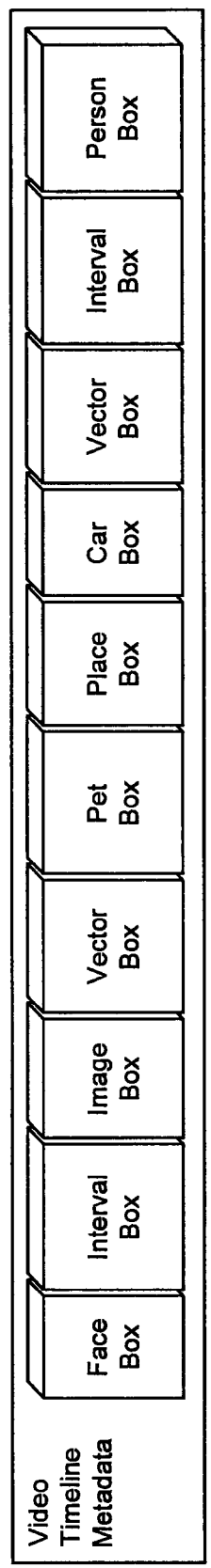
FIG. 53 is an explanatory diagram for describing a data structure of the video timeline metadata.

An explanation will be given here on a storage format which enables to easily manage video timeline metadata having a structure as described above. In this storage format, the video timeline metadata is stored in a connected box structure as shown in FIG. 53. The boxes are classified according to the type of video timeline metadata. For example, "Face Box" represents video timeline metadata related to a face region. Also, "Car Box" represents video timeline metadata related to a car region. With such a connected box structure, addition of a box of a new type is facilitated. Also, addition of data at the end of video timeline metadata is facilitated.

Figure 54:
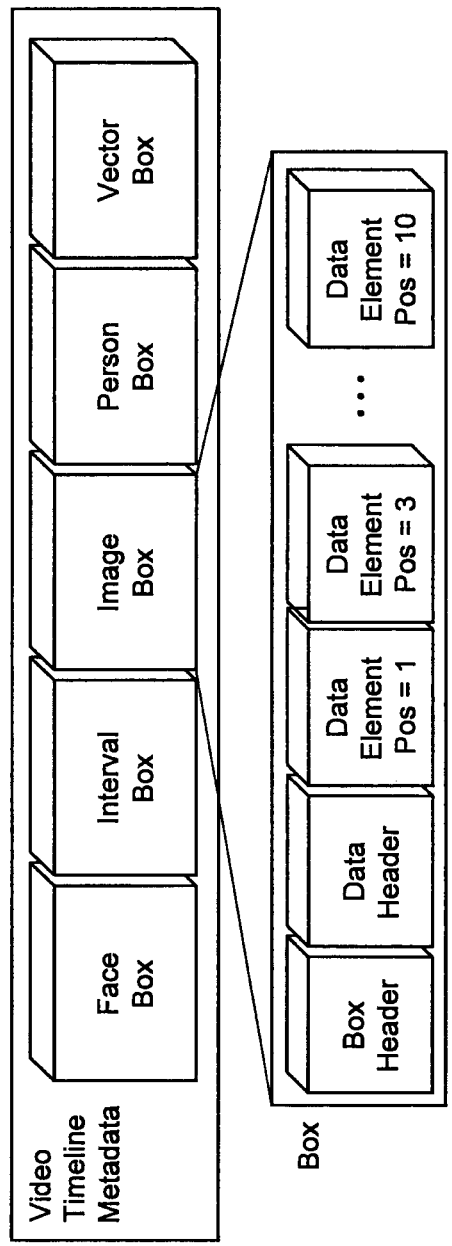
FIG. 54 is an explanatory diagram for describing a data structure of the video timeline metadata.

As shown in FIG. 54, each box is configured from a header and a data region. Also, types of the header include a header that is common to the boxes (Box Header) and a header that is dependent on data (Data Header). The size of a box, the type of a box, a box ID and the like are stored in the header that is common to the boxes. On the other hand, the header that is dependent on data stores the number of data elements, time information and the like. Also, the data region is configured from one or more data elements (Data Element).

Figure 55:
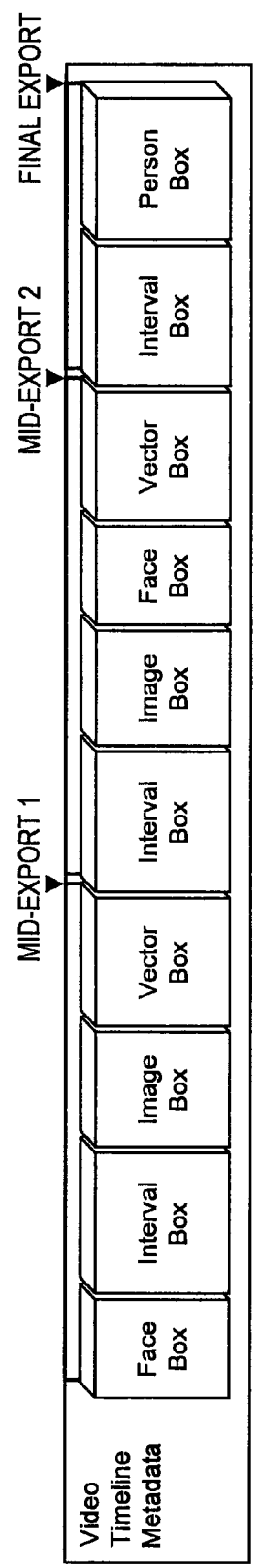
FIG. 55 is an explanatory diagram for describing a data structure of the video timeline metadata.

As described, the video timeline metadata is stored with a box being provided for each type. However, it is also possible, as shown in FIG. 55, to fragment one box into a plurality of boxes (Fragmentation). In the example of FIG. 55, boxes, such as "Face Box", are fragmented into two. By fragmenting the boxes, the amount of data stored in one box is reduced. Accordingly, the amount of data that is temporarily stored in a memory at the time of export can be reduced, and the memory load at the time of export can be reduced.

Figure 56:
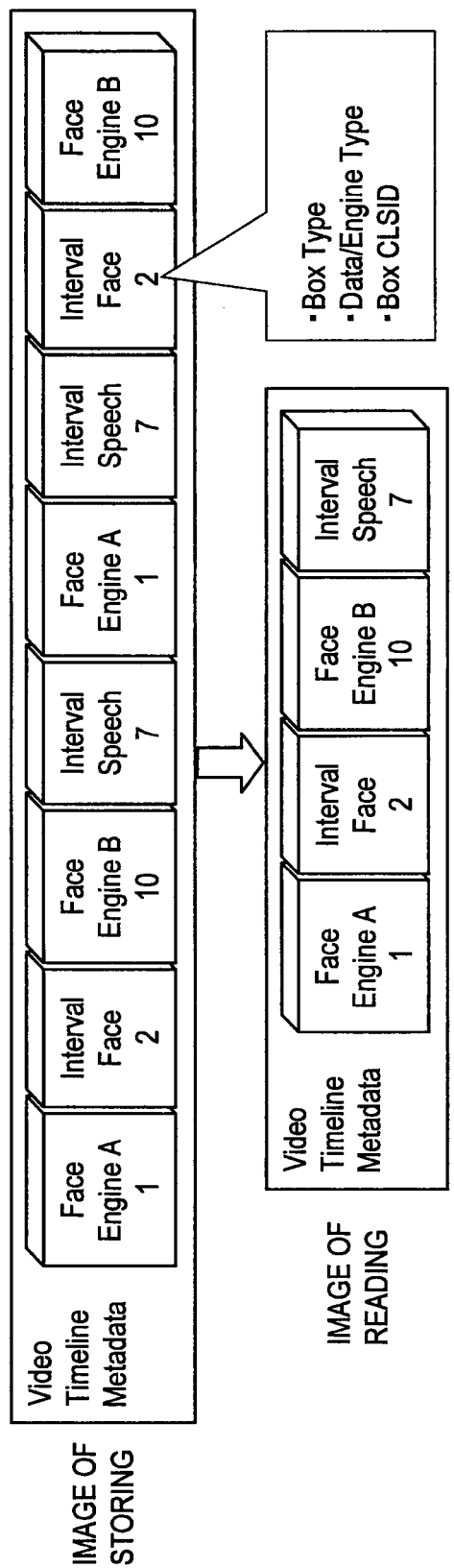
FIG. 56 is an explanatory diagram for describing a data structure of the video timeline metadata.

Furthermore, as shown in FIG. 56, it is also possible to connect fragmented boxes. Connection of fragmented boxes is performed based on a Box Class ID. This Box Class ID is an ID established in advance to identify a box. For example, the Box Class ID of a Face Box that stores the analysis result of a video analysis engine A is established as 1, and the Box Class ID of a Face Box that stores the analysis result of a video analysis engine B is established as 10. In the case of connecting fragmented boxes, boxes with the same Box Class ID are detected and connected into one box.

Figure 57:
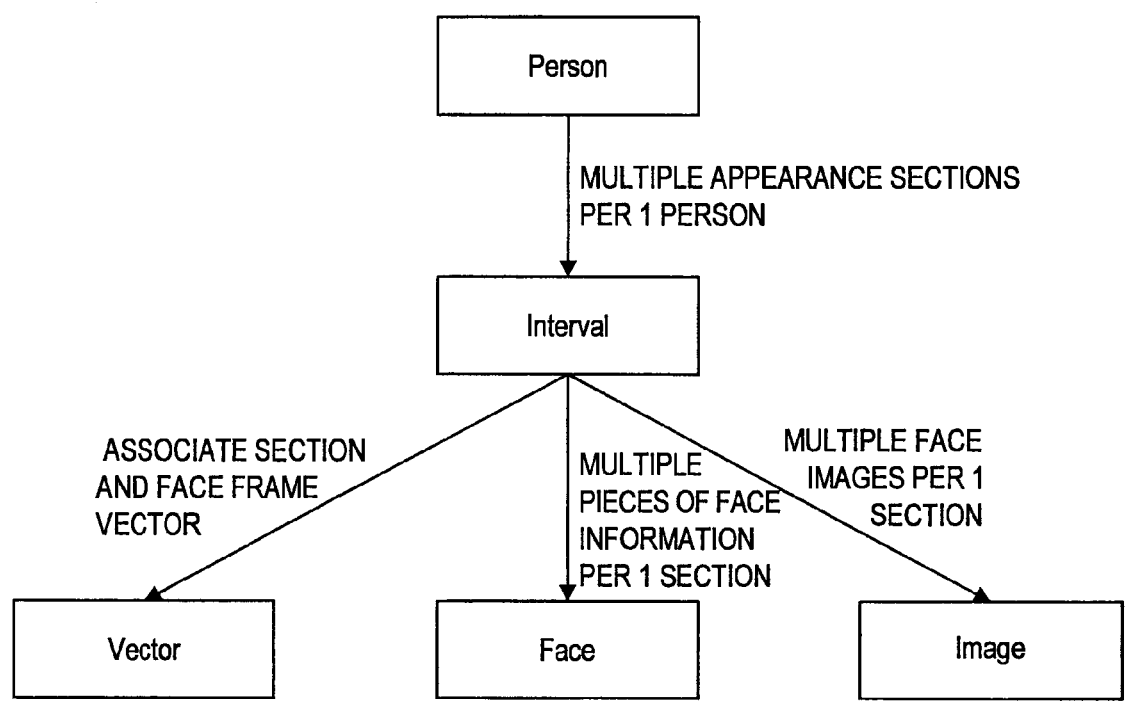
FIG. 57 is an explanatory diagram for describing a data structure of the video timeline metadata.

Also, as shown in FIG. 57, a parent-child relationship is established between data elements. The relationship between a parent node and a child node is expressed by an arrow extending from the parent node to the child node. Also, arrows can be extended from one parent node to a plurality of child nodes. With respect to a face region, a data element "Person" corresponding to a person ID or name is the parent node at the topmost level. Furthermore, below the data element "Person", a data element "Interval" is located which corresponds to the start point or the length of a section in which the person appears.

Furthermore, below the data element "Interval", a data element "Vector" is located which corresponds to a vector (the position and the range of a face frame, a face feature). Also, below the data element "Interval", a data element "Face" is located which corresponds to face information (a face position, the size, a part position, a feature). Moreover, below the data element "Interval", a data element "Image" is located which corresponds to an image (image information, image data). By establishing such a parent-child relationship, sections in which a person A appears can all be displayed in a list format, for example.

Figure 58:
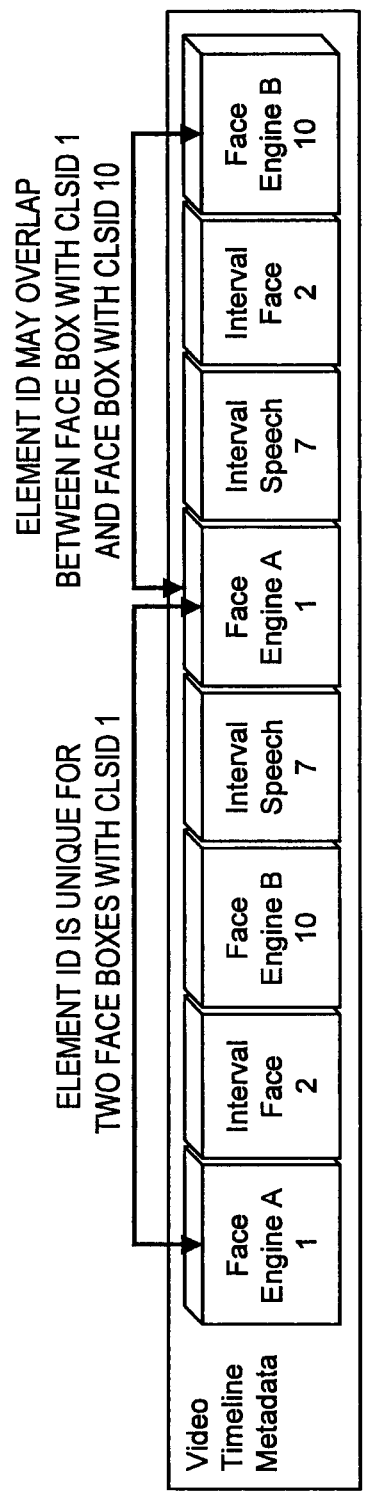
FIG. 58 is an explanatory diagram for describing a data structure of the video timeline metadata.
Figure 59:
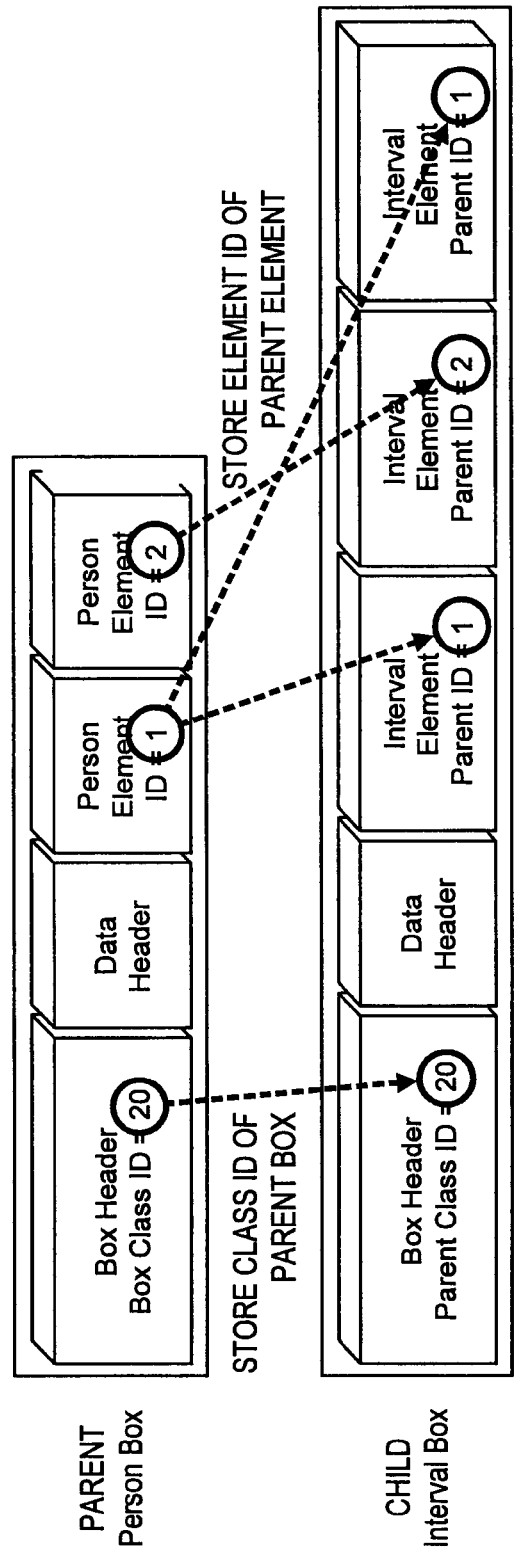
FIG. 59 is an explanatory diagram for describing a data structure of the video timeline metadata.

To realize a parent-child relationship as shown in FIG. 57, each data element has to be identifiable. For this reason, an element ID is added to each data element. This Element ID is a unique ID among all the boxes with the same Box Class ID within one video timeline metadata. For example, as shown in FIG. 58, the Element ID is unique for two Face Boxes with a Box Class ID 1. On the other hand, the Element IDs may overlap between the Face Box with the Box Class ID 1 and the Face Box with a Box Class ID 10.

According to the above establishment, by combining a Box Class ID and an Element ID, the uniqueness of a parent Box is secured. Additionally, the Box Class ID of a parent Box is stored in the Box Header of a child Box. The Element ID of a data element of the parent Box is stored in the data element of the child Box. The relationship between the Person Box, which is a parent Box, and the Interval Box, which is a child Box, will be considered with reference to FIG. 59. The Box Class ID of the Person Box is stored in the Box Header of the Interval Box. Also, the Element IDs 1 and 2 of data elements, Person Element, in the Person Box are stored in the data elements, Interval Element, of the Interval Box. That is, a parent can have a plurality of children, but a child is not to have more than one parent.

In the foregoing, data structures of the video timeline metadata have been described.

3: Hardware Configuration

Figure 60:
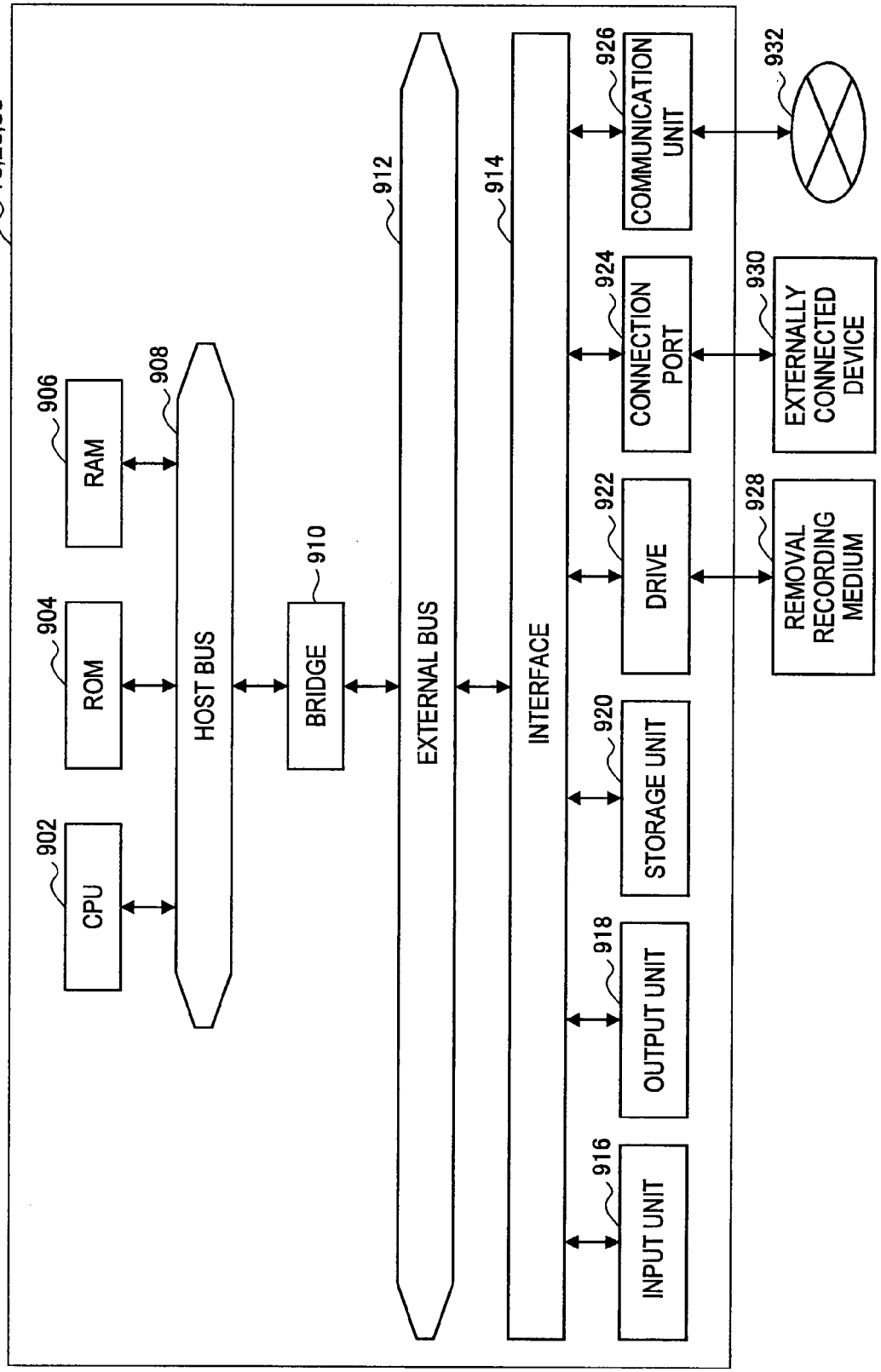
FIG. 60 is an explanatory diagram showing an example hardware configuration of information processing apparatuses capable of realizing the metadata providing terminal, the metadata management system, and the metadata user terminal.

The function of each structural element of the metadata providing terminal 10, the metadata management system 20, and the metadata user terminal 30 described above can be realized by using, for example, the hardware configuration of an information processing apparatus shown in FIG. 60. That is, the function of each structural element can be realized by controlling the hardware shown in FIG. 60 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 60, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory The CPU 902 functions as an arithmetic processing unit or a control unit, for example, and controls entire operation or a part of operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in the execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

4: Summary

Lastly, the technical contents of the present embodiment will be briefly stated. The technical contents stated here can be applied to various information processing apparatuses, such as a PC, a mobile phone, a portable game machine, a portable information terminal, an information appliance, a car navigation system, and the like.

The functional configuration of the information processing apparatus described above can be expressed as below. For example, an information processing apparatus according to (1) below can detect, by a function of a specified region detection unit, a specified region specified by a user with respect to a video that is being reproduced. Accordingly, the user can easily specify regions with respect to a large number of video frames while a target object is appearing in a video that is being shown by keep specifying the target object, without having to select, one by one, regions including the target object while switching the video frames one by one.

Furthermore, this information processing apparatus sets, to each video frame, a position and a range of a specified region as region metadata, and also, sets a section including a video frame for which the region metadata has been set as section metadata. That is, the user can set the region metadata and the section metadata simply by specifying a target object appearing in a video that is being shown. For example, in the case of using a touch panel as the input device, the user can easily set metadata simply by touching a target object appearing in a video that is being reproduced with an operating tool, such as a finger or a stylus, and moving the operating tool so as to follow the target object.

As described, with the labeling operation of metadata being facilitated, metadata can be set to a video in a short time. Also, even a user who is not used to the labeling operation is enabled to perform the labeling operation of metadata with ease. Thus, it is possible to have many users perform the labeling operation of metadata, and the efficiency of the labeling operation can be expected to increase by a cooperative operation. Furthermore, by statistically processing pieces of metadata used by many users to label the same video, the accuracy of labeling can be increased.

(1)
An information processing apparatus including:
a specified region detection unit for detecting a specified region specified by a user within a screen during reproduction of a video;
a region metadata setting unit for setting region metadata indicating a position and a range of the specified region for each video frame; and
a section metadata setting unit for setting section metadata indicating a section corresponding to a video frame for which the region metadata has been set, for each video.

(2)
The information processing apparatus according to (1), further including:
a reproduction control unit for performing reproduction control of the video; and
a frame change detection unit for detecting a difference between adjacent video frames,
wherein, in a case the difference between adjacent video frames is small, the reproduction control unit skips reproduction of one of the video frames.

(3)
The information processing apparatus according to (1) or (2), further including:
a specific region detection unit for detecting a specific region including a specific target object within each video frame; and
a region change detection unit for detecting a change in the specific region between adjacent video frames,
wherein, in a case the change in the specific region between adjacent video frames is small, the reproduction control unit skips reproduction of one of the video frames.

(4)
The information processing apparatus according to (2) or (3), further including:
an operation speed detection unit for detecting a delay in a user operation,
wherein, in a case a delay in a user operation is detected, the reproduction control unit slows a reproduction speed.

(5)
The information processing apparatus according to (4), wherein the operation speed detection unit calculates a distance of movement of the specified region between adjacent video frames, and in a case the distance exceeds a predetermined threshold, assumes that there is a delay in a user operation.

(6)
The information processing apparatus according to (4) or (5),
wherein the region metadata setting unit invalidates the region metadata that is set for a video frame included in a section with respect to which a delay in a user operation has been detected, and
wherein the section metadata setting unit updates the section metadata, assuming that no specified region has been detected in the section with respect to which the delay in the user operation has been detected.

(7)
The information processing apparatus according to (4) or (5), further including:
an another-user information acquisition unit for acquiring information related to a section with respect to which a delay in a user operation is detected when another user performed a setting operation of the region metadata and the section metadata for a video which is the same as a video of processing target,
wherein the reproduction control unit slows a reproduction speed of the section indicated by the information related to a section.

(8)
The information processing apparatus according to any one of (1) to (7), further including:
a past image display unit for displaying, in a case a specified region including a same target object as a target object included in a specified region within a video frame that is currently reproduced exists within a video frame of past, an image of the specified region including a same target object existing in the video frame of past.

(9)

The information processing apparatus according to (1), further including:

a specific region detection unit for detecting a specific region including a specific target object within each video frame;

a region deletion unit for deleting a specific region whose appearance time is short and a specific region whose display area is small; and a region combining unit for combining, in a case there exist a plurality of specific regions, located near one another within a same video frame, including a target object of a same type, the plurality of specific regions.

(10)

The information processing apparatus according to (9), further including:

a clustering unit for performing clustering on specific regions based on features of target objects included in the specific regions, and determining a feature of a target object representing each cluster; and a region identification unit for identifying a type of a target object based on the feature of the target object representing each cluster, and associating identification information prepared in advance for each type of a target object with each cluster.

(11)

An information processing apparatus including:

a metadata acquisition unit for acquiring region metadata indicating a position and a range of a specified region specified by a user within a screen during reproduction of a video, and section metadata indicating a section corresponding to a video frame for which the specified region has been specified; and a region metadata setting unit for calculating, in a case specified regions have been specified by a plurality of users with respect to a same target object included in a same video frame, one representative position and range by statistically processing positions and ranges of a plurality of specified regions specified by the plurality of users, and setting the representative position and range as the region metadata.

(12)

The information processing apparatus according to (11), further including:

a skill evaluation unit for evaluating a specification accuracy for the specified region for each user, wherein the region metadata setting unit calculates the one representative position and range by finding a weighted average of the positions and ranges of the plurality of specified regions specified by the plurality of users by placing a great weight on position and range of a specified region specified by a user who is highly evaluated by the skill evaluation unit and a small weight on position and range of a specified region specified by a user who is poorly evaluated by the skill evaluation unit.

(13)

The information processing apparatus according to (12), further including:

a section metadata setting unit for extracting, in a case a plurality of users have set section metadata for a same video, a reproduction section of a video frame with respect to which the number of users who have specified the specified regions exceeds a predetermined number, and setting the extracted reproduction section as the section metadata.

(14)

A metadata setting method including:

detecting a specified region specified by a user within a screen during reproduction of a video;

setting region metadata indicating a position and a range of the specified region for each video frame; and setting section metadata indicating a section corresponding to a video frame for which the region metadata has been set, for each video.

(15)

A program for causing a computer to realize:

a specified region detection function of detecting a specified region specified by a user within a screen during reproduction of a video;

a region metadata setting function of setting region metadata indicating a position and a range of the specified region for each video frame; and a section metadata setting function of setting section metadata indicating a section corresponding to a video frame for which the region metadata has been set, for each video.

(16)

A metadata setting method including:

acquiring region metadata indicating a position and a range of a specified region specified by a user within a screen during reproduction of a video, and section metadata indicating a section corresponding to a video frame for which the specified region has been specified; and calculating, in a case specified regions have been specified by a plurality of users with respect to a same target object included in a same video frame, one representative position and range by statistically processing positions and ranges of a plurality of specified regions specified by the plurality of users, and setting the representative position and range as the region metadata.

(17)

A program for causing a computer to realize:

a metadata acquisition function of acquiring region metadata indicating a position and a range of a specified region specified by a user within a screen during reproduction of a video, and section metadata indicating a section corresponding to a video frame for which the specified region has been specified; and a region metadata setting function of calculating, in a case specified regions have been specified by a plurality of users with respect to a same target object included in a same video frame, one representative position and range by statistically processing positions and ranges of a plurality of specified regions specified by the plurality of users, and setting the representative position and range as the region metadata.

(Notes)

The input unit 109 is an example of a specified region detection unit. The metadata providing unit 106 is an example of a region metadata setting unit and a section metadata setting unit. The similarity score calculation unit 111 is an example of a frame change detection unit. The region extraction unit 103 is an example of a specific region detection unit. The movement distance calculation unit 110 is an example of a region change detection unit and an operation speed detection unit. The reproduction control unit 107 is an example of an another-user information acquisition unit and a past image display unit. The region processing unit 104 is an example of a region deletion unit and a region combining unit. The object recognition unit 105 is an example of a clustering unit and a region identification unit. The region metadata integration unit 203 is an example of a region metadata setting unit. The skill/tendency analysis unit 202 is an example of a skill evaluation unit. The section metadata integration unit 204 is an example of a section metadata setting unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2011-120396 filed in the Japan Patent Office on May 30, 2011, the entire content of which is hereby incorporated by reference.

What is claimed is:

1. An information processing apparatus comprising:
a specified region detection unit that detects a specified region specified by a user within a screen during reproduction of a video;
a region metadata setting unit that sets region metadata indicating a position and a range of the specified region for each video frame;
a section metadata setting unit that sets section metadata indicating a section corresponding to a video frame for which the region metadata has been set, for each video;
a reproduction control unit that performs reproduction control of the video;
a frame change detection unit that detects a difference between adjacent video frames, wherein, in a case the difference between adjacent video frames is below a predetermined change detection threshold, the reproduction control unit skips reproduction of one of the video frames; and
an operation speed detection unit that detects a delay in a user operation, wherein, in a case a delay in a user operation is detected, the reproduction control unit reduces a reproduction speed.

2. The information processing apparatus according to claim 1, further comprising:
a specific region detection unit that detects a specific region including a specific target object within each video frame; and
a region change detection unit that detects a change in the specific region between adjacent video frames,
wherein, in a case the change in the specific region between adjacent video frames is below a predetermined specific region threshold, the reproduction control unit skips reproduction of one of the video frames.

3. The information processing apparatus according to claim 1, wherein the operation speed detection unit calculates a distance of movement of the specified region between adjacent video frames, and in a case the distance exceeds a predetermined operation speed threshold, assumes that there is a delay in a user operation.

4. The information processing apparatus according to claim 1,
wherein the region metadata setting unit invalidates the region metadata that is set for a video frame included in a section with respect to which a delay in a user operation has been detected, and
wherein the section metadata setting unit updates the section metadata, assuming that no specified region has been detected in the section with respect to which the delay in the user operation has been detected.

5. The information processing apparatus according to claim 1, further comprising:
an another-user information acquisition unit that acquires information related to a section with respect to which a delay in a user operation is detected when another user performed a setting operation of the region metadata and the section metadata for a video which is the same as a video of processing target,
wherein the reproduction control unit reduces a reproduction speed of the section indicated by the information related to a section.

6. The information processing apparatus according to claim 1, further comprising:
a past image display unit that displays, in a case a specified region including a same target object as a target object included in a specified region within a video frame that is currently reproduced exists within a video frame of past, an image of the specified region including a same target object existing in the video frame of past.

7. The information processing apparatus according to claim 1, further comprising:
a specific region detection unit that detects a specific region including a specific target object within each video frame;
a region deletion unit that deletes a specific region whose appearance time is shorter than a predetermined time threshold and a specific region whose display area is smaller than a predetermined display area; and
a region combining unit that combines, in a case there exist a plurality of specific regions, located near one another within a same video frame, including a target object of a same type, the plurality of specific regions.

8. The information processing apparatus according to claim 7, further comprising:
a clustering unit that performs clustering on specific regions based on features of target objects included in the specific regions, and that determines a feature of a target object representing each cluster; and
a region identification unit that identifies a type of a target object based on the feature of the target object representing each cluster, and that associates identification information prepared in advance for each type of a target object with each cluster.

9. An information processing apparatus comprising:
a metadata acquisition unit that acquires region metadata indicating a position and a range of a specified region specified by a user within a screen during reproduction of a video, and section metadata indicating a section corresponding to a video frame for which the specified region has been specified;
a region metadata setting unit that calculates, in a case specified regions have been specified by a plurality of users with respect to a same target object included in a same video frame, one representative position and range by statistically processing positions and ranges of a plurality of specified regions specified by the plurality of users, and that sets the representative position and range as the region metadata;
a skill evaluation unit that evaluates a specification accuracy for the specified region for each user, wherein the region metadata setting unit calculates the one representative position and range by finding a weighted average of the positions and ranges of the plurality of specified regions specified by the plurality of users by placing a first weight on position and range of a specified region specified by a user who is evaluated by the skill evaluation unit to have a first level of skill and a second weight on position and range of a specified region specified by a user who is evaluated by the skill evaluation unit to have a second level of skill, wherein the first weight is greater than the second weight, and wherein the first level of skill is a higher level of skill than the second level of skill; and a section metadata setting unit that extracts, in a case a plurality of users have set section metadata for a same video, a reproduction section of a video frame with respect to which the number of users who have specified the specified regions exceeds a predetermined number, and setting the extracted reproduction section as the section metadata.

10. A metadata setting method comprising:

detecting a specified region specified by a user within a screen during reproduction of a video;

setting region metadata indicating a position and a range of the specified region for each video frame;

setting section metadata indicating a section corresponding to a video frame for which the region metadata has been set, for each video;

performing reproduction control of the video;

detecting a difference between adjacent video frames, wherein, in a case the difference between adjacent video frames is below a predetermined threshold, skipping reproduction of one of the video frames; and detecting a delay in a user operation, wherein, in a case a delay in a user operation is detected, reducing a reproduction speed.

11. A non-transitory computer-readable medium having embodied thereon a program, which when executed by a processor of a computer causes the processor to perform a method, the method comprising:

detecting a specified region specified by a user within a screen during reproduction of a video;

setting region metadata indicating a position and a range of the specified region for each video frame;

setting section metadata indicating a section corresponding to a video frame for which the region metadata has been set, for each video;

performing reproduction control of the video;

detecting a difference between adjacent video frames, wherein, in a case the difference between adjacent video frames is below a predetermined threshold, skipping reproduction of one of the video frames; and detecting a delay in a user operation, wherein, in a case a delay in a user operation is detected, reducing a reproduction speed.

12. A metadata setting method comprising:

acquiring region metadata indicating a position and a range of a specified region specified by a user within a screen during reproduction of a video, and section metadata indicating a section corresponding to a video frame for which the specified region has been specified;

calculating, in a case specified regions have been specified by a plurality of users with respect to a same target object included in a same video frame, one representative position and range by statistically processing positions and ranges of a plurality of specified regions specified by the plurality of users, and setting the representative position and range as the region metadata;

evaluating a specification accuracy for the specified region for each user, wherein the calculating the one representative position and range by finding a weighted average of the positions and ranges of the plurality of specified regions specified by the plurality of users by placing a first weight on position and range of a specified region specified by a user who is evaluated by the skill evaluation unit to have a first level of skill and a second weight on position and range of a specified region specified by a user who is evaluated by the skill evaluation unit to have a second level of skill, wherein the first weight is greater than the second weight, and wherein the first level of skill is a higher level of skill than the second level of skill; and extracting, in a case a plurality of users have set section metadata for a same video, a reproduction section of a video frame with respect to which the number of users who have specified the specified regions exceeds a predetermined number, and setting the extracted reproduction section as the section metadata.

13. A non-transitory computer-readable medium having embodied thereon a program, which when executed by a processor of a computer causes the processor to perform a method, the method comprising:

acquiring region metadata indicating a position and a range of a specified region specified by a user within a screen during reproduction of a video, and section metadata indicating a section corresponding to a video frame for which the specified region has been specified; and calculating, in a case specified regions have been specified by a plurality of users with respect to a same target object included in a same video frame, one representative position and range by statistically processing positions and ranges of a plurality of specified regions specified by the plurality of users, and setting the representative position and range as the region metadata;

evaluating a specification accuracy for the specified region for each user, wherein the calculating the one representative position and range by finding a weighted average of the positions and ranges of the plurality of specified regions specified by the plurality of users by placing a first weight on position and range of a specified region specified by a user who is evaluated by the skill evaluation unit to have a first level of skill and a second weight on position and range of a specified region specified by a user who is evaluated by the skill evaluation unit to have a second level of skill, wherein the first weight is greater than the second weight, and wherein the first level of skill is a higher level of skill than the second level of skill; and extracting, in a case a plurality of users have set section metadata for a same video, a reproduction section of a video frame with respect to which the number of users who have specified the specified regions exceeds a predetermined number, and setting the extracted reproduction section as the section metadata.

14. An information processing apparatus comprising:

a specified region detection unit that detects a specified region specified by a user within a screen during reproduction of a video;

a region metadata setting unit that sets region metadata indicating a position and a range of the specified region for each video frame;

a section metadata setting unit that sets section metadata indicating a section corresponding to a video frame for which the region metadata has been set, for each video;

a specific region detection unit that detects a specific region including a specific target object within each video frame;

a region deletion unit that deletes a specific region whose appearance time is shorter than a predetermined time threshold and a specific region whose display area is smaller than a predetermined display area;

a region combining unit that combines, in a case there exist a plurality of specific regions, located near one another within a same video frame, including a target object of a same type, the plurality of specific regions;

a clustering unit that performs clustering on specific regions based on features of target objects included in the specific regions, and that determines a feature of a target object representing each cluster; and a region identification unit that identifies a type of a target object based on the feature of the target object representing each cluster, and that associates identification information prepared in advance for each type of a target object with each cluster.

* * * * *